(12) United States Patent
Chinnalagu

(10) Patent No.: US 10,825,449 B1
(45) Date of Patent: Nov. 3, 2020

(54) SYSTEMS AND METHODS FOR ANALYZING A CHARACTERISTIC OF A COMMUNICATION USING DISJOINT CLASSIFICATION MODELS FOR PARSING AND EVALUATION OF THE COMMUNICATION

(71) Applicant: CrowdAround Inc., Santa Clara, CA (US)

(72) Inventor: Anandan Chinnalagu, Santa Clara, CA (US)

(73) Assignee: CrowdAround Inc., San Jose, CA (US)

( * ) Notice: Subject to any disclaimer, the term of this patent is extended or adjusted under 35 U.S.C. 154(b) by 0 days.

(21) Appl. No.: 16/659,404

(22) Filed: Oct. 21, 2019

Related U.S. Application Data

(60) Provisional application No. 62/907,477, filed on Sep. 27, 2019.

(51) Int. Cl.
*G06N 20/00* (2019.01)
*G06F 16/35* (2019.01)
(Continued)

(52) U.S. Cl.
CPC ...... *G10L 15/1815* (2013.01); *G06F 16/3347* (2019.01); *G06F 16/353* (2019.01); *G06N 3/0427* (2013.01); *G06N 3/0454* (2013.01); *G06N 3/08* (2013.01); *G06N 5/003* (2013.01); *G10L 15/16* (2013.01); *G10L 15/1822* (2013.01); *G10L 15/22* (2013.01); *G10L 15/30* (2013.01)

(58) Field of Classification Search
CPC ....... G06N 20/00; G10L 15/26; G06F 21/606; G06F 16/353; G06Q 30/0271; G06K 9/00281; G06K 9/4626
See application file for complete search history.

(56) References Cited

U.S. PATENT DOCUMENTS 9,043,196 B1 * 5/2015 Leydon ............... G06F 3/04842
704/4
2017/0185581 A1 * 6/2017 Bojja .................... G06F 16/353
(Continued)

OTHER PUBLICATIONS

Yang et al. (1999) "DistAl: An inter-pattern distance-based constructive learning algorithm," Intelligent Data Analysis. 3(1):55-73.

*Primary Examiner* — Farzad Kazeminezhad
(74) *Attorney, Agent, or Firm* — Morgan, Lewis & Bockius LLP

(57) ABSTRACT

Systems and methods for providing characteristic analytics are provided. A data construct including a text object is received. A first subset of classification models in a plurality of classification models is applied to the data construct. The subset of classification models parse the text object into a plurality of text strings. Each respective classification model in the plurality of classification models parses a portion of the text object in accordance with a plurality of heuristic instructions associated with the respective classification model. The text object is evaluated using a reference database that includes a predetermined plurality of text strings. A characteristic of the data construct in the form of a result of the evaluating is provided. The evaluation step further comprises a second disjoint subset of classification models used for the evaluation of the parsed text object.

19 Claims, 29 Drawing Sheets

(51) Int. Cl.
  *G06F 21/60* (2013.01)
  *G10L 15/26* (2006.01)
  *G06Q 30/02* (2012.01)
  *G06K 9/00* (2006.01)
  *G06T 13/40* (2011.01)
  *G06F 3/0481* (2013.01)
  *G10L 15/18* (2013.01)
  *G06F 16/33* (2019.01)
  *G06N 5/00* (2006.01)
  *G06N 3/04* (2006.01)
  *G10L 15/30* (2013.01)
  *G06N 3/08* (2006.01)
  *G10L 15/22* (2006.01)
  *G10L 15/16* (2006.01)

(56) References Cited

U.S. PATENT DOCUMENTS

| | | | |
|---|---|---|---|
| 2018/0074661 A1* | 3/2018 | Zhao | G10L 15/26 |
| 2018/0165582 A1* | 6/2018 | Cha | G06N 20/00 |
| 2018/0225014 A1* | 8/2018 | Kassatly | G06F 21/606 |
| 2018/0303397 A1* | 10/2018 | Krupat | G06Q 30/0271 |
| 2019/0126152 A1* | 5/2019 | Taylor | G06K 9/00281 |
| 2019/0172243 A1* | 6/2019 | Mishra | G06K 9/4628 |

* cited by examiner

FIG. 9B

| | | | |
|---|---|---|---|
| email2@address.com | Content 1 | Content 1_Questions | 61% 39% Date |
| email2@address.com | Content 2 | Content 2_Questions | 61% 39% Date |
| email2@address.com | Content 3 | Content 3_Questions | 61% 39% Date |
| email2@address.com | Content 4 | Content 4_Questions | 61% 39% Date |
| email@address.com | Content 5 | Content 5_Questions | 50% 50% Date |
| email@address.com | Content 6 | Content 6_Questions | 50% 50% Date |
| email@address.com | Content 7 | Content 7_Questions | 50% 50% Date |
| email1@address.com | Content 8 | Content 8_Questions | 66% 34% Date |
| email@address.com | Content 9 | Content 9_Questions | 56% 44% Date |
| email@address.com | Content 10 | Content 10_Questions | 50% 50% Date |
| email1@address.com | Content 11 | Content 11_Questions | 25% 75% Date |
| email@address.com | Content 12 | Content 12_Questions | 50% 50% Date |
| email@address.com | Content 13 | Content 13_Questions | 56% 44% Date |
| email1@address.com | Content 14 | Content 14_Questions | 56% 44% Date |
| email3@address.com | Content 15 | Content 15_Questions | 25% 75% Date |
| email@address.com | Content 16 | Content 16_Questions | 56% 44% Date |
| email4@address.com | Content 17 | Content 17_Questions | 50% 50% Date |
| email4@address.com | Content 18 | Content 18_Questions | 50% 50% Date |
| email4@address.com | Content 19 | Content 19_Questions | 50% 50% Date |

Canstrings Analyzer
Conversational Analytics

Sort by Recent

Call Logs — 902-1
902-2

Welcome Message
HR Mindpro
Code of Busine...
HR Mindpro
ATEA SV Group f...
Anand
Tech Team — 902-i
Sakthivel Conversation
Chat Bot
Sentiment Analyzer
Settings Canstrings Analyzer
Conversational Analytics 904

| 1306 | Voice | 914-1 | 914-2 | 914-3 | 808 | 908-1 | 908-2 | 908-3 | 912 | Admin ▼ 1310 |
|---|---|---|---|---|---|---|---|---|---|---|
| ⊙ Sept 12 | Sept 12 | 100% | 0% | 0% | ⊛ | ABC Corp | Chris | Broad | Date | |
| ⊙ NXT Team | NXT Team | 100% | 0% | 0% | ⊛ | ABC Corp | Mike | Broad | Date | |
| ⊙ Tech Plan | Tech Plan | 100% | 0% | 0% | ⊛ | ABC Corp | Smith | Broad | Date | |
| ⊙ Event Target | Event Target | 100% | 0% | 0% | ⊛ | ABC Corp | Mark | Broad | Date | |
| ⊙ Machintosh | Machintosh | 100% | 0% | 0% | ⊛ | ABC Corp | Mark | Broad | Date | |
| ⊙ VisioTest | VisioTest | 0% | 100% | 0% | ⊛ | ABC Corp | Smith | Sam | Date | |
| ⊙ Test345 | Test345 | 100% | 0% | 0% | ⊛ | ABC Corp | Joe | Broad | Date | |
| ⊙ Audio Test | Audio Test | 0% | 100% | 0% | ⊛ | ABC Corp | Wilson | Broad | Date | |
| ⊙ Visio | Visio | 23% | 77% | 0% | ⊛ | ABC Corp | Joe | Broad | Date | |
| ⊙ Tech Plan A | Tech Plan A | 50% | 50% | 0% | ⊛ | ABC Corp | Vincy | Broad | Date | |
| ⊙ Tech Plan | Tech Plan | 50% | 50% | 0% | ⊛ | ABC Corp | Vincy | Broad | Date | |
| ⊙ Wednesday_call | Wednesday_call | 30% | 70% | 0% | ⊛ | Blueberry Corp. | Vincy | Sam | Date | |
| ⊙ Wednesday_call | Wednesday_call | 30% | 70% | 0% | ⊛ | Blueberry Corp. | Vincy | Sam | Date | |
| ⊙ Wednesday_call | Wednesday_call | 81% | 19% | 0% | ⊛ | Blueberry Corp. | Vincy | Sam | Date | |
| ⊙ Edu_call | Edu_call | 30% | 70% | 0% | ⊛ | Blueberry Corp. | Vincy | Sam | Date | |

FIG. 13D

Canstrings Analyzer
Conversational Analytics
Analytics 1306

Admin ▼

1310

| | 914-1 | 914-2 | 914-3 | 808 | 908-1 | 908-2 | 908-3 | 912 |
|---|---|---|---|---|---|---|---|---|
| Name 1 | 0% | 100% | 0% | | ABC Corp | test | Broad | Date |
| Name 2 | 39% | 61% | 0% | | ABC Corp | test | Broad | Date |
| Name 3 | 38% | 63% | 0% | | ABC Corp | Tracy | Broad | Date |
| Name 4 | 16% | 84% | 0% | | Shelton Corp | Sack | Lee | Date |
| Name 5 | 24% | 76% | 0% | | HBC Corp | Tracy | Mike | Date |
| Name 6 | 39% | 61% | 0% | | ABC Corp | Sack | Broad | Date |
| Name 7 | 75% | 25% | 0% | | ABC Corp | Tracy | Broad | Date |
| Name 8 | 0% | 100% | 0% | | ABC Corp | Mark | Broad | Date |
| Name 9 | 0% | 100% | 0% | | ABC Corp | Mark | Broad | Date |
| Name 10 | 42% | 58% | 0% | | ABC Corp | test | Broad | Date |
| Name 11 | 100% | 0% | 0% | | ABC Corp | Mark | Broad | Date |
| Name 12 | 40% | 60% | 0% | | ABC Corp | test | Broad | Date |
| Name 13 | 30% | 70% | 0% | | ABC Corp | Tracy | Broad | Date |
| Name 14 | 30% | 70% | 0% | | ABC Corp | Mike | Broad | Date |
| Name 15 | 0% | 100% | 0% | | ABC Corp | Joe | Broad | Date |

FIG. 13E

SYSTEMS AND METHODS FOR ANALYZING A CHARACTERISTIC OF A COMMUNICATION USING DISJOINT CLASSIFICATION MODELS FOR PARSING AND EVALUATION OF THE COMMUNICATION

CROSS REFERENCE TO RELATED APPLICATION

This Application claims priority to U.S. Provisional Patent Application No. 62/907,477, entitled "Systems and Methods for Analyzing a Characteristic of a Communication," filed Sep. 27, 2019, which is hereby incorporated by reference in its entirety.

TECHNICAL FIELD

The present disclosure generally relates to systems and methods for analyzing a communication. More particularly, the present disclosure relates to analytics systems and methods designed to provide a characteristic of a communication.

BACKGROUND

The World Wide Web is the well-known collection of interlinked hypertext documents hosted at a vast number of computer resources communicatively coupled to one another over networks of computer networks known as the Internet. These documents, which may include text multimedia files and images, are typically viewed as Web pages with the aid of a Web browser—a software application running on a computer system.

In recent years, websites featuring user generated content, such as news, blogs, entertainment productions, photography, and social commentary, to name but a few, have become increasingly popular. Of particular interest is user generated content which expresses opinions (usually, but not necessarily, of the person posting the content), for example of products and services. Social media sites in particular have become popular places for users to post opinion related information and content.

The opinions and commentary posted to various sites have become highly influential and many people now make purchasing decisions based on such content. Unfortunately, however, for people seeking out such content in order to inform prospective purchasing decisions and the like, the task is not always easy. Blogs, review forums, and social networking sites are replete with ever-changing content, and even if one can locate a review or similar post of interest, such reviews typically include information that is of little or no relevance to the topic and/or the purpose for which the review is being read. Further, while the content and opinion information can be of great value to advertisers, retailers, and others, it is extraordinarily burdensome to collect and analyze in any systematic way, and even more difficult to extract meaningful commentary or opinions which can form the basis for appropriate responses or informed decisions.

Previous approaches for determining the context of a communication utilize a machine learning algorithm to analyze the communication. Prior methods of applying the machine learning algorithm determine a sentiment based on rules and keywords within the communication such as "good" or "bad." However, these prior methods fail to analyze the communication based on the context, the subjectivity, and the polarity of the communication, and therefore fail to determine a true sentiment or emotion of the characteristic. For instance, prior methods of analyzing a communication of "Product is good and their overall services are bad," fail to extract the true sentiment or emotion of the communication due to the inclusion of a positive keyword, "good," and a negative keyword, "bad," yielding a false positive result.

Thus, prior to the present disclosure there existed a need for improved analysis platforms for determining a characteristic, such as an emotion or a sentiment, of a communication to have an improved understanding of the content of the communication.

The information disclosed in this background section is only for enhancement of understanding of the general background of the invention and should not be taken as an acknowledgement or any form of suggestion that this information forms the prior art already known to a person skilled in the art.

SUMMARY

Advantageously, the systems and methods detailed in the present disclosure address the shortcomings in the prior art detailed above.

Various aspects of the present disclosure are directed to providing a characteristic analytics system.

One aspect of the present disclosure provides a characteristic analytics system including a computer system. The computer system includes one or more processing units and a memory coupled to at least one of the one or more processing units. The memory includes instructions for receiving a data construct. The data construct includes a text object. A first subset of classification models in a plurality of classification models is applied to the data construct that parses the text object into a plurality of text strings. Further, each respective classification model in the plurality of classification models parses a portion of the text object in accordance with a plurality of heuristic instructions associated with the respective classification model. A reference database evaluates the text object using at least a predetermined plurality of text strings. A result of the evaluating of the text objects provides a characteristic of the data construct.

In some embodiments, the evaluating uses the reference data and a second subset of classification models in the plurality of classification models.

In some embodiments, the second subset of classification models includes the first subset of classification models.

In some embodiments, the characteristic of the data construct includes an emotion of the data construct, a sentiment of the data construct, or a combination thereof.

In some embodiments, the characteristic of the data construct includes an emotion of the data construct in the form of happiness, sadness, fear, disgust, anger, surprise, pride, shame, embarrassment, and excitement.

In some embodiments, the characteristic of the data construct includes an emotion of the data construct in the form of admiration, adoration, aesthetic appreciation, amusement, anxiety, awe, awkwardness, boredom, calmness, confusion, craving, disgust, empathetic pain, entrancement, envy, excitement, fear, horror, interest, joy, nostalgia, romance, sadness, satisfaction, sexual desire, sympathy, and triumph.

In some embodiments, the characteristic of the data construct includes a combination of one or more emotions of the data construct.

In some embodiments, the characteristic of the data construct includes a sentiment of the data construct that is a positive sentiment, a neutral sentiment, a negative sentiment, or a combination thereof.

In some embodiments, the data construct includes audio data. The receiving further includes transcribing the audio data of the data construct, thereby forming the text object.

In some embodiments, the transcribing is conducted using a speech recognition classification model in the plurality of classification models.

In some embodiments, the data construct is derived from a communication including a social media communication feed, an email communication, a telephonic communication, or a technical document.

In some embodiments, text object of the data construct includes an ideogram.

In some embodiments, the ideogram includes an image emoticon, a text emoticon, or a combination thereof.

In some embodiments, the receiving further includes formatting the data construct in accordance with a standardized format.

In some embodiments, the plurality of classification models includes a decision tree classification model, a neural network classification model, a support vector machine classification model, a Naïve Bayes classification model, a pattern-matching classification model, and a syntactic based classification model.

In some embodiments, the plurality of classification models includes a decision tree classification model and wherein the plurality of instructions associated with the decision tree classification model includes a plurality of pre-pruning instructions, a plurality of post-pruning instructions, or a combination thereof.

In some embodiments, the plurality of instructions associated with the decision tree classification model includes a plurality of information gain instructions.

In some embodiments, the plurality of classification models includes a neural network classification model in the form of an inter-pattern distance based classification model.

In some embodiments, the plurality of instructions associated with the pattern-matching classification model includes a plurality of part-of-speech instructions.

In some embodiments, the first subset of classification models includes a decision tree classification model configured to parse the text object in accordance with one or more features of the text object, a Naïve Bayes classification model configured to parse the text object in accordance with a probability of a result of the parsing, and a neural network classification model configured to parse the text object in accordance with one or more classifications.

In some embodiments, the probability of the result includes an evaluation of a confusion matrix.

In some embodiments, the one or more classifications include one or more language semantic classifications, one or more language syntax classifications, or a combination thereof.

In some embodiments, the parsing of the applying includes determining objective language in the text object, subjective language in the text object, or a combination thereof.

In some embodiments, the evaluating is based on the objective language in the text object, the subjective language in the text object, or a combination thereof.

In some embodiments, the evaluating includes evaluating a polarity of the text object, a polarity of each text string in the plurality of text strings, or a combination thereof.

In some embodiments, in accordance with a determination the polarity satisfies a threshold polarity, the system further applies the first subset of classification models in the plurality of classification models to a text associated with the satisfying polarity, thereby further parsing the text.

In some embodiments, the result of the evaluating is stored in predetermined plurality of text strings of the reference database for use with a second data construct.

In some embodiments, the receiving the data construct further includes determining a source of the data construct. Additionally, the evaluating further includes using a portion of the reference database associated with the determined source of the data construct Another aspect of the present disclosure is directed to providing a user interface. Accordingly, the present disclosure provides a method including, at a first device having a display, displaying, on the display, a conversation region. The conversation region includes a plurality of communications of a conversation between a first user of the first device and a second user of a second device. A header region is displayed on the display identifying the user of the second device. Upon input of a data construct by the first user, the data construct is added to the conversation as a communication in the plurality of communications.

In some embodiments, the second user of the second device is a human or an automated chat based computer system.

In some embodiments, the conversation region is initially devoid of communications and is populated over a period of time with communications between the first user of the first device and the second user of the second device.

In some embodiments, one or more communications in the plurality of communications of the conversation region includes a status indicator associated with the communication.

In some embodiments, the status indicator associated with the communication includes a first status indicator describing a delivery status of the communication. In some embodiments, the delivery status of the communication includes a sent status, a delivered status, and a read status.

In some embodiments, the status indicator associated with the communication includes a second status indicator describing a reply status of the second device. In some embodiments, the reply status of the second device includes a positive reply status and a negative reply.

In some embodiments, the status indicator associated with the communication includes a third status indicator describing a characteristic of the communication. In some embodiments, the characteristic of the communication includes an emotion of the communication, a sentiment of the communication, or a combination thereof. In some embodiments, the characteristic of the communication is provided as an ideogram.

In some embodiments, the method for the user interface further includes displaying, on the display, a text entry region.

In some embodiments, the text entry region includes a status indicator describing a characteristic of the communication. In some embodiments, the status indicator of the text entry region provides a status of the communication within a predetermined period of time from input of the communication in the text entry region.

In some embodiments, the characteristic of the status indicator of the text entry region is provided as text. In some embodiments, the characteristic of the status indicator of the text entry region displays, on the display, an alert in accordance with a determination that the characteristic of the status indicator is a predetermined characteristic. In some embodiments, the predetermined characteristic includes a negative sentiment.

In some embodiments, the conversation region includes a plurality of communications of a conversation between the first user of the first device and a plurality of users each uniquely associated with a remote device in a plurality of remote devices.

Yet another aspect of the present disclosure provides a non-transitory computer readable storage medium, where the non-transitory computer readable storage medium stores instructions, which when executed by a computer system, causes the computer system to perform any of the methods for analyzing a characteristic of a communication described in the present disclosure.

Yet another aspect of the present disclosure provides a characteristic analytics system including a computer system. The computer system includes one or more processing units and a memory coupled to at least one of the one or more processing units. The memory includes instructions for receiving a communication including a data construct. The data construct includes a text object including one or more text characters. A plurality of classification models is applied to the data construct, parsing the text object into a plurality of text strings. A reference database evaluates the text object and/or the text strings using at least a plurality of text strings. A result of the evaluating of the text objects provides a characteristic of the data construct.

Yet another aspect of the present disclosure provides a characteristic analytics system including a computer system. The computer system includes one or more processing units and a memory coupled to at least one of the one or more processing units. The memory includes instructions for receiving a communication. The communication includes a data construct that further includes a text object. A plurality of classification models is applied to the data construct, parsing the text object into a plurality of text strings. Further, each respective classification model in the plurality of classification models parses a portion of the text object in accordance with a plurality of heuristic instructions associated with the respective classification model. The plurality of classification models and a reference database evaluate the text object. A result of the evaluating of the text objects provides a characteristic of the data construct.

In accordance with an aspect of the present disclosure, the above and other objects can be accomplished by the provision of a characteristic of a communication analysis service, which provides a determined characteristic of the communication according to the context of the communication.

The methods and apparatuses of the present disclosure have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIGS. 9A and 9B illustrate user interfaces for displaying a characteristics of one or more communications, in accordance with exemplary embodiment of the present disclosure;

FIGS. 13D, 13E, 13F, and 13G illustrate user interface for providing a characteristic of a communication, in accordance with an exemplary embodiment of the present disclosure.

Figure 1:
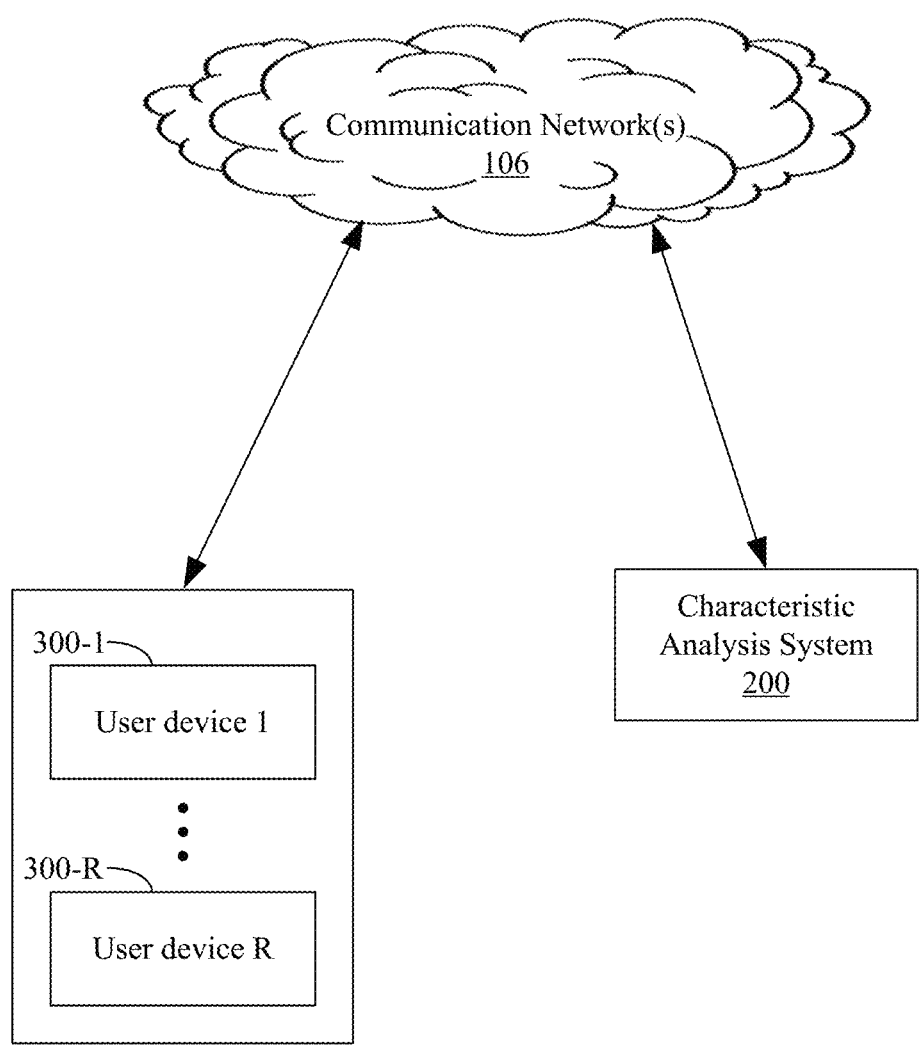
FIG. 1 illustrates an exemplary system topology including a characteristic analysis system, in accordance with an exemplary embodiment of the present disclosure.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Many forms of communication lack face-to-face interactions or include information that is difficult to determine the underlying context of, such as sarcasm and information communicated through images. Without fully understanding the context of a communication, people are more than likely to make misinformed decisions, which is detrimental to both consumers and businesses alike.

To address this, the systems and methods of the present disclosure provide a communication analysis service. This service evaluates a communication to determine a characteristic of the context of the communication, allowing a user to better understand the underlying meaning of the communication. The characteristics can be provided as a sentiment or emotion of the communication.

Reference will now be made in detail to various embodiments of the present disclosure, examples of which are illustrated in the accompanying drawing and described below. While the disclosure will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the present invention as defined by the appended claims.

It will also be understood that, although the terms first, second, etc. may be used herein to describe various elements, these elements should not be limited by these terms. These terms are only used to distinguish one element from another. For example, a first communication could be termed a second communication, and, similarly, a second communication could be termed a first communication, without departing from the scope of the present disclosure. The first communication and the second communication are both communications, but they are not the same communication.

The terminology used in the present disclosure is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and or "comprising," when used in this specification, specify the presence of stated features, integers, steps, operations, elements, and or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

As used herein, the term "communication" may be construed to mean a verbal exchange of information, a written exchange of information, a visual exchange of information, or a combination thereof. Furthermore, unless stated otherwise, the terms "communication" and "conversation" are used interchangeable herein. Additionally, unless stated otherwise, the terms "user" and "entity" are used interchangeable herein.

Furthermore, when a reference number is given an "$i^{th}$" denotation, the reference number refers to a generic component, set, or embodiment. For instance, a communication termed "communication i" refers to the $i^{th}$ communication in a plurality of communications.

The foregoing description included example systems, methods, techniques, instruction sequences, and computing machine program products that embody illustrative implementations. For purposes of explanation, numerous specific details are set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions below are not intended to be exhaustive or to limit the implementations to the precise forms disclosed. Many modifications and variations are possible in view of the above teachings. The implementations are chosen and described in order to best explain the principles and their practical applications, to thereby enable others skilled in the art to best utilize the implementations and various implementations with various modifications as are suited to the particular use contemplated.

In the interest of clarity, not all of the routine features of the implementations described herein are shown and described. It will be appreciated that, in the development of any such actual implementation, numerous implementation-specific decisions are made in order to achieve the designer's specific goals, such as compliance with use case- and business-related constraints, and that these specific goals will vary from one implementation to another and from one designer to another. Moreover, it will be appreciated that such a design effort might be complex and time-consuming, but nevertheless be a routine undertaking of engineering for those of ordering skill in the art having the benefit of the present disclosure.

Some portions of this detailed description describe the embodiments of the invention in terms of classification models and symbolic representations of operations on information. These classification model descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like.

An aspect of the present disclosure is directed to providing a characteristic of a communication analysis service. Systems and methods for providing a characteristic analysis of a communication service are provided. The systems and methods include receiving (e.g., in electronic form) a data construct. The data construct includes a text object, which in part includes information provided by the communication. A first subset of classification models in a plurality of classification models is applied to the data construct. Each classification model in the subset of classification models parses the text object into a plurality of text strings. Moreover, each respective classification model in the plurality of classification models parses a portion of the text object in accordance with a plurality of heuristic instructions associated with the classification model. The text object is evaluated using a reference database storing a predetermined plurality of text strings. A characteristic of the data construct is provided in the form of a result of the evaluating of the text object.

FIG. 1 illustrates an exemplary topography of an integrated system 100 for providing an analysis of a characteristic of a communication. The integrated system 100 includes a characteristic analysis system 200 that receives a communication for analysis, and one or more user devices 300 (e.g., computing devices) that provide and/or receive communications to and/or from the integrated system 100. Each user device 300 is associated with at least one user (e.g., a first user device 300-1 is associated with a first subject, a second user device 300-2 is associated with a second subject, etc.).

Figure 2:
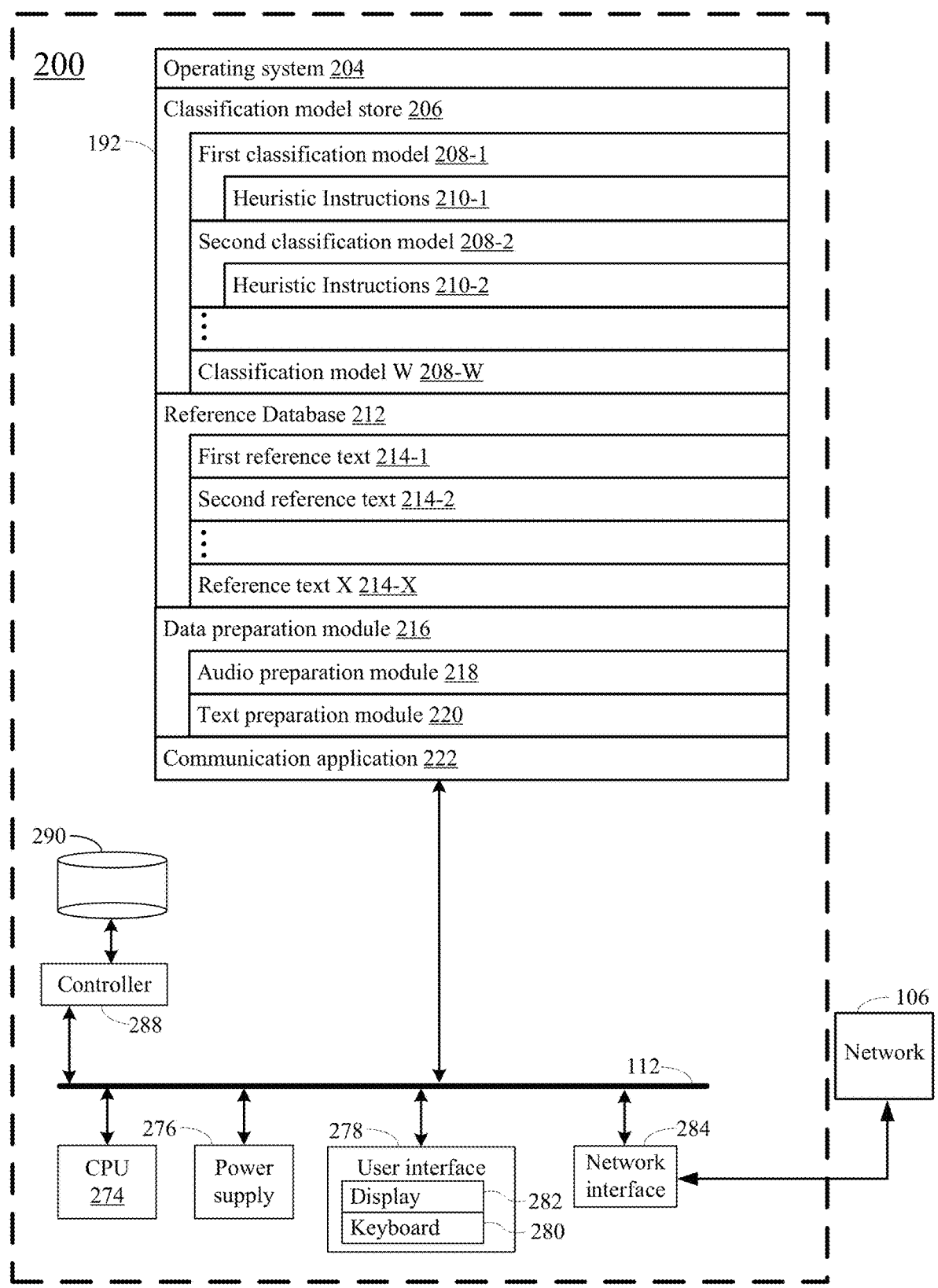
FIG. 2 illustrates various modules and/or components of a characteristics analytics system, in accordance with an exemplary embodiment of the present disclosure.
Figure 3:
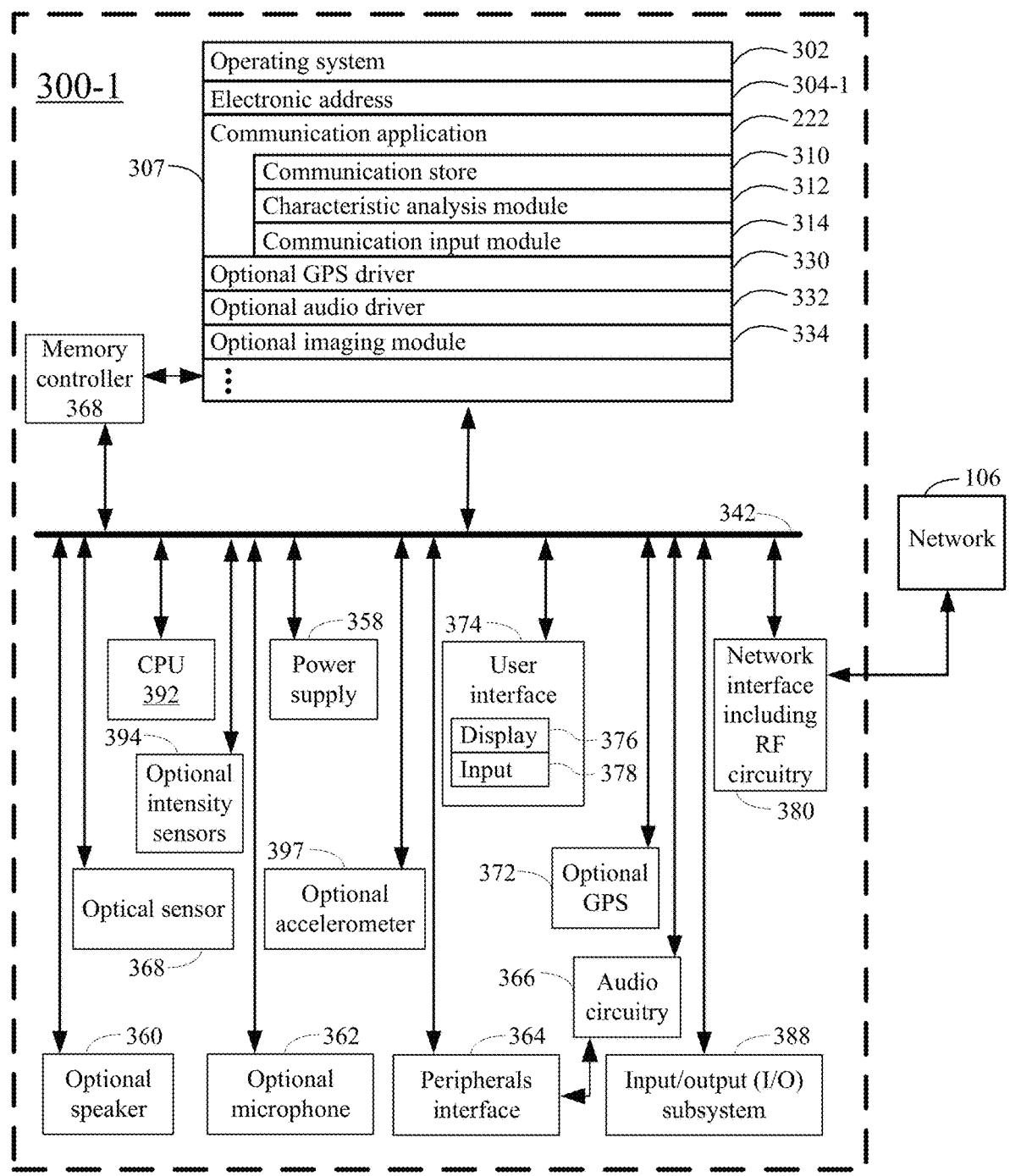
FIG. 3 illustrates various modules and/or components of a user device, in accordance with an exemplary embodiment of the present disclosure.

A detailed description of a system 100 for providing a characteristic analysis of a communication service in accordance with the present disclosure is described in conjunction with FIG. 1 through FIG. 3. As such, FIG. 1 through FIG. 3 collectively illustrate an exemplary topology of the system 100 in accordance with the present disclosure. In the topology, there is a characteristic analysis system 200 for receiving a data construct (e.g., conversation 600-1 of FIG. 6A, communication 602-1 of FIG. 6B, conversation 600-1 of FIG. 9A, etc.) and analyzing a characteristic of the data construct. The characteristic analysis system 100 utilizes one or more classification models (e.g., classification models 208 of FIG. 2) and/or a reference database (e.g., reference database 212 of FIG. 2) to ascertain a characteristic of the communication.

Referring to FIG. 1, the characteristic analysis system 200 is configured to determine a characteristic of a communication. In determining the characteristic of the communication, the characteristic analysis system 200 receives the communication (e.g., conversation 600-2 of FIG. 7, communications 602-1 through 602-4 of FIG. 7, etc.) from one or more user devices 300 associated with a corresponding user and/or one or more remote servers (e.g., an auxiliary social media application server such as social media applications 1202 of FIG. 12). The communications are provided in electronic form to the characteristic analysis system 200. Each communication includes, or forms, a data construct which is the basis of the characteristic analysis. In some embodiments, a communication includes information identifying a source of the communication (e.g., a first communication 600-1 includes information, such as electronic address 304 of FIG. 3, identifying a first user device 300-1 as a source, etc.).

Sources of communications include a user device 300, a remote server such an auxiliary social media application server (e.g., social media applications 1202 of FIG. 12), and the characteristic analysis system 200. In some embodiment, the social media application includes Facebook™ (e.g., social media application 1202-i of FIG. 12), Flickr™, Google+™, Habbo™, Instagram™, LinkedIn™, Pinterest™, Qzone™, Reddit™, Slack™ (e.g., social media application 1202-1 of FIG. 12), SnapChat™, Telegram™, Tumblr™, Twitter™ (e.g., social media application 1202-3 of FIG. 12), Viber™, WeChat™ (微信), Sina Weibo™ (新浪微博), WhatsApp™, Youtube™, Zendesk™ (e.g., social media application 1202-2 of FIG. 12), an online forum, or a similar online communications platform. In some embodiments, a user uploads (e.g., uploads a Portable Document Format (PDF) file for analysis) or inputs a communication through an input mechanism of the user device 300 (e.g., mechanism 612 of FIG. 6A, text entry region 622 of FIG. 6B, button 922 of FIG. 9C, etc.).

In some embodiments, the characteristic analysis system 200 receives the communication wirelessly through radio-frequency (RF) signals. In some embodiments, such signals are in accordance with an 802.11 (Wi-Fi), Bluetooth, or ZigBee standard.

In some embodiments, the characteristic analysis system 200 receives a communication directly from a source (e.g., directly from a user device 300). In some embodiments, the characteristic analysis system 200 receives a communication from an auxiliary server (e.g., from a remote application host server). In such embodiments, the auxiliary server is in communication with a user device 300 and receives one or more communications from the user device. Accordingly, the auxiliary server provides the communication to characteristic analysis system 200. In some embodiments, the auxiliary server provides (e.g., polls for) one or more communications on a recurring basis (e.g., each minute, each hour, each day, as specified by the auxiliary server and/or a user, etc.).

In some embodiments, more than one user device 300 is associated with a respective user. For instance, each user has a user profile (e.g., profile 640 of FIG. 6E) that is accessible through one or more user devices 300. Accordingly, in some embodiments, a user accesses their corresponding user profile by logging into a communications application (e.g., communications application 222 of FIG. 2, communications application 222 of FIG. 3, communications applications of FIG. 6A through FIG. 12, etc.).

In some embodiments, the characteristic analysis system 200 is not proximate to the subject and/or does not have wireless capabilities or such wireless capabilities are not used for the purpose of acquiring a communication. In such embodiments, a communication network 106 is utilized to communicate a communication from a source (e.g., user device 300) to the characteristic analysis system 200.

Examples of networks 106 include, but are not limited to, the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of the present disclosure.

Of course, other topologies of the system 100 other than the one depicted in FIG. 1 are possible. For instance, in some embodiments rather than relying on a communications network 106, the one or more user devices 300 wirelessly transmit information directly to the characteristic analysis system 200. Further, in some embodiments, characteristic analysis system 200 constitute a portable electronic device, a server computer, or in fact constitute several computers that are linked together in a network, or be a virtual machine and/or a container in a cloud-computing context. As such, the exemplary topology shown in FIG. 1 merely serves to describe the features of an embodiment of the present disclosure in a manner that will be readily understood to one of skill in the art.

Turning to FIG. 2 with the foregoing in mind, in some embodiments the characteristic analysis system 200 includes one or more computers. For purposes of illustration in FIG. 2, the characteristic analysis system 200 is represented as a single computer that includes all of the functionality for providing a characteristic analysis system. However, the present disclosure is not limited thereto. In some embodiments, the functionality for providing a characteristic analysis system 200 is spread across any number of networked computers, and/or resides on each of several networked computers, and/or is hosted on one or more virtual machines and/or one or more containers at a remote location accessible across the communications network 106. One of skill in the art will appreciate that any of a wide array of different computer topologies are used for the application and all such topologies are within the scope of the present disclosure.

An exemplary characteristic analysis system 200 for providing an analysis of a characteristic of a communication is provided. The characteristic analysis system 200 includes one or more processing units (CPU's) 274, a network or other communications interface 284, a memory 192 (e.g., random access memory), one or more magnetic disk storage and or persistent devices 290 optionally accessed by one or more controllers 288, one or more communication busses 112 for interconnecting the aforementioned components, a user interface 278, the user interface 278 including a display 282 and input 280 (e.g., keyboard, keypad, touch screen), and a power supply 276 for powering the aforementioned components. In some embodiments, data in memory 192 is seamlessly shared with non-volatile memory 290 using known computing techniques such as caching. In some embodiments, memory 192 and or memory 290 includes mass storage that is remotely located with respect to the central processing unit(s) 274. In other words, some data stored in memory 192 and/or memory 290 may in fact be hosted on computers that are external to the characteristic analysis system 200 but that can be electronically accessed by the characteristic analysis system 200 over an Internet, intranet, or other form of network or electronic cable (illustrated as element 106 in FIG. 2) using network interface 284.

In some embodiments, the memory 192 of the characteristic analysis system 200 for analyzing a communication stores:
- an operating system 204 that includes procedures for handling various basic system services;
- a classification model store 206 that stores a plurality of classification models 208, with each classification model 208 including a corresponding plurality of heuristic instructions 210 dictating how each classification model parses text;
- a reference database 212 that stores a plurality of reference text 214 for evaluating a data construct and/or training a classification model 208;
- a data preparation module 216 that facilitates preparing a communication (e.g., a data construct) for analysis using an audio preparation module 218 and/or a text preparation module 220; and
- a communication application 222 that hosts a platform for providing and receiving a plurality of communications as well as analysing a characteristic of a communication.

Due to the inherent complexity of understanding the underlying context of a communication, one classification model 208 is not capable of solving all natural language processing (NLP) problems. Accordingly, the classification model store 206 stores a plurality of classification models 208 (e.g., a first classification model 208-1 such as a neural network classification model, a second classification model 208-2 such as a Naïve Bayes classification model, etc.), which are used to parse text object of data construct derived from a communication.

In some embodiments, the classification models 208 of the classification model store 206 includes a decision tree classification model (e.g., first classification model 208-1), a neural network classification model (e.g., second classification model 208-2), a support vector machine (SVM) classification model (e.g., third classification model 208-3), a Naïve Bayes classification model (e.g., fourth classification model 208-4), a pattern-matching classification model (e.g., fifth classification model 208-5), a syntactic based classification model (e.g., sixth classification model 208-6), a Bayesian classification model, a max entropy classification model, a rule based classification model, a lexical classification model, or a combination thereof. Other equivalent classification models can be used to parse a communication for the purpose analyzing a characteristic of the communication, and all such classification models are within the scope of the present disclosure. Including more than one classification model 208 stored in the classification model store 206 allows for an increased accuracy in determining a characteristic of a communication. For instance, in some embodiments each respective classification model 208 arrives at its own evaluation for a characteristic of a communication. In some embodiments, the evaluating includes utilizing a second subset of classification models and the reference database. The independently arrived characteristics are collectively verified through a comparison or amalgamation, providing a cumulative characteristic of the communication. Generally, the parsing and the evaluating provided by the classification models 208 is used for sentiment analysis, text and opinions mining, automated questions and answers, translations of languages, and different chat-bot applications.

Each classification model 208 includes a plurality of heuristic instructions 210 that describe various processes for the classification model 208 to follow if parsing a data construct of a communication. For instance, in some embodiments, the pattern matching classification model 208 includes instructions 210 that dictate how to parse a text object into one or more text strings in accordance with a parts-of-speech analysis. This parts-of-speech analysis provided by the instructions 210 includes identifying a type of clause within a text object and/or text string, such as identifying an independent clause and/or a dependent clause within the text. In some embodiments, one or more classification models 208 share one or more instructions 210. Specific instructions 210 for different classification models 208 will be described in detail infra, particularly with reference to FIG. 4 and FIG. 5 and the corresponding passages.

In some embodiments, the characteristic analysis system 200 includes the reference database 212 that stores a plurality of reference text 214. Generally, prior to applying a classification model 208 to a data construct, a training set of data (e.g., a predetermined plurality of reference text 214) is prepared to train one or more classification models 208 on. In some embodiments, a user (e.g., a business entity) provides the training set of data to the characteristic analysis system 200. Having the user provide the reference text 214 training data allows for communications associated with the user to be specifically analyzed according to an industry or an application associated with the user. For instance, a user provides the characteristic analysis system 200 a set of recorded telephonic support calls between employees of the user and customers of the user (e.g., conversations 600 of FIG. 9A). The support calls are, optionally, converted to a text format (e.g., a text object including one or more text strings), and a training set of data is formed for the classification models 208, allowing the classification models 208 to train on the language set forth in the recorded calls. In some embodiments, the user provides a characteristic for each reference text 214 of the training set of data to assist training the classification models 208. For instance, in the above support call example the user can provide a characteristic for each call, or various portions of a call, which form the basis for determining and evaluating characteristics of future communications provided by the user, or another user associated with the user. In some embodiments, each training set of data is uniquely associated with one or more users, or similarly shared amongst two or more users. In some embodiments, the user provides a characteristic for each reference text 214 of the training data to assist training the one or more classification models 208. Furthermore, in some embodiments the reference text 214 of the training set of data includes one or more communications associated with the user that were received or provided over a predetermined period of time (e.g., a week of communications, a month of communications, etc.), allowing the reference text 214 to have a more robust sample size. Having a large set of training data (e.g., greater than or equal to 50 reference text, greater than or equal to 100 reference text, greater than or equal to 1,000 reference text) provides increased accuracy for determining a characteristic of a communication, and, in some embodiments, reduces a processing time for providing the characteristic of the communication.

In some embodiments, other databases are communicatively linked (e.g., linked through communication network 106 of FIG. 1) to the characteristic analysis system 200. For instance, in some embodiments, one or more communications stored on an external database stores (e.g., a cloud database) is provided to the characteristic analysis system 200.

In some embodiments, the characteristic analysis system 200 includes the data preparation module 216 that facilitates preparing a communication and/or a data construct into a specified format, such as a JavaScript Object Notation (JSON) format. In some embodiments, a data construct of the present disclosure is formatted in accordance with a source associated with the communication. To simplify parsing of the data construct, the data preparation module 216 prepares the data construct into a specified format using the audio preparation module 218 and/or the text preparation module 220, which allows for optimized processing for the classification models 208. In some embodiments, the text preparation module 220 includes a lookup table that assists in preparing the data construct, for instance, by referencing a table of conversions from a first format to a second format. Furthermore, in some embodiments a data construct of a communication includes audio data (e.g., an .MP3 file of a recorded telephonic call such as audio 904 of FIG. 9A). The data preparation module 216 facilitates transcribes the audio data of the data construct into a corresponding text object. In some embodiments, a speech-to-text classification model 208 assists with and/or provides the transcribing of the audio data.

In some embodiments, the text preparation module 220 of the data preparation module 216 processes a communication to identify and/or amend an error (e.g., a clerical error such as a typo) within the communication. If a communication includes a type error (e.g., a clerical spelling error) or a semantic error, the type error or semantic error can propagate and force other errors in determining a characteristic if not properly identified. For instance, referring briefly to FIG. 8B, a communication 602-1 including text "Thanks, I got you mail," includes a type error of "you" instead of "your." The text preparation module 220 identifies this type error and, in some embodiments, provides and/or suggests a correction for the error to prevent further errors from occurring in determining a characteristic (e.g., characteristic 800-3 of FIG. 8B) of the communication 602-1.

Furthermore, in some embodiments, the characteristic analysis system 200 includes the communication application 222 (e.g., a communication application of FIG. 6A through FIG. 12), which provides a platform for one or more users to receive and provide communications with each other and analyze a characteristic of various communications. Additional details and information regarding the communication application 222 will be described in more detail infra, with particular reference to at least FIG. 3 and FIG. 6A through FIG. 12 including the corresponding passages.

In some embodiments, one or more of the above identified data stores and/or modules of the characteristic analysis system 200 are stored in one or more of the previously described memory devices (e.g., memory 192 and/or memory 290), and correspond to a set of instructions for performing a function described above. The above-identified data, modules, or programs (e.g., sets of instructions) need not be implemented as separate software programs, procedures, or modules. Thus, various subsets of these modules may be combined or otherwise re-arranged in various implementations. In some implementations, the memory 192 and/or memory 290 optionally stores a subset of the modules and data structures identified above. Furthermore, in some embodiments the memory 192 and/or memory 290 stores additional modules and data structures not described above.

Referring to FIG. 3, a description of an exemplary user device 300 that can be used with the presently disclosure is provided. In some embodiments, a user device 300 includes a smart phone (e.g., an iPhone, an Android device, etc.), a laptop computer, a tablet computer, a desktop computer, a wearable device (e.g., a smart watch, a heads-up display (HUD) device, etc.), a television (e.g., a smart television), or another form of electronic device such as a gaming console, a stand-alone device, and the like.

The user device 300 illustrated in FIG. 3 has one or more processing units (CPU's) 392, peripherals interface 364, memory controller 368, a network or other communications interface 380, a memory 307 (e.g., random access memory), a user interface 374, the user interface 374 including a display 376 and input 378 (e.g., keyboard, keypad, touch screen, etc.), an optional accelerometer 397, an optional GPS 372, optional audio circuitry 366, an optional speaker 360, an optional microphone 362, one or more optional intensity sensors 394, an optional input/output (I/O) subsystem 388, one or more optional optical sensors 368, one or more communication busses 342 for interconnecting the aforementioned components, and a power supply 358 for powering the aforementioned components.

In some embodiments, the input 378 is a touch-sensitive display, such as a touch-sensitive surface. In some embodiments, the user interface 374 includes one or more soft keyboard embodiments. In some embodiments, the soft keyboard embodiments include standard (QWERTY) and or non-standard configurations of symbols on the displayed icons. The input 378 and/or the user interface 374 is utilized by an end-user of the respective user device 300 (e.g., a respective subject) to input various commands (e.g., a push command) to the respective user device.

The user device 300 illustrated in FIG. 3 optionally includes, in addition to accelerometer(s) 397, a magnetometer, and a global positioning system (GPS) 372 (or GLONASS or other global navigation system) receiver for obtaining information concerning a current location (e.g., a latitude, a longitude, an elevation, etc.) and/or an orientation (e.g., a portrait or a landscape orientation of the device) of the user device 300. In some embodiments, the location of the user device 300 provides information related to a preferred language of communications (e.g., a location of the user device is associated with Germany signaling that communications are preferably in the German language).

It should be appreciated that the user device 300 illustrated in FIG. 3 is only one example of a multifunction device that may be used for receiving communications, providing communications, and analyzing a characteristic of a communication. Thus, the user device 300 optionally has more or fewer components than shown, optionally combines two or more components, or optionally has a different configuration or arrangement of the components. The various components shown in FIG. 3 are implemented in hardware, software, firmware, or a combination thereof, including one or more signal processing and/or application specific integrated circuits.

Memory 307 of the user device 300 illustrated in FIG. 3 optionally includes high-speed random access memory and optionally also includes non-volatile memory, such as one or more magnetic disk storage devices, flash memory devices, or other non-volatile solid-state memory devices. Access to memory 307 by other components of the user device 300, such as CPU(s) 392 is, optionally, controlled by the memory controller 368.

In some embodiments, the peripherals interface 364 couples input and output peripherals of the device to the CPU(s) 392 and the memory 307. The one or more CPU(s) 392 run or execute various software programs and/or sets of instructions stored in the memory 307, such as the communication application 222, to perform various functions for the user device 300 and process data.

In some embodiments, the peripherals interface 364, the CPU(s) 392, and the memory controller 368 are implemented on a single chip. In some other embodiments, the peripherals interface 364, the CPU(s) 392, and the memory controller 368 are implemented on separate chips.

RF (radio frequency) circuitry of network interface 380 receives and sends RF signals, also called electromagnetic signals. In some embodiments, the data constructs are received using the present RF circuitry from one or more devices such as user device 300 associated with a subject. In some embodiments, the RF circuitry 380 converts electrical signals to from electromagnetic signals and communicates with communications networks (e.g., communication network 106 of FIG. 1) and other communications devices, user devices 300, and/or the characteristic analysis system 200 via the electromagnetic signals. The RF circuitry 380 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 380 optionally communicates with the communication network 106. In some embodiments, the circuitry 380 does not include RF circuitry and, in fact, is connected to the communication network 106 through one or more hard wires (e.g., an optical cable, a coaxial cable, or the like).

In some embodiments, the audio circuitry 366, the optional speaker 360, and the optional microphone 362 provide an audio interface between the user and the user device 300, enabling the user device to provide communications including audio data provided through the audio circuitry 366, the optional speaker 360, and/or the optional microphone 362. The audio circuitry 366 receives audio data from the peripherals interface 364, converts the audio data to electrical signals, and transmits the electrical signals to the speaker 360. The speaker 360 converts the electrical signals to human-audible sound waves. The audio circuitry 366 also receives electrical signals converted by the microphone 362 from sound waves. The audio circuitry 366 converts the electrical signal to audio data and transmits the audio data to peripherals interface 364 for processing. Audio data is, optionally, retrieved from and or transmitted to the memory 307 and or the RF circuitry 380 by the peripherals interface 364.

In some embodiments, the power supply 358 optionally includes a power management system, one or more power sources (e.g., one or more batteries, alternating current (AC)), a recharging system, a power failure detection circuit, a power converter or inverter, a power status indicator (e.g., a light-emitting diode (LED)) and any other components associated with the generation, management, and distribution of power in portable devices.

In some embodiments, the user device 300 optionally also includes one or more optical sensors 368. The optical sensor(s) 368 optionally include charge-coupled device (CCD) or complementary metal-oxide semiconductor (CMOS) phototransistors. The optical sensor(s) 368 receive light from the environment, projected through one or more lens, and converts the light to data representing an image. The optical sensor(s) 368 optionally capture still images and or video. In some embodiments, an optical sensor is disposed on a back end portion of the user device 300 (e.g., opposite the display 376 on a front end portion of the user device 300) so that the input 378 is enabled for use as a viewfinder for still and or video image acquisition. In some embodiments, another optical sensor 368 is located on the front end portion of the user device 300 so that an image of the user is obtained (e.g., to capture a user profile image such as profile image 632 of FIG. 6E). In some embodiments, a communication provided by the user device includes an image and or video captured by the optical sensor 368 (e.g., the communication includes a video feed or an image such as a picture).

In some embodiments, the memory 307 of the user device 300 stores:
- an operating system 302 that includes procedures for handling various basic system services;
- an electronic address 304 associated with the user device 300;
- a communication application 222 providing access to a platform for providing and receiving a plurality of communications, as well as analysing a characteristic of a communication;
- a GPS driver 330 that provides a current location of the user device 300;
- an audio driver 332 that provides audible sounds through the user device 300; and
- an imaging module 334 that provides image and video capture capabilities.

As illustrated in FIG. 3, a user device 300 preferably includes an operating system 302 that includes procedures for handling various basic system services. The operating system 302 (e.g., iOS, ANDROID, DARWIN, RTXC, LINUX, UNIX, OS X, WINDOWS, or an embedded operating system such as VxWorks) includes various software components and or drivers for controlling and managing general system tasks (e.g., memory management, storage device control, power management, etc.) and facilitates communication between various hardware and software components.

An electronic address 304 is associated with each user device 300, which is utilized to at least uniquely identify the user device from other devices and components of the integrated system 100. In some embodiments, the user device 300 includes a serial number, and optionally, a model number or manufacturer information that further identifies the device 300. In some embodiments, the electronic address 304 associated with the user device 300 is used to provide a source of a communication received from and/or provided to the user device 300.

A component of the user device 300 is the communication application 222 (e.g., a communication application of FIG. 6A through FIG. 12). In some embodiments, the communication application 222 includes a communication store 310 configured to store a plurality of communications associated with a user of the user device 300 (e.g., communications 602 of FIG. 6A through 6E). While the communications consume storage of the user device 300, having one or more communications stored on the user device allows the user device to determine a characteristic of a communication if communication ceases with the communications network 106. However, the present disclosure is not limited thereto. For instance, in some embodiments the communications are stored remotely in order to optimize data storage on the user device 300.

In some embodiments, the communication application 222 includes a characteristic analysis module 312 that analyzes a characteristic of a communication. In some embodiments, the characteristic analysis module 312 provides a characteristic of a communication passively (e.g., as a communication is provided by a user such as characteristics 800-1 and/or 800-2 of FIG. 8A, characteristic 800-3 or 800-4 of FIG. 8B, etc.), such that the system 100 provides the characteristic receiving a command (e.g., input) from the user to analyze the communication. Similarly, in some embodiments, the characteristic analysis module 312 provides a characteristic of a communication actively, such that a user commands the system to provide a characteristic of a communication (e.g., sentiment tab 704 of FIG. 706, analyze mechanism 920 of FIG. 9C, refresh mechanism 1002 of FIG. 10A, etc.).

In some embodiments, the communication application 222 includes a communication input module 314, which facilitates receiving one or more communications from a source such as the input 378 or another mechanism (e.g., upload a communication from memory of the user device 300). In some embodiments, the user of the user device 300 specifies the source (e.g., provides one or more sources such as social media applications 1202 of FIG. 12) for receiving a communication. In some embodiments, the communication input module 314 polls for one or more communications from a source (e.g., a remote server) on a recurring basis (e.g., every minute, every hour, every six hours, every twenty-four hours, as specified by a user of the user device 300, etc.).

In some embodiments, the user device 300 includes a GPS driver 330. The GPS driver 330 utilizes data from the GPS 372 providing a current location of the user device 300. In some embodiments, the current location of the user device 300 includes one or more GPS coordinates of the user device 300 (e.g., a latitude coordinate and/or a longitude coordinate), an elevation coordinate of the user device, a tolerance of the current location (e.g., within a range of 65 seconds of a provided GPS coordinate), or a combination thereof.

In some embodiments, the user device 300 has any or all of the circuitry, hardware components, and software components found in the system depicted in FIG. 3. In the interest of brevity and clarity, only a few of the possible components of the user device 300 are shown to better emphasize the additional software modules that are installed on the user device.

Figure 4:
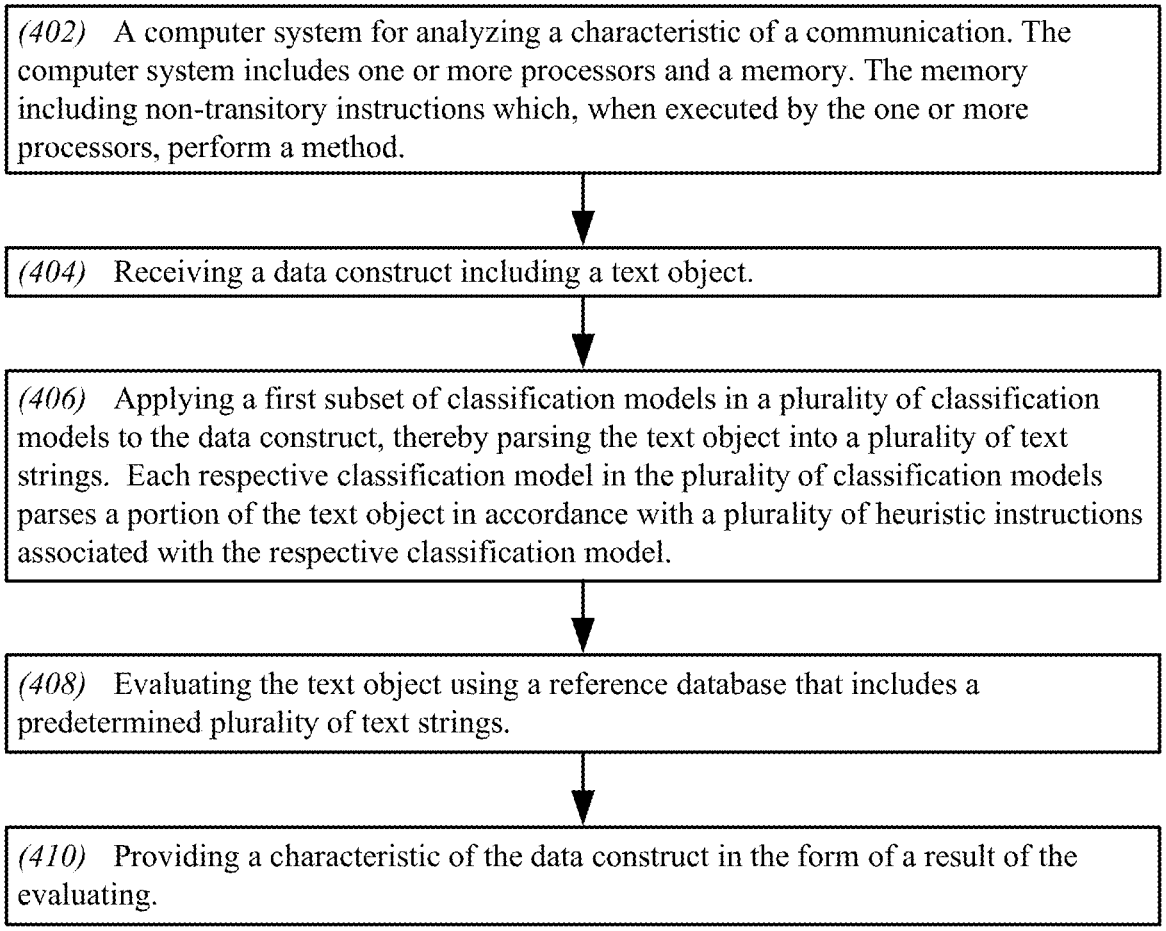
FIG. 4 provides a flow chart of processes and features of a computer system for analyzing a characteristic of a communication, in accordance with an exemplary embodiment of the present disclosure.

Now that details of an integrated system 100 for providing a characteristic analysis of a communication system have been disclosed, details regarding a flow chart of processes and features for implementing a method 400 of the system, in accordance with an embodiment of the present disclosure, are disclosed with reference to FIG. 4.

Block 402. Referring to block 402 of FIG. 4, a computer system (e.g., system 100 of FIG. 1) for analyzing a characteristic of a communication is provided. The computer system includes one or more processors (e.g., CPU 274 of FIG. 2) and a memory (e.g., memory 290 and/or 192 of FIG. 2). The memory including non-transitory instructions which, when executed by the one or more processors, perform a method 400.

Block 404. Referring to block 404, the method includes receiving a data construct (e.g., communication 600-1 of FIG. 6A, communication 602-1 of FIG. 6B, etc.) including a text object. Data constructs of the present disclosure includes various forms of data used for communicating information. In some embodiments, a communication includes a document (e.g., a paper document that is scanned to form an electronic document, or an electronic document such as a word document) that includes one or more text characters (e.g., text strings) which form the text object. For instance, a word document is a type of a communication, with the underlying data of the word document forming a data construct and the text within the word document forming a text object of the data construct. As another example, a recorded phone conversation is another type of a communication, with the transcribed text of the phone conversation and/or the audio data portion of the conversation forming a data construct, and the transcribed text of the phone conversation forms a text object of the data construct.

Figure 6A:
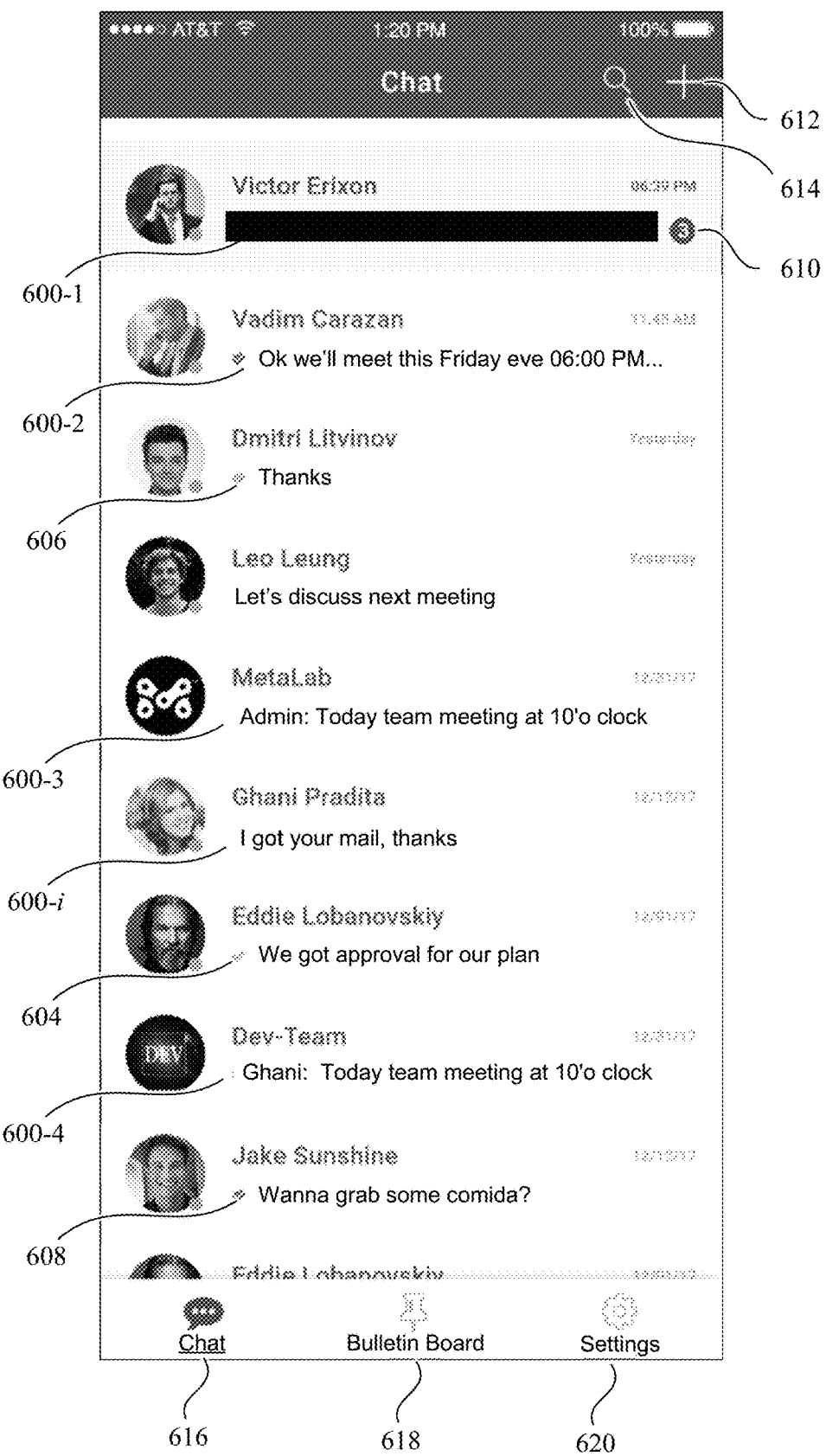
FIGS. 6A, 6B, 6C, 6D, and 6E illustrate user interfaces for providing communications, in accordance with exemplary embodiments of the present disclosure.
Figure 6B:
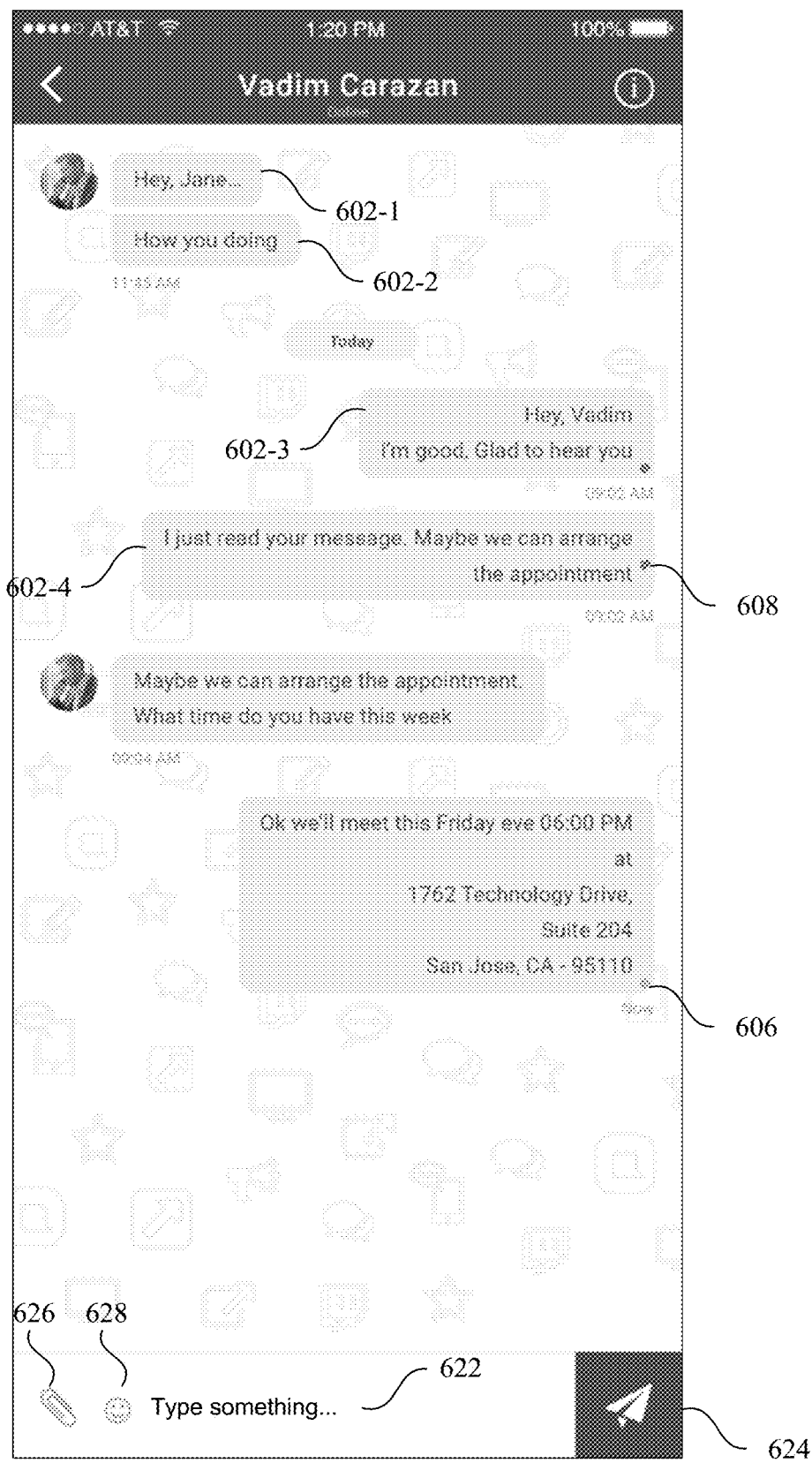
Figure 7:
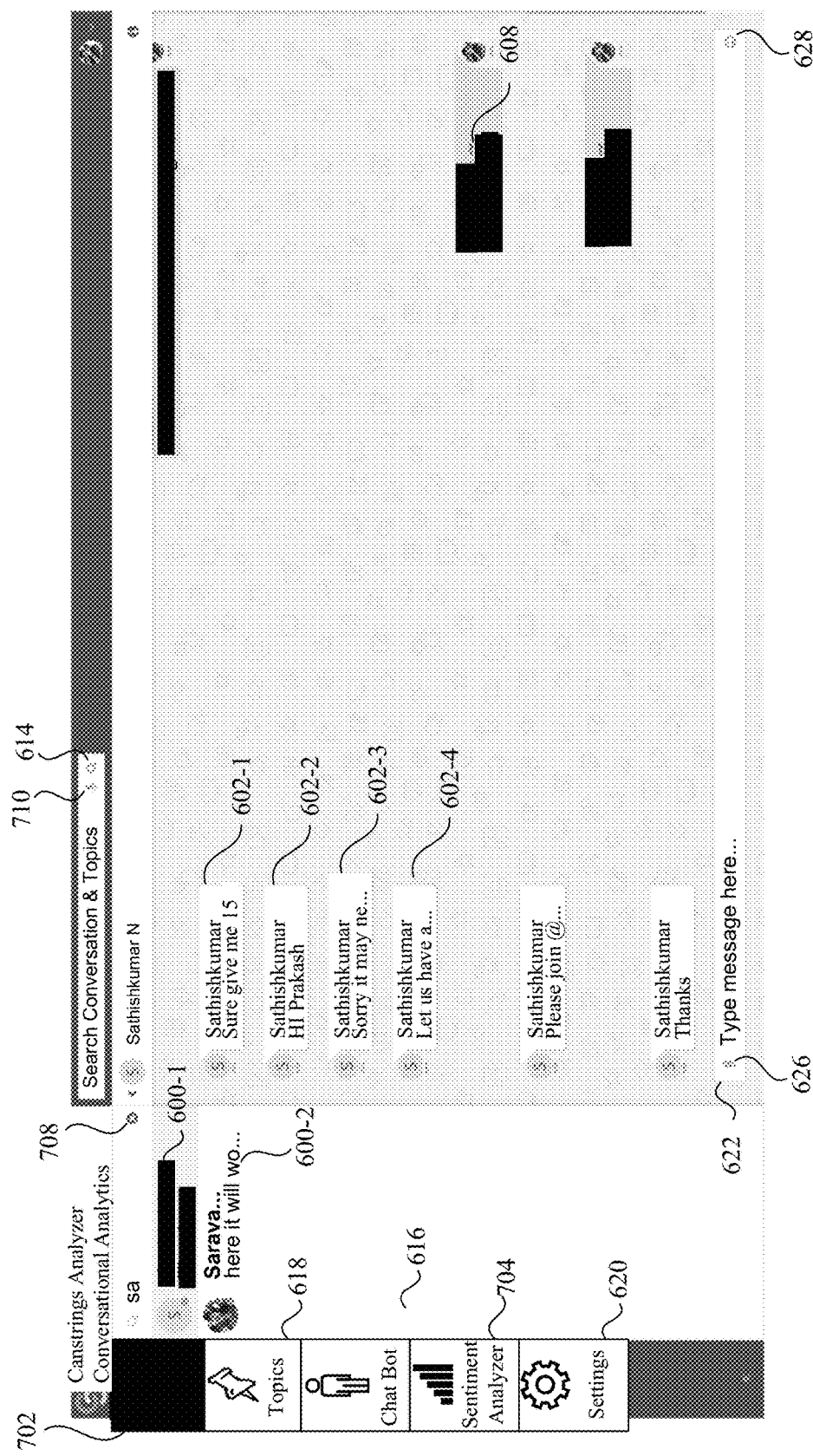
FIG. 7 illustrates another user interface for providing communications, in accordance with an exemplary embodiment of the present disclosure.
Figure 9A:
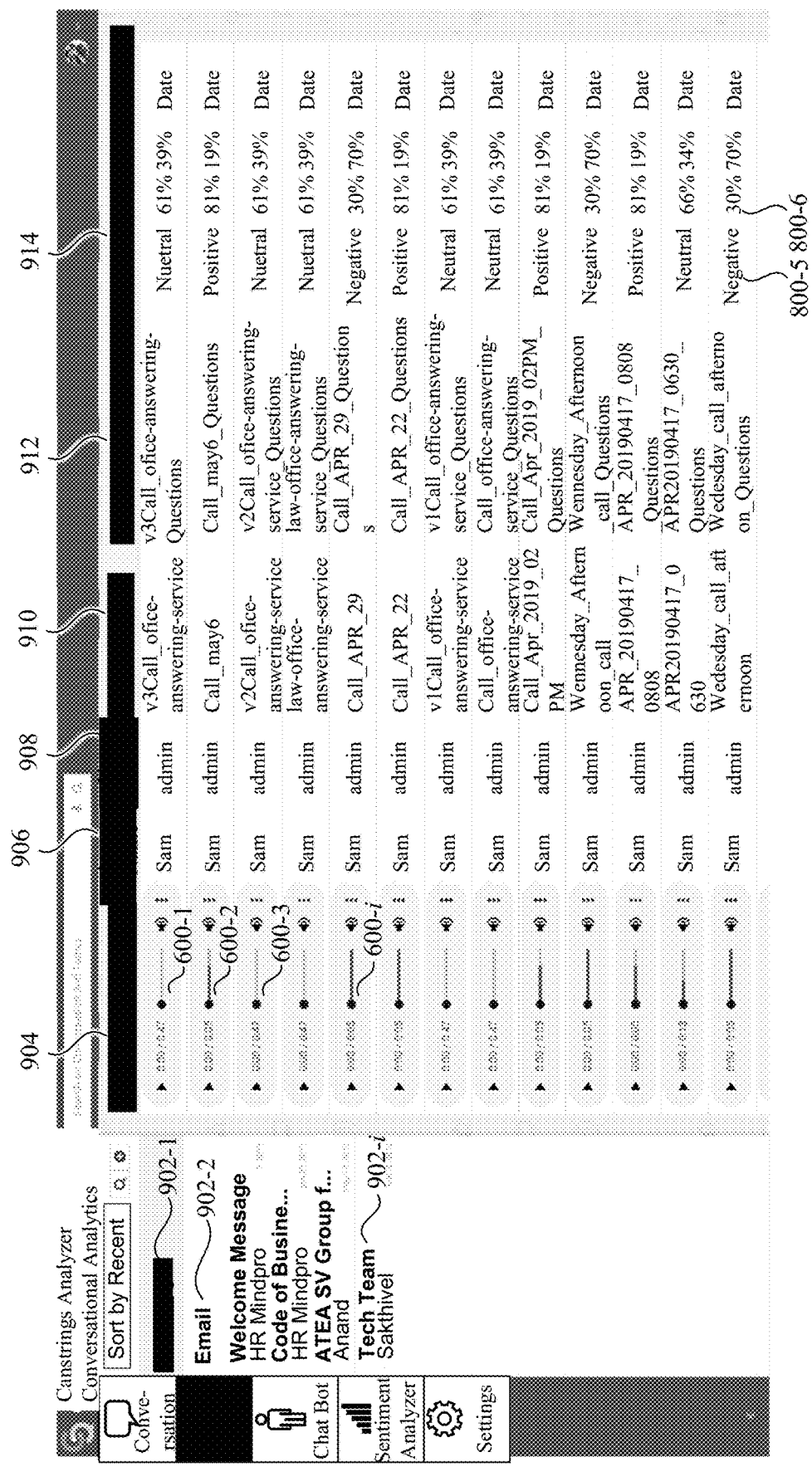

In some embodiments, the data construct is derived from a communication (e.g., communication 600-1 of FIG. 7, communication 602-1 through communication 602-4 of FIG. 7, conversation 600-1 through conversation 600-*i* of FIG. 9A, etc.). Communications of the present disclosure include a variety of mechanisms for exchanging information (e.g., communicating) either through verbal forms (e.g., spoken communications), written (e.g., transcribed communications), and, in some embodiments, visual forms (e.g., graphical communications such as ideograms). These mechanisms of communicating include text based documents (e.g., PDF's, word documents, spreadsheets, etc.,) and online platforms (e.g., communication application 222 of FIG. 3, communication 600-1 of FIG. 6A, communication 602-1 of FIG. 6B, social media feeds, text messages, online forums, blogs, review websites, etc.).

In some embodiments, the data construct is received directly from a user of a user device 300. For instance, in some embodiments, the user uploads a communication (e.g., a word document, an audio file, a spreadsheet, etc.) or provides a uniform resource locator (URL) associated with a communication to the characteristic analysis system (e.g., characteristic analysis system 200 of FIG. 2), allowing the user to easily provide a large number of communications. In some embodiments, the receiving the data construct from the user includes inputting a communication provided by the user through an input field (e.g., text entry region 622 of FIG. 6D).

Furthermore, in some embodiments, the method 400 is conducted concurrently as a user provides a communication through an input field (e.g., in real time). This concurrent conducting allows the user to alter the communication depending on a provided characteristic of the communication, such as changing the language of the communication if the provided characteristic is a negative sentiment. Similarly, in some embodiments the method 400 is conducted after the user provides the communication (e.g., after a predetermined period of time such as two seconds, after the user enters 624 the data construct, etc.).

In some embodiments, the data construct is received from a remote server or database. These remote servers or databases include a social media platform host server, an Email server, and the like (e.g., social media applications 1202 of FIG. 2). This remote receiving allows a user, such as a large entity, to communicate a large number of communications to the characteristic analysis system 200 in large quantities (e.g., terabytes worth of communication data, tens of thousands of communications) that can be used as a basis for a training data set (e.g., reference text 214 of reference database 212 of FIG. 2), as well as reducing storage requirements for a user device 300.

In some embodiments, the data construct includes audio data (e.g., communication 600-1 including audio 904 of FIG. 9A). In some embodiments, this audio data includes a voice message or a recording (e.g., received through communication network 106 via user device 300, received through microphone 362 of FIG. 3, etc.), a telephone conversation such as a recorded support center conversation, an audio portion of a video file, and the like. The audio data must be converted into a machine-readable format for the classification models 208 to parse the data construct. Accordingly, in some embodiments, the audio data is transcribed into a text object (e.g., transcribed using audio preparation module 218 of FIG. 2), which can allow for the information included in the audio data to be parsed by the classification models 208. This transcribing allows for providing a characteristic of a communication in audio form, which can be particularly important for a user associated with a large entity since these large entities typically have thousands of recorded support phone calls that can provide valuable information related to the opinions of consumers.

In some embodiments, the text object includes an ideogram. Ideograms of the present disclosure include an image-based emoticon (e.g., an emoji, a graphic symbol, etc.), a text based emoticon, or a combination thereof. Text based emoticons include an American Standard Code for Information Interchange (ASCII) emoticon and ASCII art such as the ASCII bunny shown below:

(\_/)
(='.'=)
(")_(").

Due to the increasing popularity of ideograms in communications, properly knowing the context of a communication without understanding how an ideogram is associated with the communication is difficult to determine for an external observer unassociated with the communication (e.g., the characteristic analysis system 200). Consider a communication with a text object and text string of "I bought a new air conditioning unit at the store last week; it's broken now ☺ . Please call me for advice if you want to buy an air conditioner." The ideogram "☺" in this text object misleads a conventional analysis of the context and subjectivity of the communication since the information provided in the communication is a negative review of air conditioner purchase but the ideogram, conventionally, provides a positive sentiment. The sarcasm of the ideogram is lost without having proper context of the communication. Accordingly, a training set of data (e.g., reference text 214) provides exemplary context to the characteristic analysis system 200 in analyzing the text object and ideogram by providing reference text 214 providing a characteristic of the same or similar ideograms. This allows the characteristic of the ideogram is identified. With respect to the ASCII bunny art shown above, even though the art is spread across more than one line of text the characteristic analysis system 200 is capable of understanding an implementation (e.g., the existence) of the art and the context on the communication it imparts.

In some embodiments, receiving the data construct includes formatting the data construct in accordance with a standardized format, such as the JSON format (e.g., providing the data construct to the data preparation module 216 of FIG. 2). This formatting allows for seamless input into the classification models 208 regardless of a source of a communication. For instance, in some embodiments a first data construct is provided as a PDF document, a second data construct is provided as a recorded telephonic conversation, and a third data construct is provided as a Hypertext Markup Language (HTML) electronic mail (Email). This seemly input is particularly useful for users that collect various communications in a form of unstructured text objects over a period of time, which form the reference text 214 of the training set of data. Accordingly, the system 100 formats each of the data constructs into the standard format before applying the one or more classification models 208 to the data construct. In some embodiments, formatting the data construct is in accordance with more than one standardized format (e.g., the data construct is formatted in a first standardized format, a second standardized format, or both). For instance, in some embodiments the data construct is formatted in a first format for application with a first classification 208-1, and is further formatted in a second format for application with a second classification model 208-2.

In some embodiments, a communication between one or more users associated with the integrated system 100 is utilized to derive the data construct (e.g., conversation 600-2 of FIG. 6A forms a data construct). For instance, in some embodiments the communication includes some or all of a social media communication feed (e.g., a post and/or a comment on the post of a social media profile associated with a user, such as a thread on a forum). In some embodiments, the communication includes an Email communication provided by and/or received by a user. In some embodiments, the communication includes a telephonic communication (e.g., a phone call, a voice message, etc.). Telephonic communications include a conversation between a plurality of users (e.g., a group conference call), a conversation between a first user and an automated system (e.g., a chat bot such as chat bot tab 702 of FIG. 7), and a conversation between a plurality of users and an automated system (e.g., a group conference including a chat bot, a conversation between a first user and a chat-bot that is redirected to a second user by the chat-bot, etc.).

Furthermore, in some embodiments, the communication includes a document such as a comma-separated values document (e.g., a CSV file format), a spreadsheet document (e.g., an XLS file format), a text document (e.g., a .txt file format, a .docx file format, an .xml file format, an .odf file format, etc.), a portable document (e.g., PDF file format), or the like. In some embodiments, the communication, and therefore, optionally, the data construct derived from the communication, includes an image (e.g., a .jpeg or a .png file format) document, or an image within another document. In some embodiments, the image provides no information regarding an underlying context of the communication and is excluded in evaluating and providing a characteristic of the communication. In some embodiments, an image includes an object including a text string of one or more text characters within the image (e.g., a review of a hotel superimposed on an image of the hotel). In preparing the communication, the text string is read (e.g., extracted) from the communication and the classification models 208 are applied to the text string. Accordingly, the systems and methods of the present disclosure are capable of receiving communications in a variety of formats and deriving a data construct from the respective communication for further processing (e.g., parsing and/or evaluating).

Figure 12:
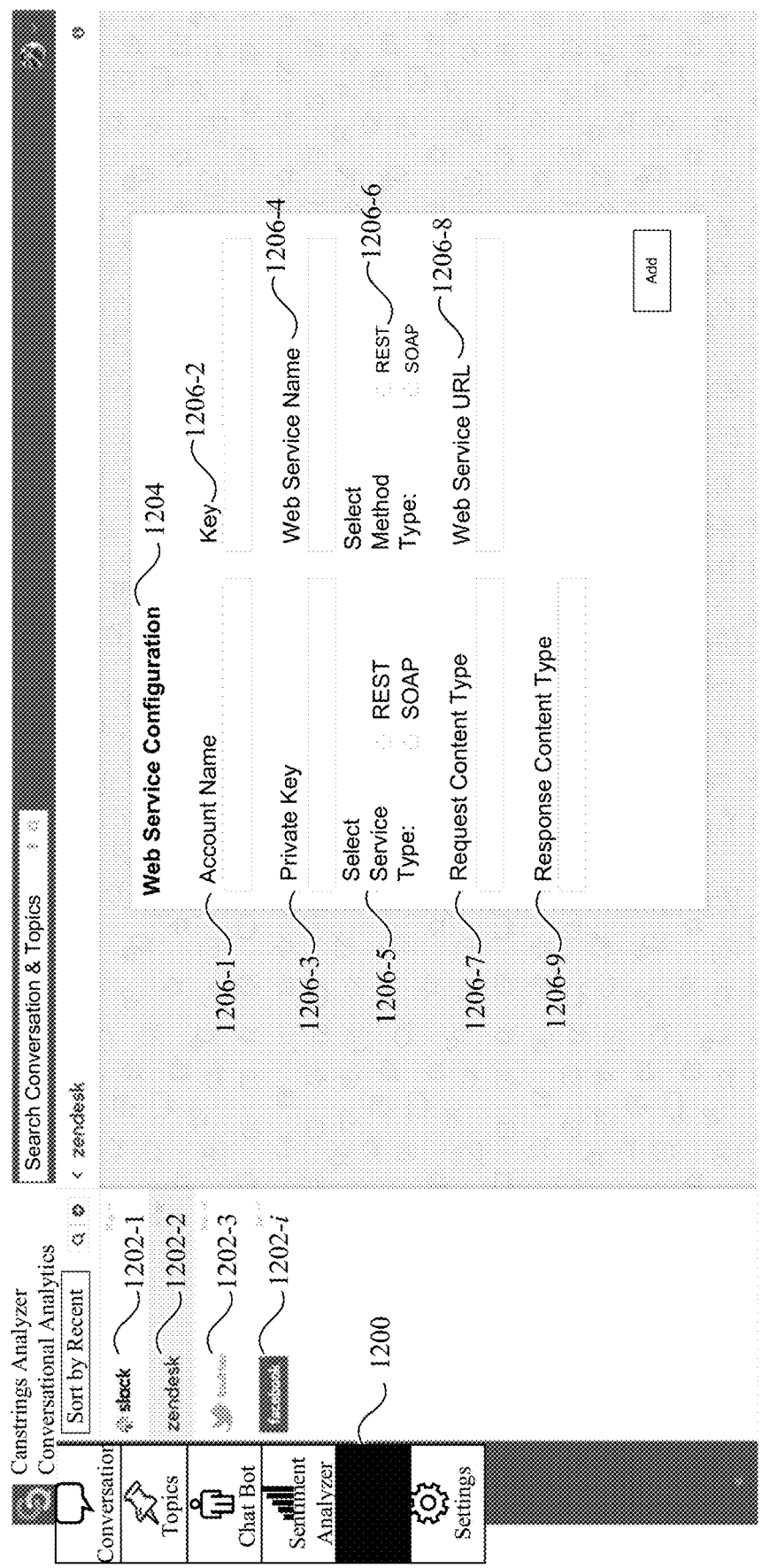
FIG. 12 illustrates a user interface for receiving a communication from a remote communications platform, in accordance with an exemplary embodiment of the present disclosure.

In some embodiments, receiving a data construct includes determining a source of the data construct. As previously described, sources of data constructs include user devices 300, remote servers (e.g., social media applications 1202 of FIG. 12), and other describe components of the system 100. In some embodiments, the source of the data construct is identified through an identifier (e.g., electronic address 304 of FIG. 3) associated with the source of a communication including the data construct. In some embodiments, the source of the data construct is identified through data included in the communication (e.g., data of a web service configuration 1204 of FIG. 12). Identifying a source of a data construct allows the system 100 to determine what subset of classification models 208 to apply for determining a characteristic of a communication from the source and/or which set of reference text 214 (e.g., training data set) should be used or learned from (e.g., using a portion of a reference database 212 for evaluating). Identifying a source can also provide information for preparing a communication from the source (e.g., a first source, such as social media application 1202-1 of FIG. 12, provides one or more communications in a first format, a second source, such as social media application 1202-3 of FIG. 12, provides one or more communications in a second format, etc.).

Block 406.

Referring to block 406, the method further includes applying a first subset of classification models 208 to the data construct. This subset of classification models 208 parses the text object into a plurality of text strings. Each respective classification model 208 in the subset of classification models parses a portion (e.g., some or all) of the text object. For instance, in some embodiments, a first classification model 208-1 parses a first portion of the text object (e.g., a subjective portion of the text object), and a second classification model 208-2 parses a second portion of the text object (e.g., an objective portion of the text object). The portions of a text object include a subjective portion and/or an objective portion, a sentence portion in a paragraph, a first portion associated with a first user and/or a second portion associated with a second user, and the like. In some embodiments, a first classification model 208-1 parses a first portion of the text object and a second classification model 208-2 also parses the first portion of the text object (e.g., an objective portion of the text object), providing a higher degree of accuracy in the parsing of the first portion of the text object. In some embodiments, each respective classification model 208 parses the entirety of the text object.

In some embodiments, a text string of a text object includes a grammatical sentence (e.g., a subject and a predicate including conveying punctuation), a portion of one or more grammatical sentences (e.g., a phrase, a clause such as an independent clause and/or dependent clause, a quotation, an incomplete sentence, a word, etc.), two or more grammatical sentences (e.g., a paragraph including two or more grammatical sentences), or a combination thereof.

The parsing of the data construct is in accordance with a plurality of heuristic instructions 210 associated with the respective classification model 208. In some embodiments, the plurality of instructions 210 is further associated with a source of the data construct. For instance, in some embodiments a user provides a training set of data (e.g., a plurality of communications associated with the user such as reference text 214 of FIG. 2), which is used as a basis for training one or more of the classification models 208. Accordingly, one or more instructions 210 are provided and/or formed that dictate how to evaluate and provide a characteristic of a communication associated with the user.

In some embodiments, the classification models 208 include a supervised learning classification model such as a decision tree classification model, a rule based classification model, a linear classification model (e.g., a SVM classification model, a neural network classification model, etc.), a probabilistic classification model (e.g., Naïve Bayes classification model, Bayesian classification model, max entropy classification model), or a combination thereof. In some embodiments, the classification models 208 include an unsupervised learning classification model and/or a semi-supervised (e.g., hybrid) classification model. Furthermore, in some embodiments, the classification models 208 include a lexical based classification model such as a corpus based classification model (e.g., semantic based or statistical based) or a dictionary based classification model.

A decision tree classification model 208 is a supervised learning classification model that solves various regression and classification problems. The decision tree classification model 208 using one or more branching nodes associated with an attribute (e.g., a source, a text string, etc.) of an input (e.g., data construct) and leaf (e.g., end) nodes associated with a classification label (e.g., a characteristic such as a sentiment, an emotion, etc.). Evaluating and providing a characteristic of a communication using the decision tree classification model 208 includes starting at a root (e.g., base) of a decision tree. An attribute of the root is compared with the communication to evaluate a characteristic. The comparison continues through one or more intermediate (e.g., internal) nodes until a leaf node is reach to provide the characteristic. To select the attribute, in some embodiments, instructions 210 associated with the decision tree classification model 208 include a plurality of information gain (e.g., Gini index) instructions 210. The information gain instructions 210 estimate a distribution of the information included in each attribute. The information gain instructions 210 provide a metric of a degree of elements incorrectly identified. For instance, an information gain of zero (0) is considered perfect with no errors. To measure an uncertainty of a random variable (e.g., a text string or an ideogram of a text object), X is defined as an entropy, where:

$$H(X)=E_X[I(x)]=-\Sigma(p(x)\log p(x)).$$

In some embodiments, the decision tree classification model 208 is a binary classification having a positive and a negative class. If the classes of a data construct are all positive or all negative, the entropy is considered zero. If half of the classes are positive and the other half are negative, the entropy is considered to be one (1). Since the Gini Index is a mechanism to determine if a portion of the data construct is incorrectly analyzed, elements having an attribute with a lower relative Gini Index are preferred since a lower relative Gini Index relates to a higher accuracy in evaluating and providing a characteristic of a communication.

In some embodiments, a decision tree classification model 208 has an overfitting problem in accordance with a determination that the decision tree classification model goes deeper and deeper (e.g., higher order series of branches, meaning an increased number of internal nodes). To avoid this overfitting problem, in some embodiments, the instructions 210 of the decision tree classification model 208 includes one or more pre-pruning instructions and/or one or more post-pruning instructions. These pre-pruning instructions and post-pruning instructions 210 reduce a number of branches within the decision tree of the decision tree classification model 208. Furthermore, these pre-pruning instructions and post-pruning instructions 210 allow the decision tree classification model 208 to cease tree growth and cross validate data, increasing an accuracy for evaluating and providing a characteristic of a communication.

Utilizing a decision tree classification model 208 requires less processing time for evaluating and providing a characteristic of a communication. Furthermore, the decision tree classification model 208 is not affected if a non-linear relationship exists between different parameters of the classification evaluation. However, in some embodiments, the decision tree classification model 208 has difficulty handling non-numeric data, and small change in the data (e.g., evolution of a language such as a new slang term) may lead to a major change in the tree structure and logic.

In some embodiments, the neural network classification model 208 includes a convolutional neural network (CNN) and/or a region-convolutional neural network (RCNN). In some embodiments, the neural network classification model 208 includes an inter-pattern distance based (DistAI) classification model (e.g., a constructive neural network learning classification model).

In some embodiments, the inter-pattern distance based classification model 208 includes a multi-layer network of threshold logic units (TLU), which provide a framework for pattern (e.g., characteristic) classification. This framework includes a potential to account for various factors including parallelism of data, fault tolerance of data, and noise tolerance of data. Furthermore, this framework provides representational and computational efficiency over disjunctive normal form (DNF) expressions and the decision tree classification model 208. In some embodiments, a TLU implements an (N−1) dimensional hyperplane partitioning an N-dimensional Euclidean pattern space into two regions. In some embodiments, one TLU neural network sufficiently classifies patterns in two classes if the two patterns are linearly separable. Compared to other constructive learning classification models 208, the inter-pattern distance based classification model 208 uses a variant TLU (e.g., a spherical threshold unit) as hidden neurons. Additionally, the distance based classification model 208 determines an inter-pattern distance between each pair of patterns in a training data set (e.g., reference text 214 of FIG. 2), and determines the weight values for the hidden neurons. This approach differs from other classification models 208 that utilize an iterative classification process to determine the weights and thresholds for evaluating and providing a characteristic of a communication.

In some embodiments, the distance based classification model 208 utilizes one or more types of distance metric to determine the inter-pattern distance between each pair of patterns. For instance, in some embodiments, the distance metric is based on those described in Duda et al., 1973, "Pattern Classification and Scene Analysis," Wiley, Print., and/or that described in Salton et al., 1983, "Introduction to Modern Information Retrieval," McGraw-Hill Book Co., Print, each of which is hereby incorporated by reference in their entirety. Table 1 provides various types of distance metrics of the distance based classification model 208.

Table 1. Exemplary distance metrics for the distance based classification model 208. Consider $X^p=[X_1^p, \ldots, X_n^6]$ and $X^q=[X_1^p, \ldots, X_n^q]$ to be two pattern vectors. Also consider $\max_i$ and $\min_i$ to be the maximum value and the minimum value of an $i^{th}$ attribute of the patterns in a data set (e.g., a text object and/or a text string), respectively. The distance between $X^p$ and $X^q$ is defined as follows for each distance metric:

| Type | Distance Metric |
| --- | --- |
| Euclidean | $d(X^p, X^q) = \sqrt{\sum_{i=1}^{n}(X_i^p - X_i^q)^2}$ |
| Manhattan | $d(X^p, X^q) = \sum_{i=1}^{n}|X_i^p - X_i^q|$ |
| Maximum Value | $d(X^p, X^q) = \mathrm{argmax}_i |X_i^p - X_i^q|$ |
| Normalized Euclidean | $d(X^p, X^q) = \sqrt{\frac{1}{n}\sum_{i=1}^{n}\left(\frac{X_i^p - X_i^q}{\max_i - \min_i}\right)^2}$ |
| Normalized Manhattan | $d(X^p, X^q) = \frac{1}{n}\sum_{i=1}^{n}\frac{|X_i^p - X_i^q|}{\max_i - \min_i}$ |
| Normalized Maximum Value | $d(X^p, X^q) = \mathrm{argmax}_i \frac{|X_i^p - X_i^q|}{\max_i - \min_i}$ |
| Dice Coefficient | $d(X^p, X^q) = 1 - \frac{2\sum_{i=1}^{n}X_i^p X_i^q}{\sum_{i=1}^{n}X_i^{p2} + \sum_{i=1}^{n}X_i^{q2}}$ |
| Cosine coefficient | $d(X^p, X^q) = 1 - \frac{\sum_{i=1}^{n}X_i^p X_i^q}{\sqrt{\sum_{i=1}^{n}X_i^{p2} \cdot \sum_{i=1}^{n}X_i^{q2}}}$ |
| Jaccard coefficient | $d(X^p, X^q) = 1 - \frac{\sum_{i=1}^{n}X_i^p X_i^q}{\sum_{i=1}^{n}X_i^{p2} + \sum_{i=1}^{n}X_i^{q2} - \sum_{i=1}^{n}X_i^p X_i^q}$ |

Additional details and information regarding the distance based classification model 208 can be learned from Yang et al., 1999, "DstAI: An Inter-pattern Distance-based Constructive Learning Algorithm," Intelligent Data Analysis, 3(1), pg. 55.

Distance based classification model 208 use of one or more spherical threshold neurons in a hidden layer to determine a cluster of patterns for classification by each hidden neuron, allowing the distance based classification model to have a higher accuracy and an improved processing performance in evaluating and providing a characteristic of a communication as compared to other classification models. This improved performance holds particularly true for large data sets, such as those provided as reference text 214. If the distance based classification model 208 is trained using reference text 214, a processing time shortens for evaluating and providing a characteristic of a communication to other classification models. However, the distance based classification model 208 requires maintenance of an inter-pattern distance matrix during the training of the classification model. Additionally, the distance based classification model 208 consumes more memory (e.g., memory 192 and/or 290 of FIG. 2, memory 307 of FIG. 3, etc.) compared to other classification models due to the large data set sizes associated with the distance based classification model.

In some embodiments, the Bayesians Network classification model 208 includes one or more attribute node (e.g., characteristic node), that each lack a parent node except a class node. Furthermore, all attributes are independently given a value of a class variable. The Bayesian theorem provides a mechanism for optimally predicting a class of a previously unseen example data (e.g., a communication provided by a user). A classifier is a function assigning a class label to a text object and/or text string. Generally, a goal of learning classification models 208 is to construct the classifier for a given set of training data (e.g., reference text 214 of FIG. 2) with a class label.

For instance, consider E to represent a sequence element of attribute values $(x_1, x_2, \ldots, x_n)$, where $x_i$ is a value of an attribute $X_i$, consider C to represent a classification variable, and consider c to represent a value of C. If an assumption is made that both positive (+) or negative (−) classes exist (e.g., a positive sentiment and a negative sentiment), a probability of an example data $E=(x_1, x_2, \ldots, x_n)$, being of a class c is:

$$p(c\,|\,E) = \frac{p(E\,|\,c)p(c)}{p(E)}.$$

E is classified as the class C=+ if and only if $$f_b(E) = \frac{p(C=+\,|\,E)}{p(C=-\,|\,E)} \geq 1,$$

wherein $f_b(E)$ is a Bayesian classifier. Furthermore, in some embodiments, if all attributes are assumed independent values of the class variable then $p(E|c)=p(x_1, x_2 \ldots, x_n|c)=\Pi_{i=1}^{n}p(x_i|c)$, and a resulting classifier is $$f_{nb}(E) = \frac{p(C=+)}{p(C=-)} = \prod_{i=1}^{n} \frac{p(x_i\,|\,C=+)}{p(x_i\,|\,C=-)},$$

with $f_{nb}(E)$ being a Naïve Bayes classifier.

Naïve Bayes classification models 208 are typically simple to implement and have a fast processing time. This improved performance is due in part to Naïve Bayes classification models 208 requiring less extensive set of training data (e.g., reference text 214 of FIG. 2), and performing well with binary (e.g., a positive sentiment or a negative sentiment characteristics) and multi-class (e.g., emotional characteristics) classifications. In some embodiments (e.g., if the Naïve Bayes conditional independent assumptions holds), the Naïve Bayes classification models 208 provides improved performance and accuracy in predicting a characteristic of a communication as compared to a logistic regression discriminative classification model. Furthermore, memory (e.g., memory 290 and/or 192 of FIG. 2, memory 307 of FIG. 3, etc.) and CPU (e.g., CPU 274 of FIG. 2, CPU 392 of FIG. 3, etc.) utilizations are modest to run the classification model since the operations are not required to hold the whole data set in the memory of the system 100.

In some embodiments, the Support Vector Machine (SVM) classification model 208 provides classification and/or regression evaluation processes. The SVM classification model 208 is a supervised learning classification model and primarily utilized in classification processes. Generally, a binary classification model 208 is given a pattern x drawn from a domain X. The binary classification model 208 estimates which value an associated binary random variable, considering $y \in \{\pm 1\}$, will assume. For instance, given pictures of apples and oranges, a user might want to state whether the object in question is an apple or an orange. Equally well, a user might want to predict whether a homeowner might default on his loan, given income data, credit history, or whether a given Email is junk or genuine.

The Support Vector Machine (SVM) classification model 208 performs classification for determining a characteristic of a communication by finding a hyperplane that maximizes a margin between two respective classes of characteristics. Accordingly, the support vector is the vectors that define the hyperplane. In other words, SVM classification is the partition that segregates the classes. A vector is an object that has both a magnitude and a direction. In geometrical term, a hyperplane is a subspace whose dimension is one less than that of its ambient space. If a space is in 3-dimensions then a hyperplane is a plane, if a space is in 2-dimensions then a hyperplane is a line, if a space in one dimension then a hyperplane is a point, and the like.

Often, a communication includes objective language, which typically is unbiased and not influenced by opinion, and/or subject language, which express opinion and judgement. Accordingly, in some embodiments, parsing the text object to determine objective language within the text object and/or subject language within the text box is useful to increase accuracy of determining a characteristic of the text object. Thus, in some embodiments, facts and information are evaluated from the objective language of the text object, and sentiment and/or emotion are evaluated from the subjective language of the text object.

In some embodiments, parsing the text object into one or more text strings further includes applying a pattern matching classification model 208, such as a keyword analysis classification model and/or a simple parsing classification model. In some embodiments, the pattern matching classification model 208 includes parsing the text object on a sentence-by-sentence basis or a word-by-word basis to determine a part-of-speech (e.g., a clause, a verb, a noun, a pronoun, an adverb, a preposition, a conjunction, an adjective, an interjection, etc.) of the portion of the text object. Knowing the part-of-speech of the portion of the text object provides a grammatical description of the portion of the text, aiding in the evaluating and providing of a characteristic of a communication. Furthermore, knowing the part-of-speech of the portion of the text object allows for the system 100 to exclude trivial portions of the text object while evaluating and providing the characteristic of the communication, improving processing performance of the system 100. In some embodiments, the trivial portions of the text object include an article, a preposition, a conjunction, a verb (e.g., a linking verb), or a combination thereof.

In some embodiments, the parsing of the text object into one or more text strings further includes applying a semantic analysis classification model 208. The semantic analysis classification model 208 provides various natural language processes for evaluating and providing a characteristic of a communication. These tasks include determining a synonym of a word in the text object and/or the one or more text strings, translating a first language into a second language, a question and answer systems, and the like. In some embodiments, a portion of a text string includes a slang word or a word that would provide improved context to a communication of the text string if substituted with a different word. Consider the text string of "To keep my room cool, I bought a cool new air condition machine at the local store last week." The word "cool" in the above text string is utilized as both a slang word meaning good, and as a conventional definition of the word meaning a low temperature. Accordingly, the system 100 can substitute and/or comprehend the implementation of the slang of the word "cool" to mean good, aiding in an evaluating and providing of a characteristic.

Block 408. Referring to block 408, the method further includes evaluating the text object. In some embodiments, the evaluating the text object includes using a reference database (e.g., reference database 212 of FIG. 2), which stores a plurality of text strings (e.g., reference text 214 of FIG. 2). In some embodiments, the text strings 214 stored in the reference database are predetermined (e.g., provided as a training set of data), allowing the evaluating of the text object to be tailored to the predetermined reference text 214. In some embodiments, a portion of the reference text 214 derives from a previously provided characteristic of a communication (e.g., once a characteristic of a communication is provided, the result of the evaluation is stored in the reference database 212, further improving the classification models 208). Storing a previously analyzed communication within the reference database 212 increases an accuracy of the classification models 208 and builds a larger training set of data for future implementations, which is useful to generate data sets related to characteristics of communications. In some embodiments, a portion of reference 2121 associated with a source of the communication is utilized in evaluating and providing the characteristic of the communication. Furthermore, in some embodiments, evaluating the text object includes evaluating each text string of the parsing of the text object, or one or more text strings of the parsing of the text object. For instance, in some embodiments, one or more text strings of a text object is not pertinent in evaluating and providing a characteristic of a communication, and is thus excluded in evaluating the characteristic of the communication.

In some embodiments, the evaluating of the text object is based the objective language in the text object, the subjective language in the text object, or a combination thereof. In some embodiments, the evaluating the text object includes determining a polarity of the text object and/or each of the text strings. The polarity provide a metric of conflicts within the text object and/or each of the text strings. For instance, a text string of "The product is great but the salesperson is terrible," has a high polarity since the text string includes both a positive statement and a negative statement. In some embodiments, the polarity is utilized to determine a weight of the positive statement and the negative statement (e.g., the positive statement has a large impact on the context of the text than the negative statement, and there the characteristic is a positive sentiment or a neutral sentiment). In some embodiments, if the polarity satisfies a threshold polarity, the system 200 reapplies the one or more classifications to the text associated with the satisfying polarity to further parse the text (e.g., further parse the text string having the positive and the negative statements into a first text string of the positive statement and a second text string of the negative statement). The subjective language refers to text that conveys a user's judgement through personal opinions and emotions, instead of various external influences, while expressing the emotion, opinion, judgement, and/or speculation of the user. In some embodiments, the subject language in a communication is utilized for as a personal review, and can include biased information. Accordingly, in some embodiments, the evaluating of the subjective language provides an emotion characteristic of the communication. However, the objective language includes unbiased information that is not influenced by an opinion of the user. Accordingly, in some embodiments, the evaluating of the objective language provides factual information included in the communication.

In some embodiments, the evaluating includes using a subset of classification models and the reference database. In some embodiments, the subset of classification models of the evaluating is different from the subset of classification models of the parsing (e.g. a first subset of classification models for parsing the data construct and a second subset of classification models for evaluating the parsed text object). In some embodiments, the first subset of classification models includes a number of classification models in a range of from 1 to 6 classification models. In some embodiments, the first subset of classification models includes 1, 2, 3, 4, or 5 classification models. In some embodiments, the second subset of classification models includes a number of classification models in a range of from 1 to 6 classification models. In some embodiments, the second subset of classification models includes 1, 2, 3, 4, or 5 classification models. In some embodiments, the evaluating includes determining a confusion matrix for one or more classification models.

Block 410. In some embodiments, the method further includes providing a characteristic of the data construct in the form of a result of the evaluating the text object (e.g., a result of block 408). In some embodiments, the characteristic of the data construct includes an emotion of the data construct, a sentiment of the data construct, or a combination thereof. In some embodiments, the emotion of the data construct is in the form of one or more emotions in a plurality of predetermined emotions. In some embodiments, the plurality of predetermined emotions include happiness, sadness, fear, disgust, anger, and surprise. In some embodiments, the plurality of predetermined emotions include admiration, adoration, aesthetic appreciation, amusement, anxiety, awe, awkwardness, boredom, calmness, confusion, craving, disgust, empathetic pain, entrancement, envy, excitement, fear, horror, interest, joy, nostalgia, romance, sadness, satisfaction, sexual desire, sympathy, and triumph. One of skill in the art may know of other emotions that implementable with the present disclosure but are not explicitly set forth herein.

In some embodiments, the sentiment of the data construct includes a positive sentiment, a neutral sentiment, a negative sentiment, or a combination thereof. For instance, in some embodiments, the sentiment of the data construct includes a combination or two or more sentiments (e.g., a positive sentiment and a negative sentiment combine to form a neutral sentiment, a positive sentiment and a negative sentiment combine to a sentiment that is weighted towards one of the positive sentiment or the negative sentiment, etc.).

Since emotion is a complex characteristic, in some embodiments, one emotion is insufficient to express the context of a communication. Accordingly, in some embodiments, the characteristic of the data construct is provided as a combination of two or more of the aforementioned forms of emotion, two or more of the aforementioned sentiments, or a combination thereof. In some embodiments, a result of the combination of two or more emotions and/or the combination of two or more sentiments is provided a gradient of the two or more emotions and/or the two or more sentiments. In some embodiments, the gradient is provided as a graphical representation of the combination (e.g., a bar with a first emotion at one end portion of the bar and a second emotion at a second end portion of the bar). In some embodiments, the gradient is provided as a percentage of the combination (e.g., 91% of a first emotion and 7% of a second emotion), such as the characteristics provided in column 914 of FIG. 9A. Furthermore, in some embodiments the gradient is provided in terms of one element and/or sentiment in the combination (e.g., 7% of a second emotion, 45% of a first sentiment, etc.). Furthermore, in some embodiments, the result includes the confusion matrix for one or more classification models. In some embodiments, the results includes a listing of keywords, features, and text from the parsing. For instance, in some embodiments the parsing determines one or more questions poised in the communication. Accordingly, in some embodiments the result includes a listing of a subset of the one or more questions. In some embodiments, as described supra, one or more classification models parse the text object according to keywords, features, parts of speech, or a combination thereof. Accordingly, in some embodiments, the result includes a listing of the keywords, features, parts of speech, or a combination thereof parsed (e.g. extracted) by the one or more classification models. In some embodiments, the result includes a listing of parsed subject language and/or parsed objective language. In some embodiments, the result includes a transcript of an audio portion of the communication.

In some embodiments, the combination of two or more emotions and/or two or more sentiments forms an emotion and/or sentiment that expresses the combination of the aforementioned characteristics. For instance, in some embodiments, a characteristic expressing the above combination includes amazed, amusement, animate, applause, atonement, beatitude, blissful, bounty, cheerful, complacent, content, convenience, decadence, delectation, desire, displeasure, drug, encourage, enthusiasm, epicurean, euphoric, exaltation, excellent, exultant, favorable, felicity, fulfillment, glad, hospitable, humorous, indulgent, inspire, intriguing, joy, mischievous, motivate, negotiation, patient, perform, pleasant, pleased, promise, prophecy, puckish, radiant, rapturous, relief, salvation, satisfied, selfish, sex, sin, treaty, wisdom, or a similar characteristic.

Accordingly, in some embodiments a user provides feedback (e.g., feedback 648 of FIG. 6E) regarding a provided characteristic of a communication. This user feedback is utilized to improve and fine-tune the classification models 208. For instance, if a user provides a communication with a characteristic known to the user and the system 100 provides a different characteristic, the user provides feedback correcting the different characteristic, improving future an evaluation of a communication.

In some embodiments, if a provided characteristic of a communication is a negative characteristic, such as a negative sentiment or an emotion associated with negatively (e.g., depressed, sad, disgust, etc.), a user associated with the communication is provided an alert of the negative sentiment. In some embodiments, the alert is provided as a portion of the provided characteristic (e.g., characteristic 800-1 of FIG. 8A which includes an alert that the provided characteristic of the communication 602-1 includes a negative (−ve) sentiment). Furthermore, in some embodiments, the characteristic is provided as a graphical representation of the characteristic (e.g., characteristic 800-2 of FIG. 8A, which provides information to the user that the communication 602-1 includes a negative characteristic).

Figure 5:
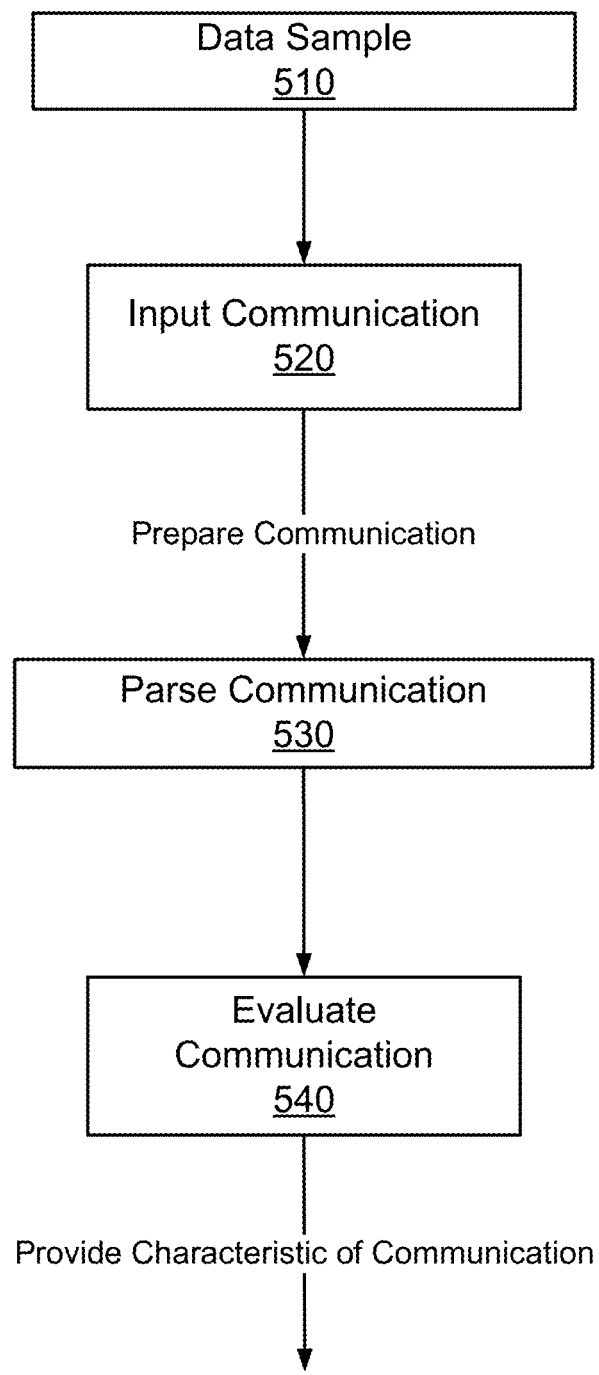
FIG. 5 provides a flow chart for a first example of analyzing a communication to determine a characteristic of the communication, in accordance with an exemplary embodiment of the present disclosure.

Referring to FIG. 5, a flow chart is provided for a first example of evaluating and providing a characteristic of a communication, according to an embodiment of the present disclosure. Note FIG. 5 provides a non-limiting, illustrate embodiment of a general case described using the system 100 to evaluate and provide a characteristic of a communication. However, in practice the process of FIG. 5 may include additional interstitial for follow on steps that may be conducted.

At step 510, a data sample of one or more text strings (e.g., reference text 214 of FIG. 2) is provided to generate a training set of data. This training set of data is applied to one or more classification models 208, forming a basis for evaluating a characteristic of a communication provided to the system 100. In some embodiments, a user providing the training set of data includes a predetermined characteristic for one or more text strings and/or one or more text objects in the training set of data, allowing the classification models 208 to tailor the evaluating to the predetermined characteristics provided by the user.

At step 520, a communication including a data construct is inputted for evaluation of a characteristic of the communication. Inputting of the communication includes one or more of the input mechanisms describe supra, such as an input 378 of a user device 300. This input includes a user drafting a communication through the user device (e.g., communication 602-1 of FIG. 8A), polling for a communication from a social media application (e.g., social media application 1202-3 of FIG. 12), and the like.

In some embodiments, once the communication is identified for evaluating a characteristic of the communication, the data construct of the communication is prepared for use by one or more classification models. The preparing includes converting text from a first format to a second format (e.g., from an unstructured text format to a structured text format, from a first file format to a second file format, etc.). Having a prepared version of the communication improves processing speeds for evaluating and providing a characteristic of the communication.

At step 530, the prepared communication (e.g., a prepared text object and/or a prepared text string of a text object) is applied to one or more classification models 208, which parse the prepared communication into one or more text strings. Each classification model 208 parses a portion (e.g., some or all) of the prepared communication in accordance with one or more instructions 210 associated with the classification model. In some embodiments, a classification model 208 is associated with a unique set of instructions 210, a subset of the classification models is associated with a unique set of instructions 210, or a combination thereof (e.g., each classification model 208 is associated with a unique set of first instructions 210-a and also associated with a second set of instructions 210-2 that is further associated with each classification model in a subset of classification models).

At step 540, one or more classification models 208 is applied to the parsed communication, providing an evaluation of the communication. In some embodiments, the evaluation of the communication includes a separate evaluation from each classification model 208 in the one or more classification models applied to the communication. In some embodiments, the separate evaluations from each classification model 208 in the one or more classification models are subsumed into a collective evaluation, which accounts for each separate evaluation. For instance, in some embodiments if a first classification model 208-1 provides a first characteristic for a communication, a second classification model 208-2 provides a second characteristic for the communication, and a third classification model 208-3 provides the first characteristic for the communication, the system 100 weights the first characteristic more than the second characteristic when providing a characteristic to a user.

Furthermore, in some embodiments step 530 and step 540, including optionally and preceding intermediate steps such as preparing the communication, are conducted in real time (e.g., passively) as the communication is inputted (e.g., a characteristic is provided for a communication that a user is actively writing). However, in some embodiments, step 530 and step 540 are conducted in accordance with a provided command (e.g., actively) from a user (e.g., sentiment tab 704 of FIG. 706, analyze mechanism 920 of FIG. 9C, refresh mechanism 1002 of FIG. 10B, etc.).

Referring to FIG. 6A through FIG. 13G, a variety of a graphical user interfaces (GUI) of a communication application (e.g., communication application 222 of FIG. 3) is shown according to an exemplary embodiment of the present disclosure. The GUIs in these figures are used to illustrate the processes described throughout the present disclosure. For sake of clarity, FIG. 6A through FIG. 13G simply show the display (e.g., an output of display 376 of FIG. 3) of the user device 300 without showing other details of the user device 300. In some embodiments, the GUIs in FIG. 6A through FIG. 13G include the following elements, or a subset or superset thereof: signal strength indicator(s) for wireless communications, such as cellular and Wi-Fi signals; time; a Bluetooth indicator; and a battery status indicator. These well-known elements are not described in detail so as not to unnecessarily obscure aspects of the disclosed embodiments. Furthermore, in some embodiments, one or more aspects of the illustrated GUI's of FIGS. 6A through 13G form a dedicated user interface or communication application 222. For instance, in some embodiments, the user interfaces of FIGS. 6A through 12 are associated with a first communication application 222-1 that provides a communication platform for an end-user of the user device 300. In some embodiments, the user interfaces of FIGS. 13A through 13G are associated with a second communication application 222-2 that provides an analysis platform for evaluating a characteristic of one or more communications.

Referring to FIGS. 6A through 6E, exemplary user interfaces for a communication application (e.g., communication application 222 of FIG. 3) are provided. In some embodiments, the user interfaces of FIGS. 6A through 6E are configured for use on a mobile type of a user device 300 (e.g., a smart phone, a tablet device, etc.).

Referring to FIG. 6A, a tab 616 of the user interface provides a listing of one or more communications 600 associated with the user of the user device 300. Each communication 600 is associated with one or more users, allowing the user of the user device 300 running the communication application 222 to communication with other such users (e.g., users 630 of FIG. 6C) or communicate with an automated communication system, such as a chat bot. In some embodiments, the communications 600 include a communication between a first user and a second user (e.g., communication 600-1 of FIG. 6A), between a plurality of users (e.g., communication 600-4 of FIG. 6A between a team of users), between a first user and an automated system (e.g., a chat bot), and/or between a plurality of users and an automated system. However, the present disclosure is not limited thereto.

In some embodiments, the user interface includes one or more indicators describing a delivery status of a communication. For instance, in some embodiments, the one or more delivery status indicators includes a sent status indicator 604 that represents a communication has been sent to a second user (e.g., is communicated through communication network 106 of FIG. 1). In some embodiments, the one or more delivery status indicators includes a delivered status indicator 606 that represents the communication is received by a second user (e.g., through the communication application 222 running on a user device 300 associated with the second user). In some embodiments, the one or more delivery status indicators includes a read status indicator 608 representing that the communication has been read by the second user. Additionally, referring briefly to FIG. 8C, in some embodiments, the one or more delivery status indicators includes a reply status indicator that represents a determination of a status of a reply communication to a previously received communication (e.g., either the first user or the second user has or has not replied to a received communication). These delivery status indicators allow a user whom provided a communication to know the status of that communication, improving a flow of information between users. Furthermore, in some embodiments, the user interface includes an unread message status indicator 610 representing a number of unread messages sent from another to the user of the user device 300 within a communication. For instance, the unread message status indicator 610 of FIG. 6A indicates that the communication 600-1 includes three unread messages (e.g., unread communications within a conversation).

In some embodiments, the one or more delivery status indicators is provided as graphical element of the user interface a text-based indicator, or a combination thereof. In some embodiments, the graphical element of one or more delivery includes a series of check marks (✓) and or arrows (∿), such that each indicator in the one or more delivery status indicators is differentiated from one another by either a number of check marks included in the indicator, a color of a check mark included in the indicator, an artistic rendering of a check mark included in the indicator, or a combination thereof. For instance, referring to FIG. 6A, FIG. 6B, and FIG. 7, in some embodiments, a sent status indicator 604 includes a single gray color check mark, a delivered status indicator 606 includes two gray color check marks, and a read status indicator 608 includes two blue color check marks. On the other hand, referring to FIG. 8C, in some embodiments, a sent status indicator 604 includes a blue color check mark enclosed in a first circle, a delivered status indicator 606 includes an arrow enclosed in a second circle, and a read status indicator 608 includes the arrow in a third circle, and a reply status indicator 609 includes a white color check mark enclosed in a fourth circle. However, the present disclosure is not limited thereto. One of skill in the art will know of other graphical nomenclatures for the aforementioned indicators that are implementable with in the present disclosure.

In some embodiments, the user interface includes a mechanism 612 for creating a new communication. In some embodiments, the mechanism 612 redirects the user to the user interfaces of FIG. 6C or FIG. 6D, providing the user an opportunity to select one or more different users to include in the communication.

In some embodiments, the user interface includes a search mechanism 614, which allows and a user of the communications application 222 to search through one or more communications for specified subject matter. In some embodiments, the subject matter the user is capable of locating through the search mechanism 614 includes one or more communications provided by a specified source (e.g., a specific user associated with a communication, a specific social media application associated with the communication, a specific document type of a communication, etc.), one or more communications related to a specific topic (e.g., hotel reviews, the text string "Hawaii," etc.), one or more communications having a specified characteristic (e.g., a specified sentiment and/or an emotion such as a search for one or more communications having a negative sentiment), or a combination thereof. In some embodiments, the search mechanism 614 limits the user to locate one or more communications that are associated with the user (e.g., only communications the user is a member of), or allows the user to locate one or more communications associated with the system 100 (e.g., a global search for one or more communications, an administrate capable of viewing communications of all underlying member users, etc.).

Figure 11A:
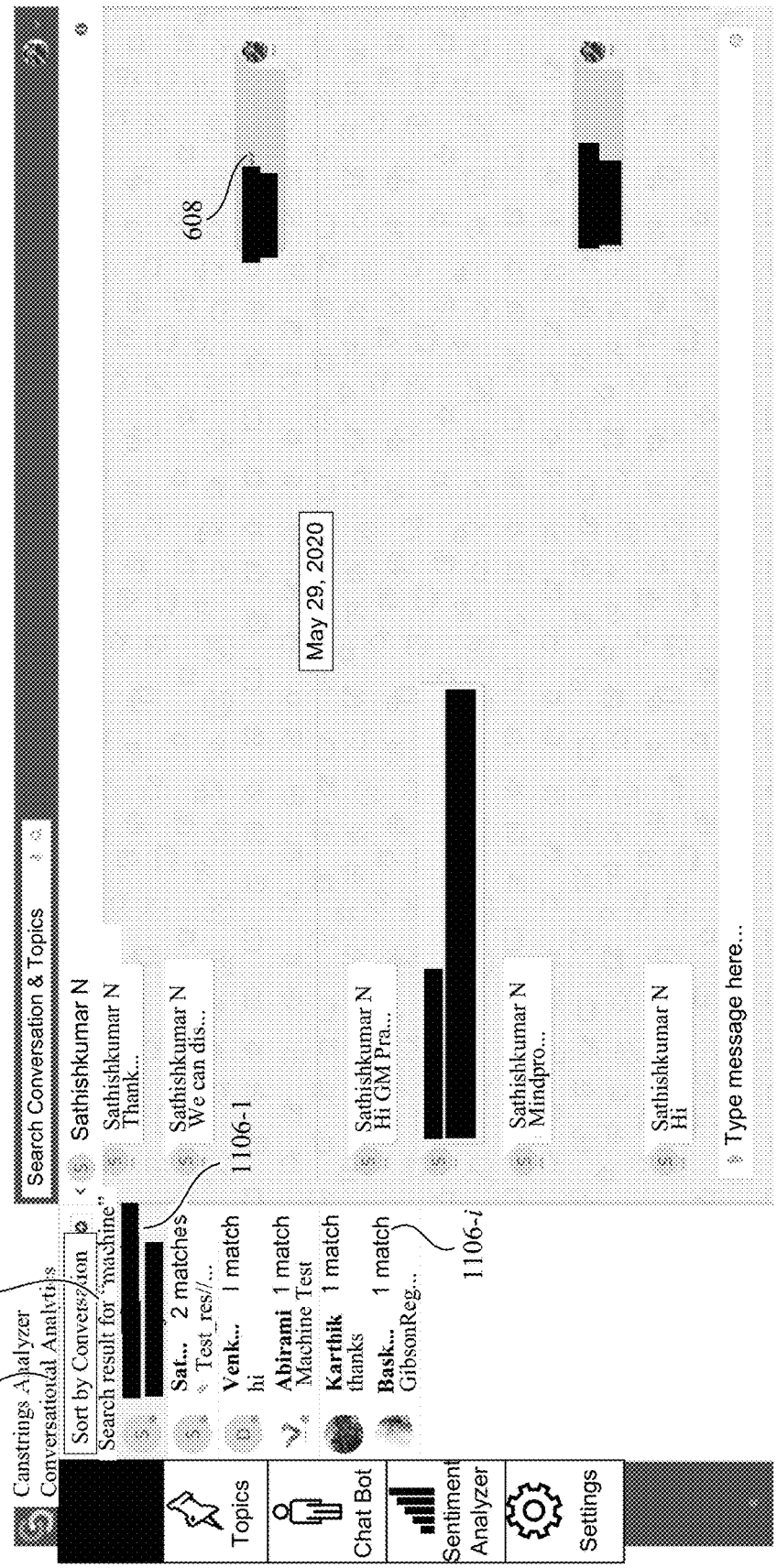
FIGS. 11A and 11B illustrate user interfaces for searching for a communication and/or a characteristic of a communication, in accordance with exemplary embodiments of the present disclosure.

Referring briefly to FIG. 11A, a user interface is displayed in accordance with a result of a search term 1102 provided through the search mechanism 614. In FIG. 11A, a user has conducted a search using the search mechanism 614 for the search term 1102 "machine," which yielded at least one positive result. Furthermore, the user has specific a type of communications 1104, restricting the results to the specific type of communication, in this instance restricting to conversations. Each search result is displayed, and, in some embodiments, an indicator 1106 is provided that describes a count of occurrences of the search term within the corresponding communication. In some embodiments, in accordance with a determination that the user interacts with a label of a search result, the communications of the search result are displayed and each communication of the search result including the search term is identified (e.g., highlighted) for the user.

Figure 13A:
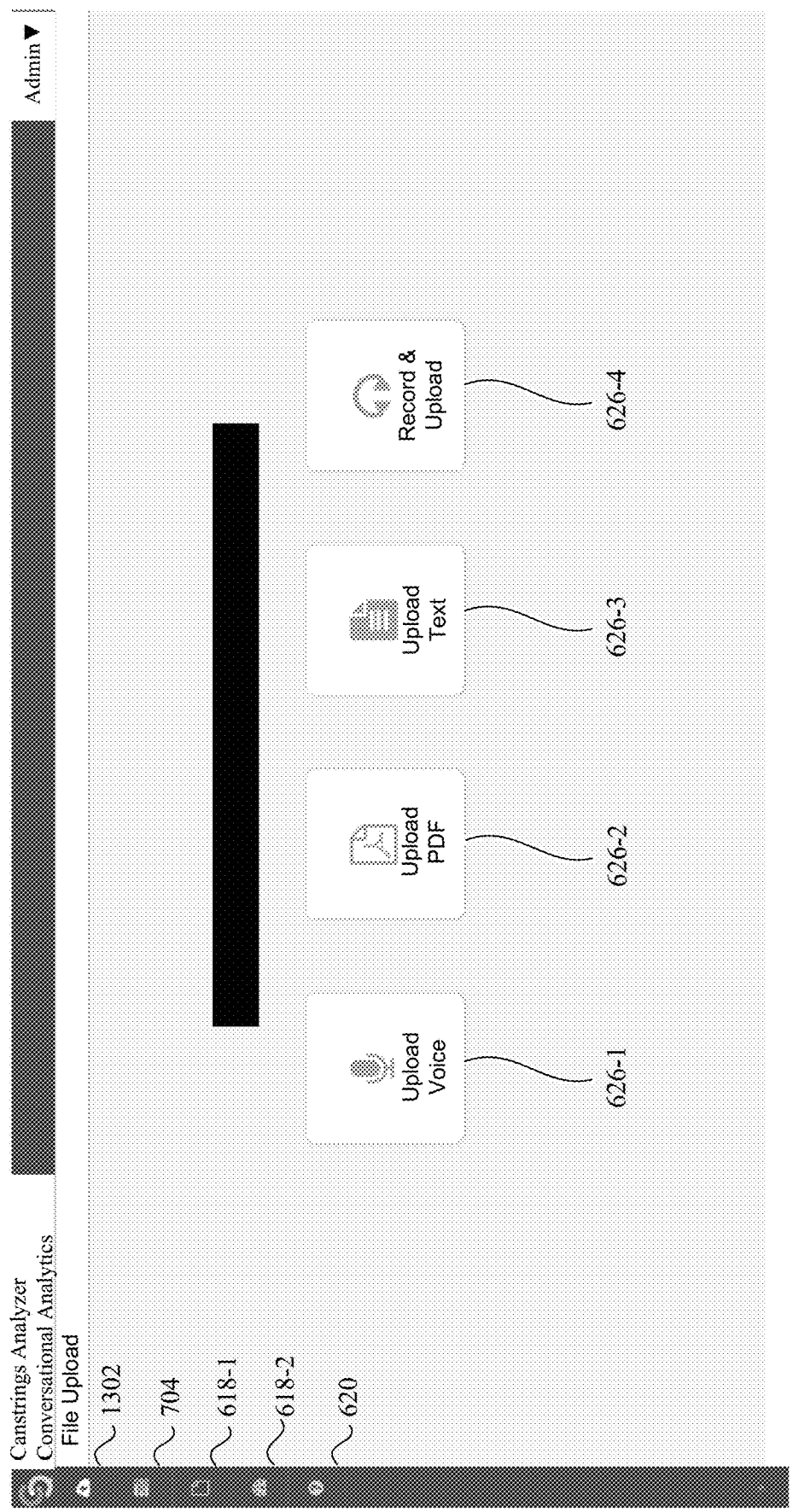
FIGS. 13A, 13B, and 13C illustrate user interface for receiving and evaluating a communication, in accordance with an exemplary embodiment of the present disclosure.
Figure 13B:
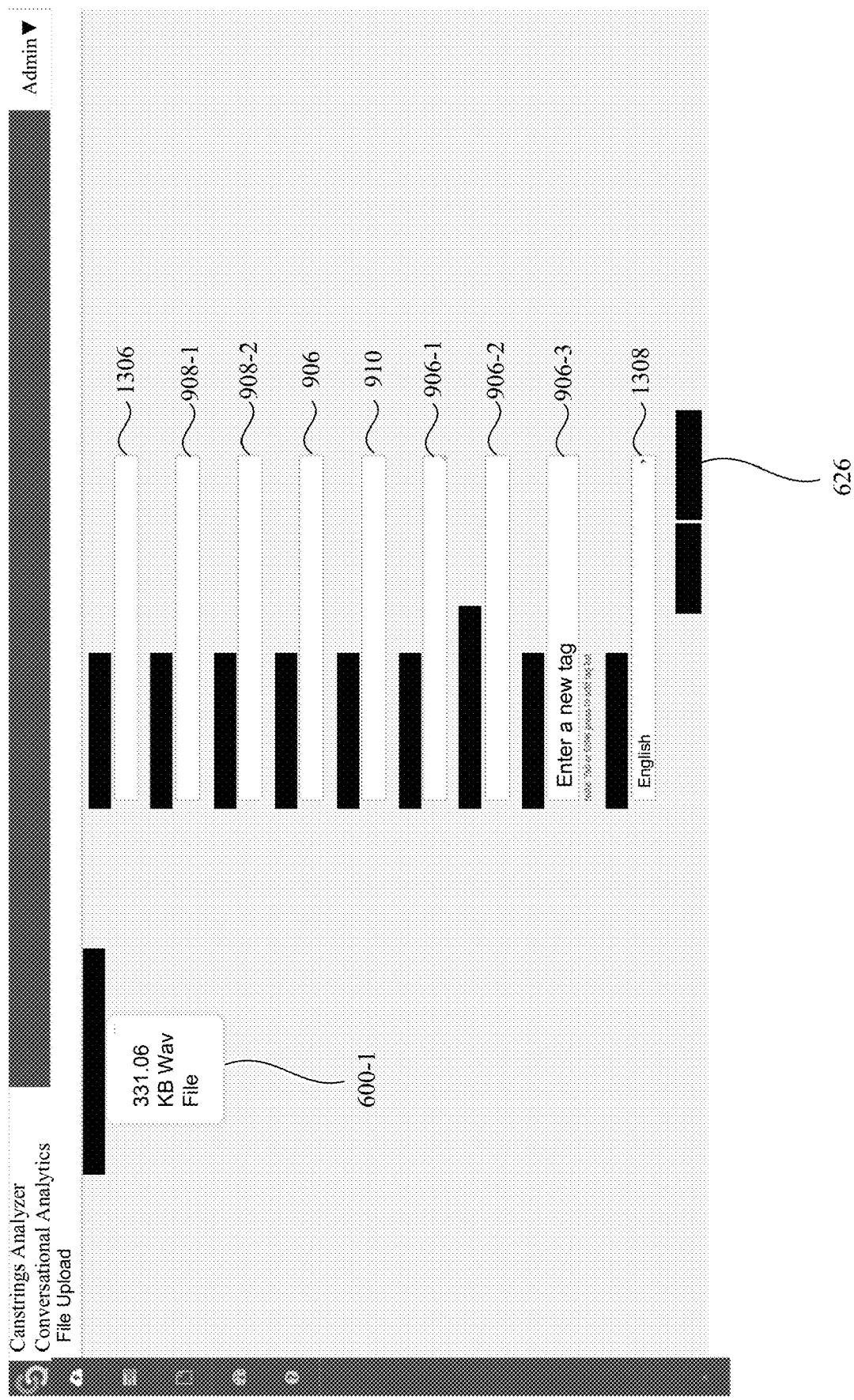

Referring briefly to FIG. 13B, in some embodiments, the user of the user device 300 provides information (e.g., information of the one or more columns of FIG. 9A, etc.) related to a corresponding communication. In some embodiments, the user provided information is searchable through the search mechanism 614. In some embodiments, the information provided by the user includes a name, or title, 1306 associated with the communication 600, information related to a first user associated with the communication such as an address 908-1 (e.g., an Email address, a phone number, a URL, etc.) and/or a name 908-2 of the first user, information related to a first user associated with the communication such a name 906 of the second user (e.g., a user of the user device 300). Further, in some embodiments, the user provides information related to a subject matter 910 or context of the communication. In some embodiments, the user provides information related to a keyword 906-1, a comment 906-2, a tag 906-3, or a combination thereof associated with the communication, such as personal note or comment about an aspect of the communication. Furthermore, in some embodiments, the user provides information related to a language 1308 of the communication. In some embodiments, the language 1308 of the communication is provided to a semantic analysis classification model 208, to identify either a target output language upon parsing the communication and/or an input language for parsing the communication.

Figure 11B:
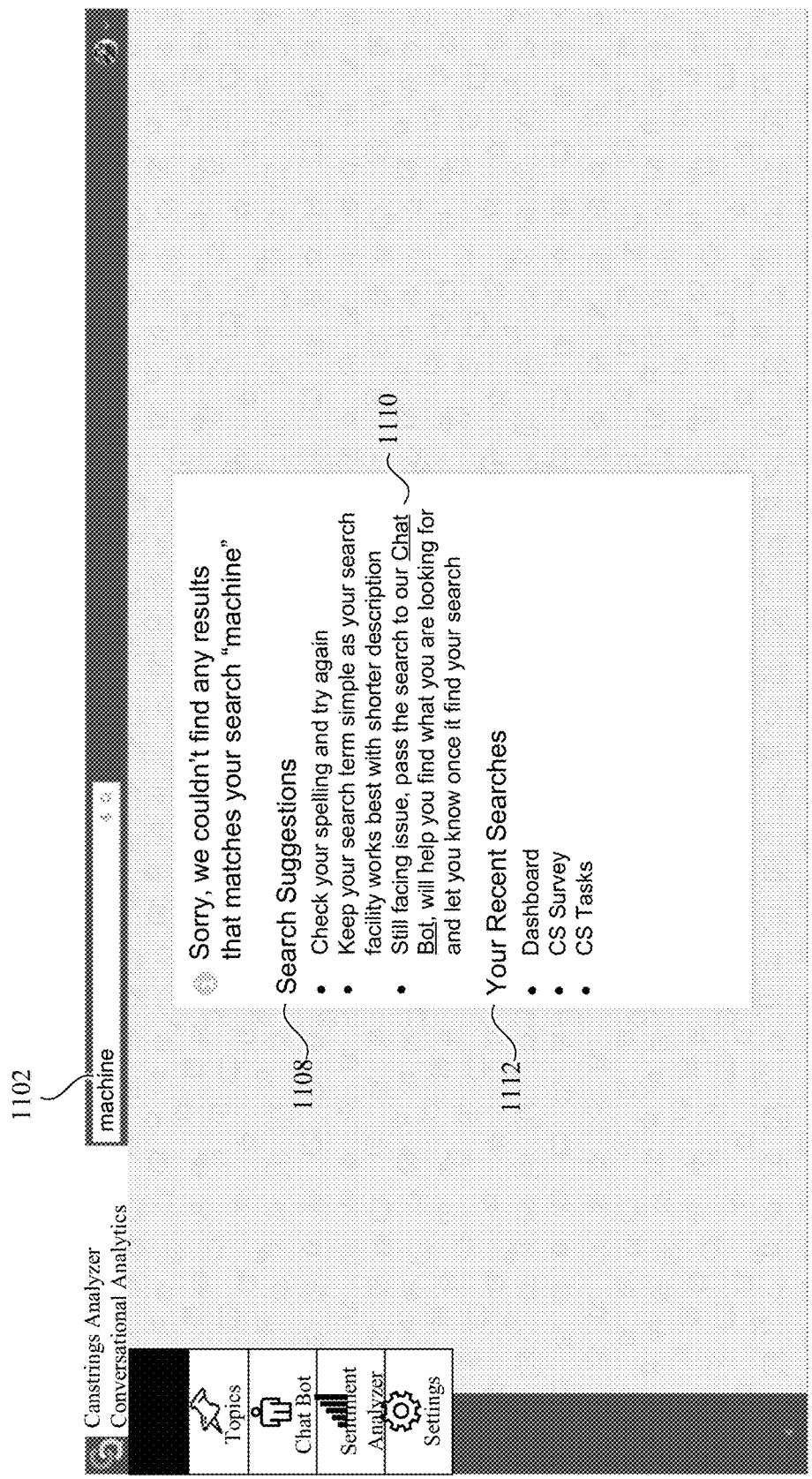

Referring briefly to FIG. 11B, another user interface is displayed in accordance with a result of a search term 1102 provided through the search mechanism 614. In FIG. 11B, a user has conducted a search using the search mechanism 614 for the search term 1102 "machine," which yielded no positive results. In some embodiments, in accordance with a determination that a search yields no positive results, the user is provided a first prompt 1108 providing one or more suggestions for improving a search result. These suggestions including a prompt to verify spelling of a search term, a prompt to simplify a search term, or a prompt to communicate with an agent 1110 (e.g., a hyperlink directing the application to a user interface of the chat bot tab 704.) for assistance. In some embodiments, in accordance with a determination that a search yields no positive results, the user is provided a second prompt 1108 that displays a history of previous search terms, reminding the user of their past searches and/or search results. Referring briefly to FIG. 13B, in some embodiments Referring back to FIG. 6A, the user interface provides at least three distinct tabs that direct the user to different portions of the application 222, including the chat tab 616, a bulletin (e.g., topic) tab 618, and a settings tab 620. For instance, FIG. 6A illustrates the chat tab 616 directs the application 222 to a page allowing the user provide and receive communications with other users and to access one or more communications associated with the user including an image within the one or more communications, a file within the one or more communications, and/or a hyperlink within the one or more communications. The bulletin tab 618 directs the application 222 to a page allowing the user to communicate with other users through one or more forums and associated threads. In some embodiments, each forum and/or thread is associated with a specific subject matter and/or a specific group of users. However, the present disclosure is not limited thereto. For instance, referring briefly to FIG. 7, the user interface includes five distinct tabs including the chat tab 616, the bulletin tab 618, a chat bot tab 702, a sentiment tab 704, and the settings tab 620. The settings tab 620 directs the application 222 to a page allowing the user to make altercations to various settings of the application 222 (e.g., a setting determining if a characteristic of a communication is provided actively or passively), such as the user interface of FIG. 6E.

In some embodiments, in accordance with a determination that the user interacts with the chat bot tab 702, the application 222 directs to a user interface for communicating with a chat bot. The chat bot acts a user of the system 100, with access to the classification models 208 for evaluating and providing a characteristic of a communication. Accordingly, the chat bot is capable of evaluating the communications provided to it from a user using the systems and methods described herein. In some embodiments, the chat bot utilizing the same reference text 214 as the classification model, allowing the chat bot to evaluate a communication and communicate with a user using language associated with the reference text of the training data. Furthermore, in some embodiments the chat bot stores each communication associated with it, forming additional reference text 214. This storing also allows a user to analyze the provided characteristics of communications associated with the chat bot, leading to a better understanding of the context of the communications. For instance, if a chat bot is a help mechanism for a website, the user can analyze the context of communications with the chat bot to understand if consumers are frustrated or thrilled with the services provided by the user.

Referring to FIG. 6B, a user interface of FIG. 6B depicts a page directed from communication 600-2 of FIG. 6A. The user interface displays the individual communications 602 between a first user and a second user that comprise the overall communication 600-2. In some embodiments, a characteristic is provided for the overall communication 600-2. In some embodiments, the characteristic provided of the overall communication 600-2 is a combination of two or more characteristics of the individual communications 602 of the overall communication 600. Furthermore, in some embodiments, a characteristic is provided for each individual communication 602 within the communication 600-2.

To input a communication, the user interface provides a text entry region 622, which, for instance, allows the user to input a communication to the application 222 through input 378 of the user device. In some embodiments, the user interface provides an upload mechanism 626 allowing the user to provide a predetermined communication (e.g., a communication in a form of a document, such as a text document). Additionally, in some embodiments, the user interface provides an ideogram mechanism 628 allowing the user to include one or more ideograms within a communication. Once the user drafts the communication, the user interface provides a send mechanism 624 that communicates the communication to the system 100 and/or a user device 300-2 associated with the second user.

Figure 6C:
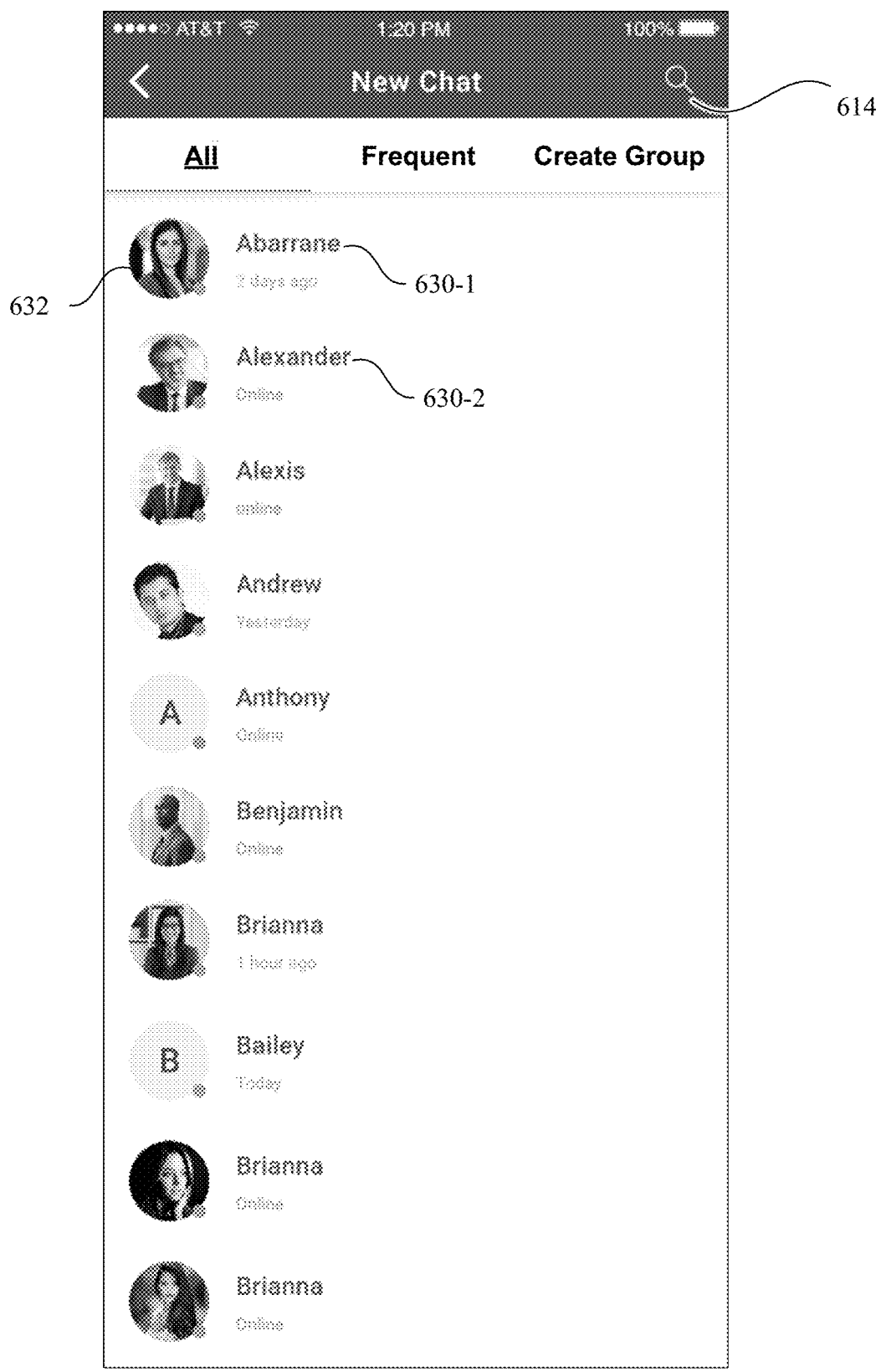
Figure 6D:
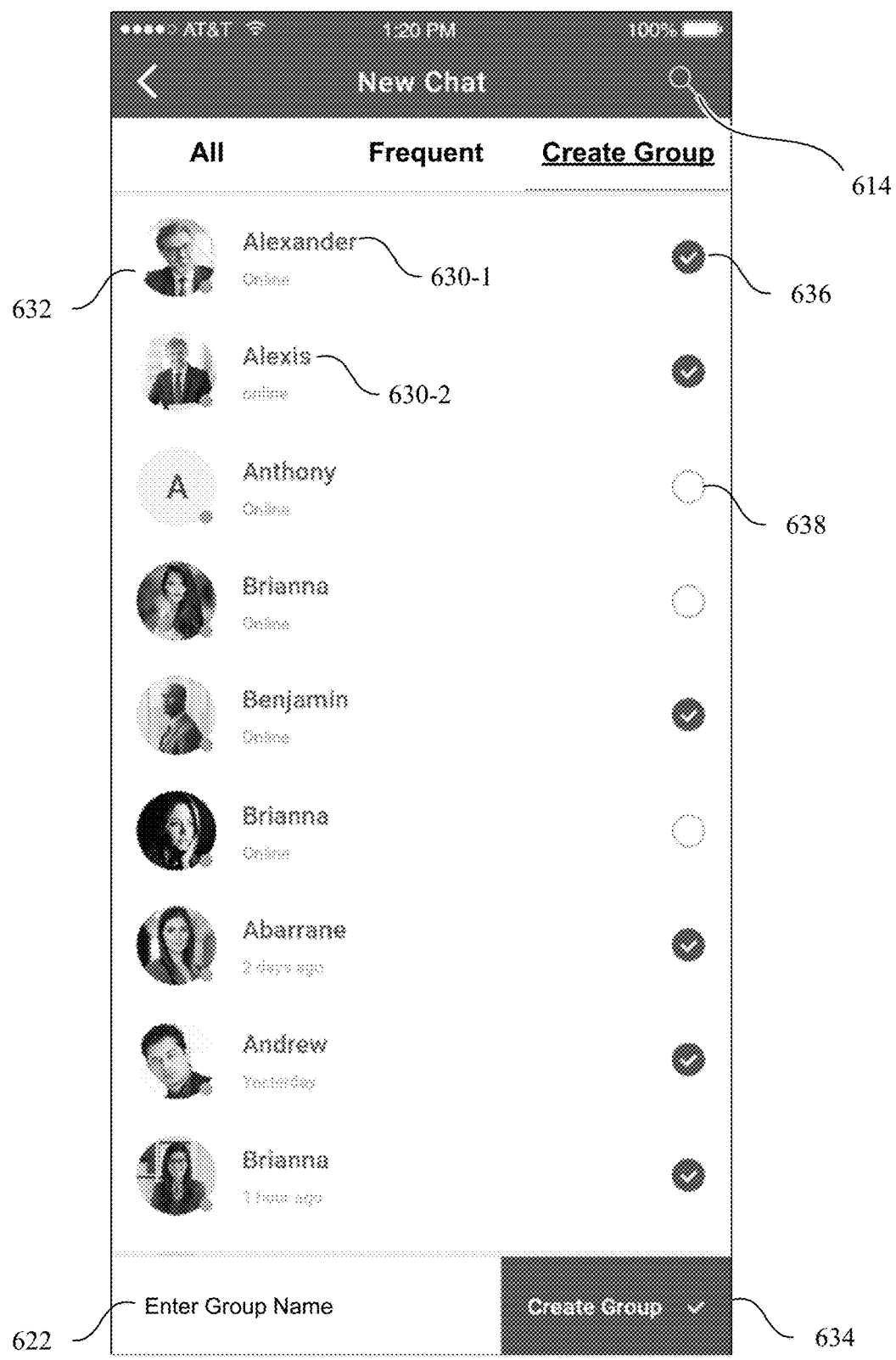

Referring to FIG. 6C, in some embodiments, in accordance with a determination that the user interacts with the mechanism 612, the application 222 directs to a user interface of FIG. 6C to select one or more users 630 for inclusion in a communication. In some embodiments, the user is provided a second mechanism allowing the user to sort the displayed users 630 according to an alphabetical listing, a frequency of contact listing, or the like. Referring to FIG. 6D, in some embodiments the user selects more than one user 630 for inclusion in a communication, forming a group-based communication. In some embodiments, each user 630 selected by the user of the application 222 is indicated by a selected indicator 636, or similar, indicated by an unselected indicator 638 if unselected by the user. Once the user has selected the specified users 630, the user can create 634 a forum or thread for communicating.

Figure 6E:
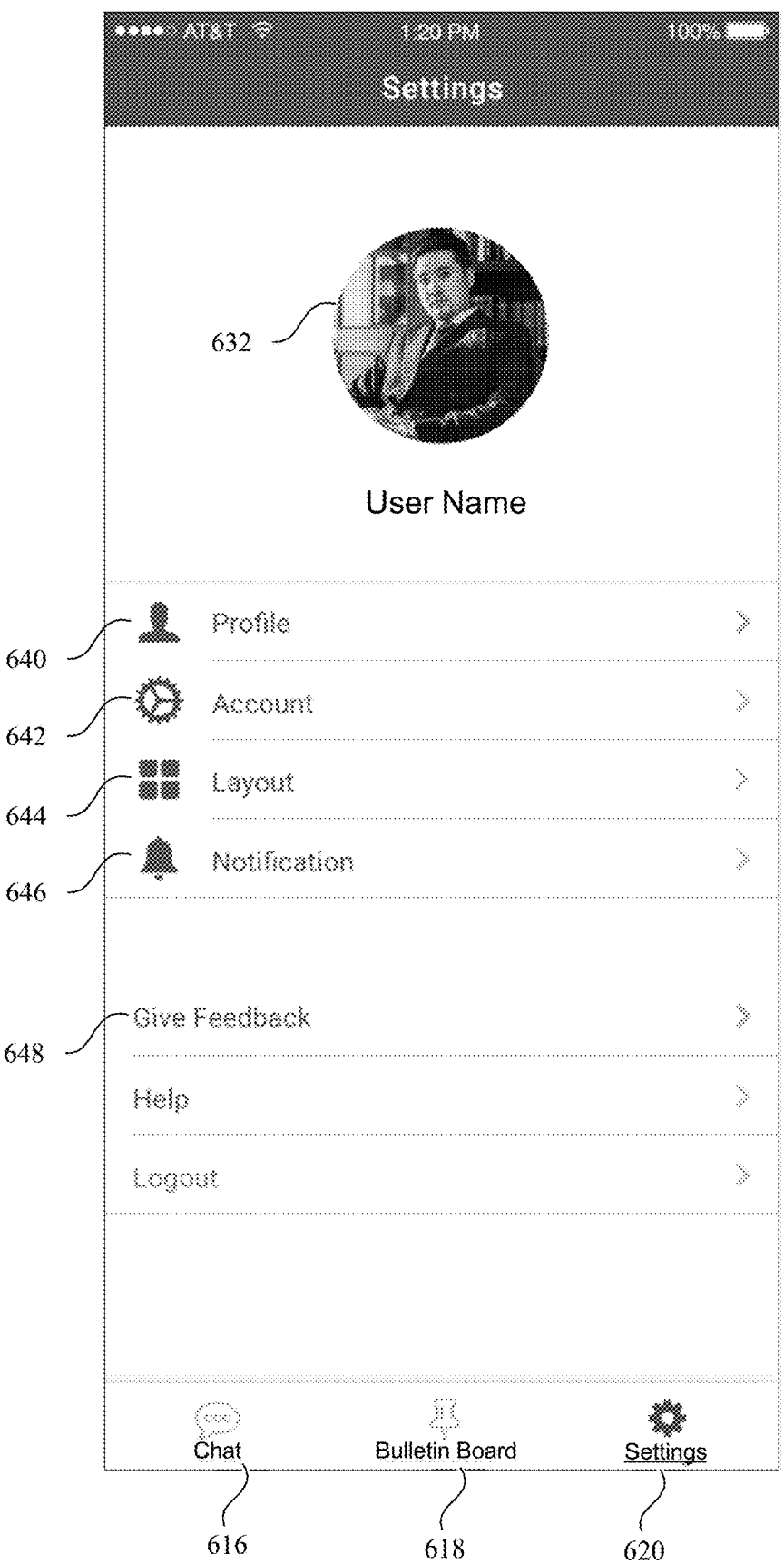

Referring to FIG. 6E, in some embodiments, in accordance with a determination that the user interacts with the settings tab 620, the application 222 directs to a user interface of FIG. 6E. The settings tab 620 user interface allows the user to modify an image 623 associated with the user, one or more profile settings 640 (e.g., a name of the user profile), one or more account settings 642 (e.g., a subscription status for the application 222), one or more user interface layout settings 644 (e.g., a preference for the user interfaces of FIG. 6A through 6E, a preference for the user interface of FIG. 7 through FIG. 12, a theme of a user interface such as a day-time theme or a night-time theme, etc.), and a notification settings 646 for providing one or more notification related to the application 222 through the user device 300. In some embodiments, the notification is a private notification intended for the user of the user device or a public notification intended for a plurality of users associated with a communication.

In some embodiments, the user interface of the settings tab 620 allows the user to provide feedback related to the application 222. This feedback includes providing a correction to a previously provided characteristic of a communication if the user believes the provided characteristic is incorrect or a more correct characteristic can be provided.

Referring to FIG. 7, a user interface is illustrated for display on the user device 300 typically associated with non-mobile type user devices (e.g., a desktop computer, a gaming console, etc.). The user interface of FIG. 7 depicts a page of the chat tab 616 including one or more communications 600, particularly the individual communications 602 of a first communication 600-1. In some embodiments, the user selects a communication 600 to display the individual communications 602 by interacting with a label identifying the communication (e.g., interacting with a label identifying a first communication 600-1 of FIG. 7). Likewise, in some embodiments, the user deselects a previously selected communication through a deselect mechanism 708 or by selecting another label associated with a different communication (e.g., interacting with a label identifying a second communication 600-2). Furthermore, in some embodiments, the application 222 provides a speech-to-text mechanism 710, allowing the user to input text (e.g., a communication including audio data or a search query) or audio (e.g., upload mechanism 626-4 of FIG. 13B) using the microphone 362 of the user device 300.

Figure 8A:
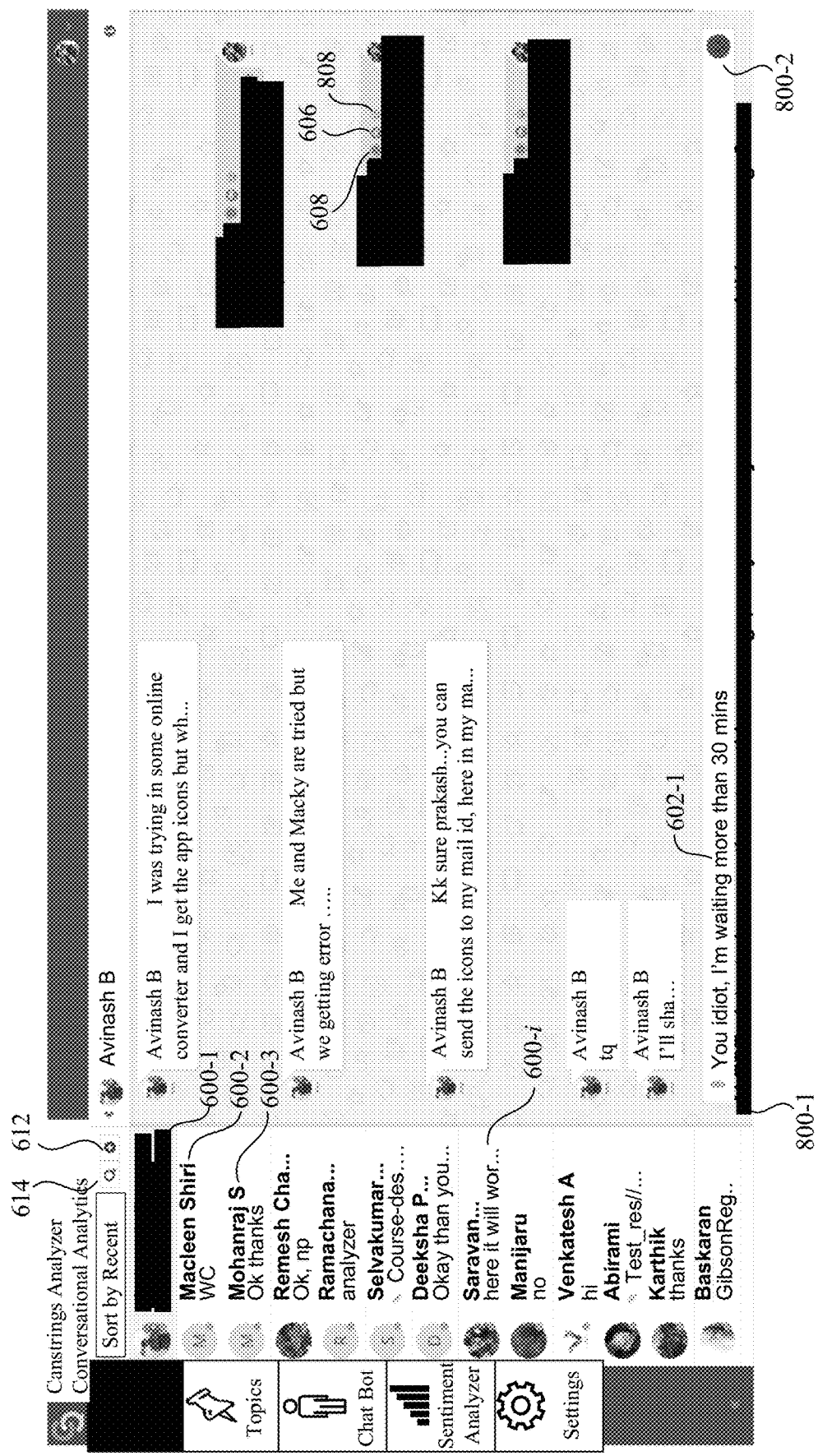
FIGS. 8A, 8B, and 8C illustrate user interfaces for analyzing a characteristic of a text input field, in accordance with exemplary embodiments of the present disclosure.
Figure 8B:
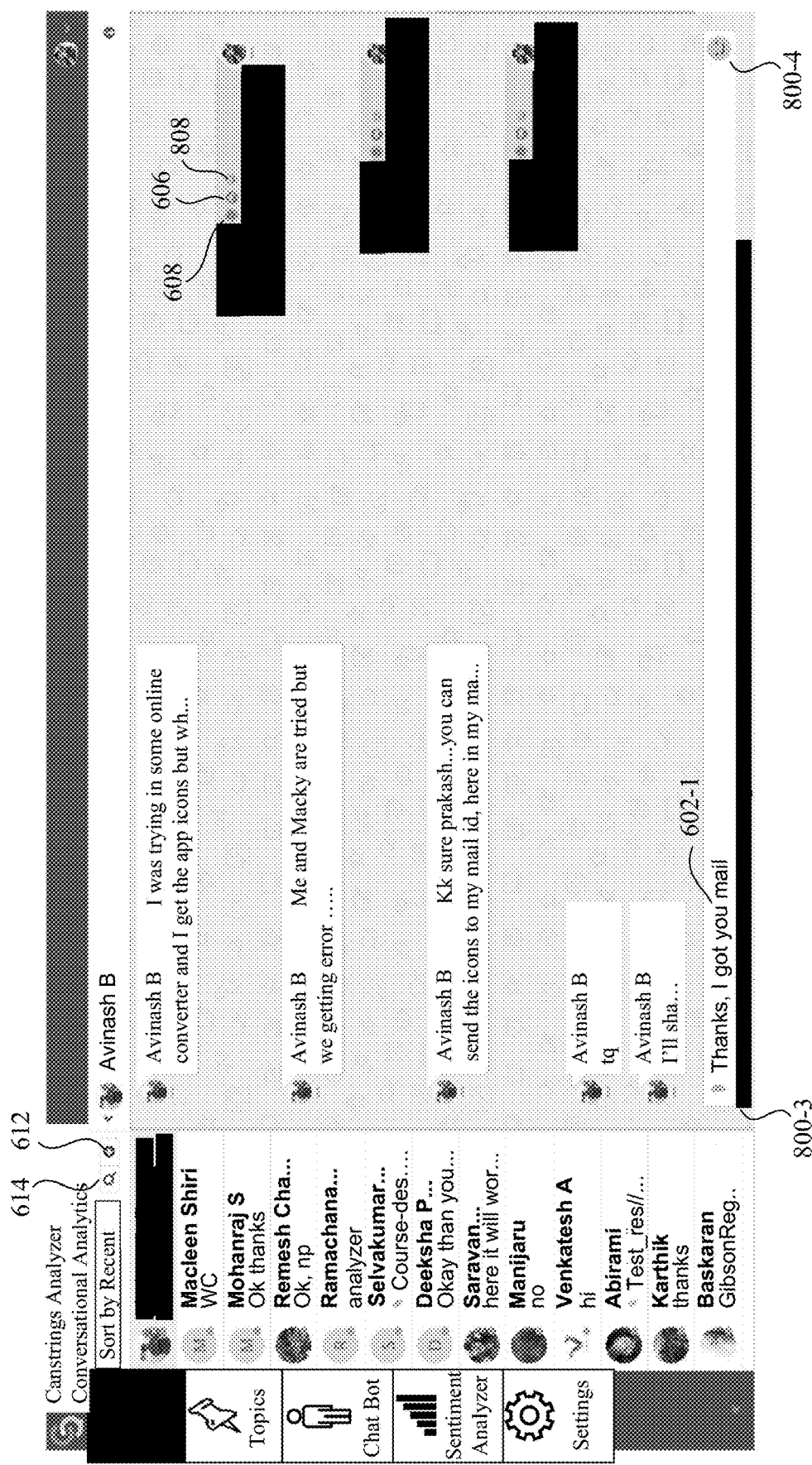
Figure 8C:
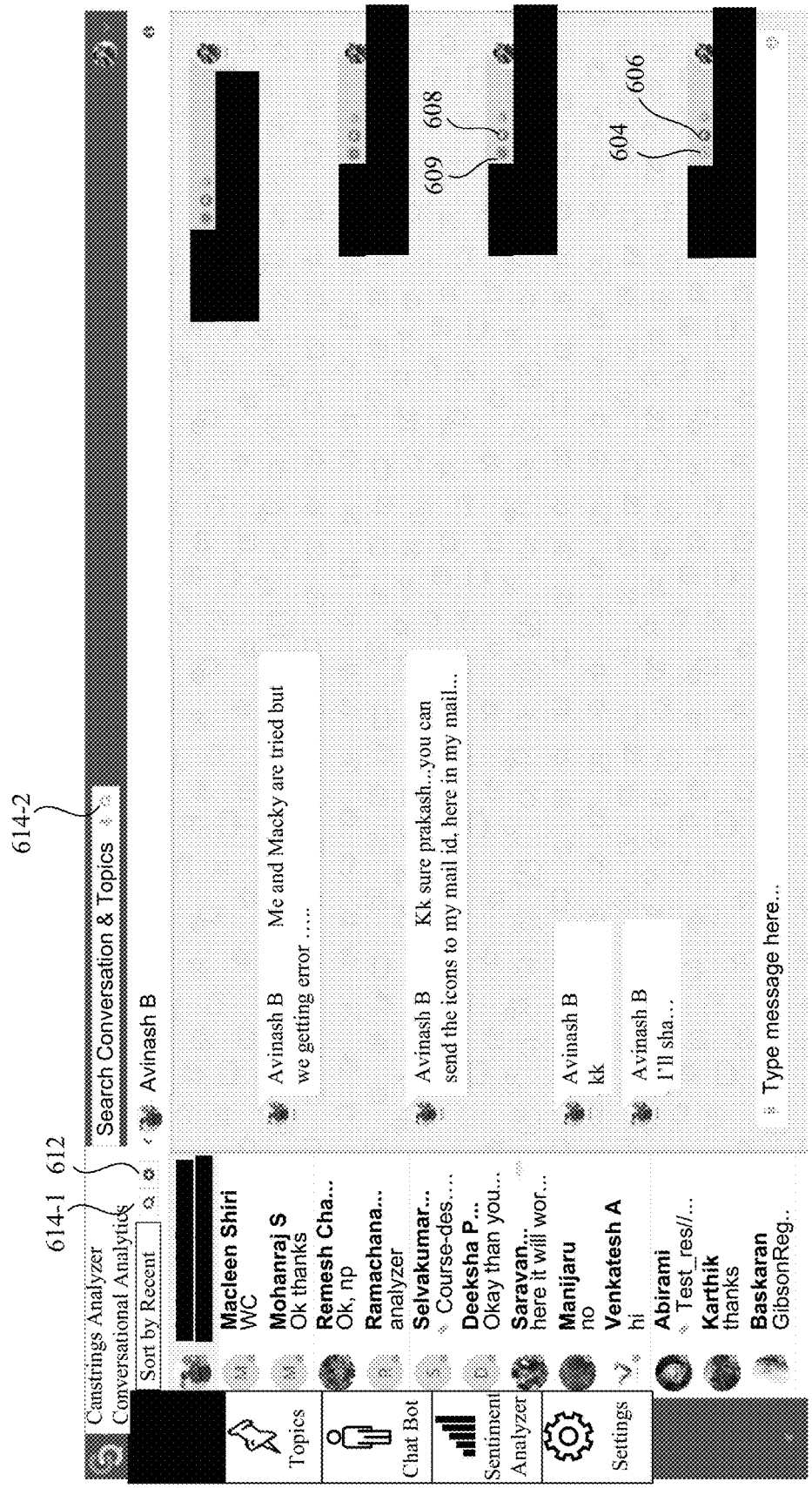

Referring to FIG. 8A through FIG. 8C, in some embodiments, the application 222 actively provides a characteristic 800 for a communication 600. As illustrated in FIG. 8A, a user provides a communication 602-1 including a text string of "You idiot, I'm waiting more than 30 minutes," through text entry region 622. The application 222 parses and evaluates the communication using one or more classification models 208 to provide the characteristic 800. While the user interfaces of FIG. 8A through 8C depict a characteristic for each communication provided by only a first user, in some embodiments, a characteristic is provided each communication provided by each user. In some embodiments, the characteristic is provided as a graphical representation 800-2 of the characteristic (e.g., an unhappy face representing a negative sentiment such as the graphical representation 800-2 of FIG. 8A, a happy face representing a positive sentiment such as the graphical representation 800-4 of FIG. 8B, a neutral face representing a neutral sentiment, an ideogram representing an emotion of sadness, etc.). Furthermore, in some embodiments the characteristic is provided as in a text-based representation 800-1 describing the provided characteristic. For instance, in some embodiments, the text-based representation 800-1 of the characteristic alerts the user that the communication includes a negative sentiment and/or a confirmation that the user wants to provide the communication having the negative sentiment). The text based representation 800-1 and/or the graphical representation 800-2 of the characteristic ensures the user is aware of a provided characteristic of a communication prior to communicating the communication to a second user, preventing the user for accidentally communicating a communication with an undesired characteristic. In some embodiments, once a user has communicated a communication the provided characteristic of the communication is included as a characteristic indicator with the communication (e.g., characteristic indicator 808 of FIG. 8A).

Figure 9C:
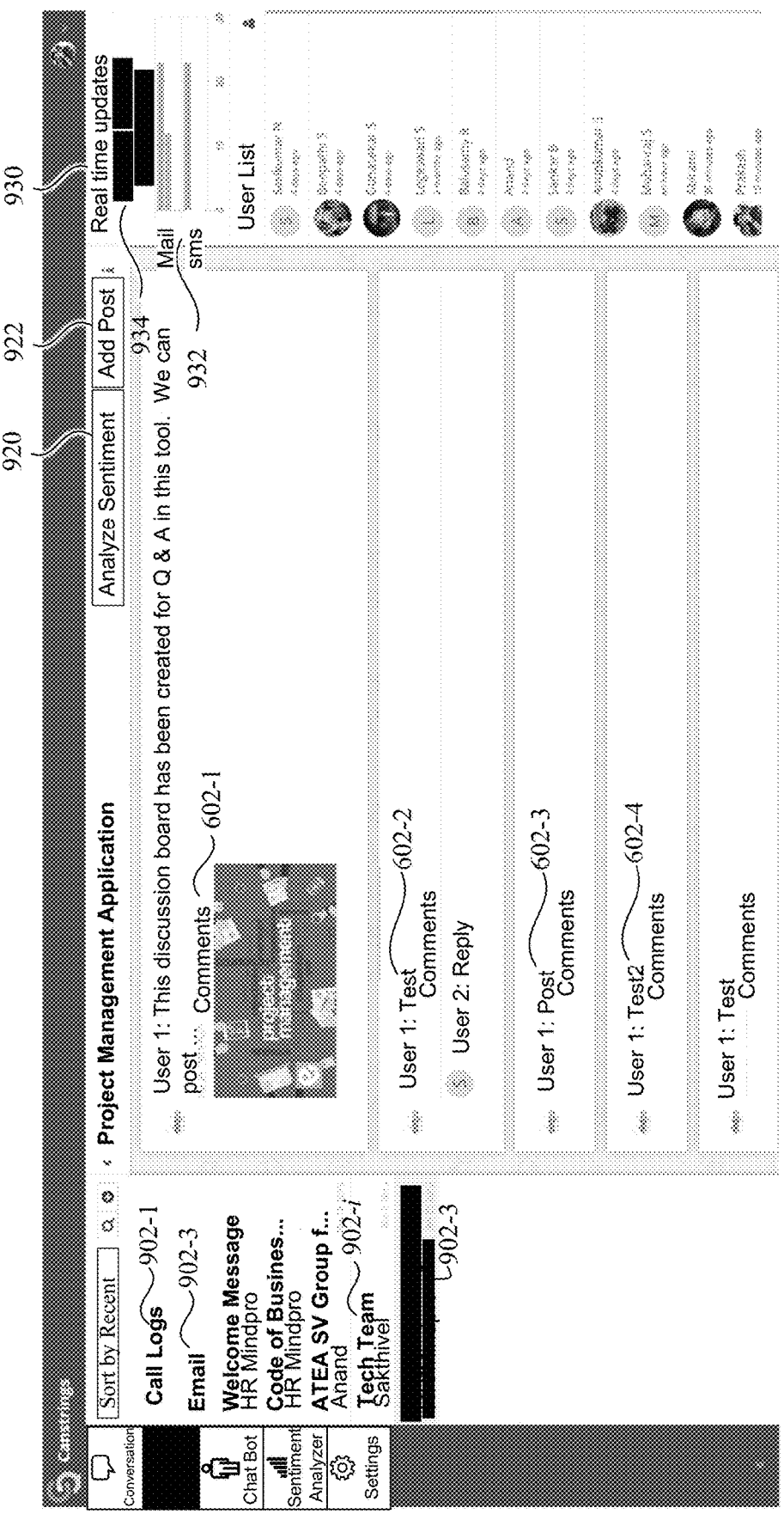
FIG. 9C illustrates yet another user interface for providing communications, in accordance with an exemplary embodiment of the present disclosure.

Referring to FIGS. 9A through 9C, in some embodiments, in accordance with a determination that the user interacts with the bulletin tab 618, the application 222 directs to a user interface of FIG. 9A through FIG. 9C. The user interface includes one or more topics 902, each including one or more communications associated with a specified source of a communication (e.g., topic 902-1 is associated with one or more communications sourced from recorded telephonic conversations, topic 902-2 is associated with one or more communications sourced from an Email address, etc.), a specified subject matter, a specified group of one or more users 630 (e.g., topic 902-i is associated with one or more communications sourced from a group of users associated with a "Tech Team" forum), or a combination thereof. Similar to the labels of FIG. 7, in accordance with a determination a user interacts with a label associated with a topic 902, the user interface displays each of the communications associated with the topic.

Specifically, the user interface of FIG. 9A depicts a number of communications 600 associated with the topic 900-2. The user interface includes one or more columns (e.g., column 904, column 906, etc.) that each provide information related to a corresponding communication. Further, the user interface includes one or more rows, each respective row dedicated to a corresponding communication 600. In FIG. 9A, each communication includes an audio data portion (e.g., the recorded telephonic conversation), which is listed and provided under a first column 904, allowing the user to listen to the audio data of each communication. In some embodiments, the user interface displays a second column 906 and/or a third column 908 that provide a listing of one or more users associated with each communication. In some embodiments, the user interface displays a fourth column 910 and/or a fifth column 912 that provides various information related to each communication, such as a subject matter of the communication, a context of the communication, a source of the communication, a time stamp associated with the communication, and the like. Additionally, in some embodiments, the user interface displays a sixth column that provides a listing of a provided characteristic for each communication. In some embodiments, the listing of the provided characteristic for each communication includes a first text-based representation of the provided characteristic 800-5 that provides a sentiment characteristic or an emotion characteristic of the communication. In some embodiments, the listing of the provided characteristic for each communication includes a second text-based representation of the provided characteristic 800-5 that provides a combination of two or more characteristics (e.g., a gradient or a percentage of two or more characteristics). Furthermore, referring briefly to FIG. 9B, in some embodiments, the user interface displays a seventh column 906 indicating a source of each communication.

Referring to FIG. 9C, in some embodiments a communication includes, or is provided from, a forum including one or more threads. In FIG. 9C, a user interacts with a label of topic 902-3, which is a forum, to display the individual communications (e.g., a first thread 602-1, a second thread 602-2, etc.) within the forum. In some embodiments, the user interface provides a third mechanism 622, which provides the user an opportunity to form a communication and/or display a text entry region 622 on the user interface. Furthermore, in some embodiments, the user interface provides an analyze mechanism 622, which provides a command for the system 100 to evaluate and provide a characteristic of a communication.

In some embodiments, the user interface displays a communication status region 930 that provides an update regarding a status of one or more communications associated with the corresponding topic. In some embodiments, the communication status region 930 passively updates by determining a status of each communication through the system 100, or the communication status region 930 actively updates by determining a status of each communication through the system 100 in accordance with a command from a user. In some embodiments, the communication status region 930 provides a count of each delivery status indicator, such as a count of each sent status indicator 604, a count of each delivered status indicator 606, a count of each read status indicator 608, a count of each reply status indicator 609, or a combination thereof. In some embodiments, the communication status region 930 differentiates communications according to a mechanism of providing the communication (e.g., differentiates between communications provided through Email, communications provided through short message service (SMS), etc.), allowing the user to determine if a particular mechanism for providing communications is not working properly. Furthermore, in some embodiments the communication status region 930 provides a graphical representation (e.g., a chart or a graph) of the count of each indicator.

Figure 10A:
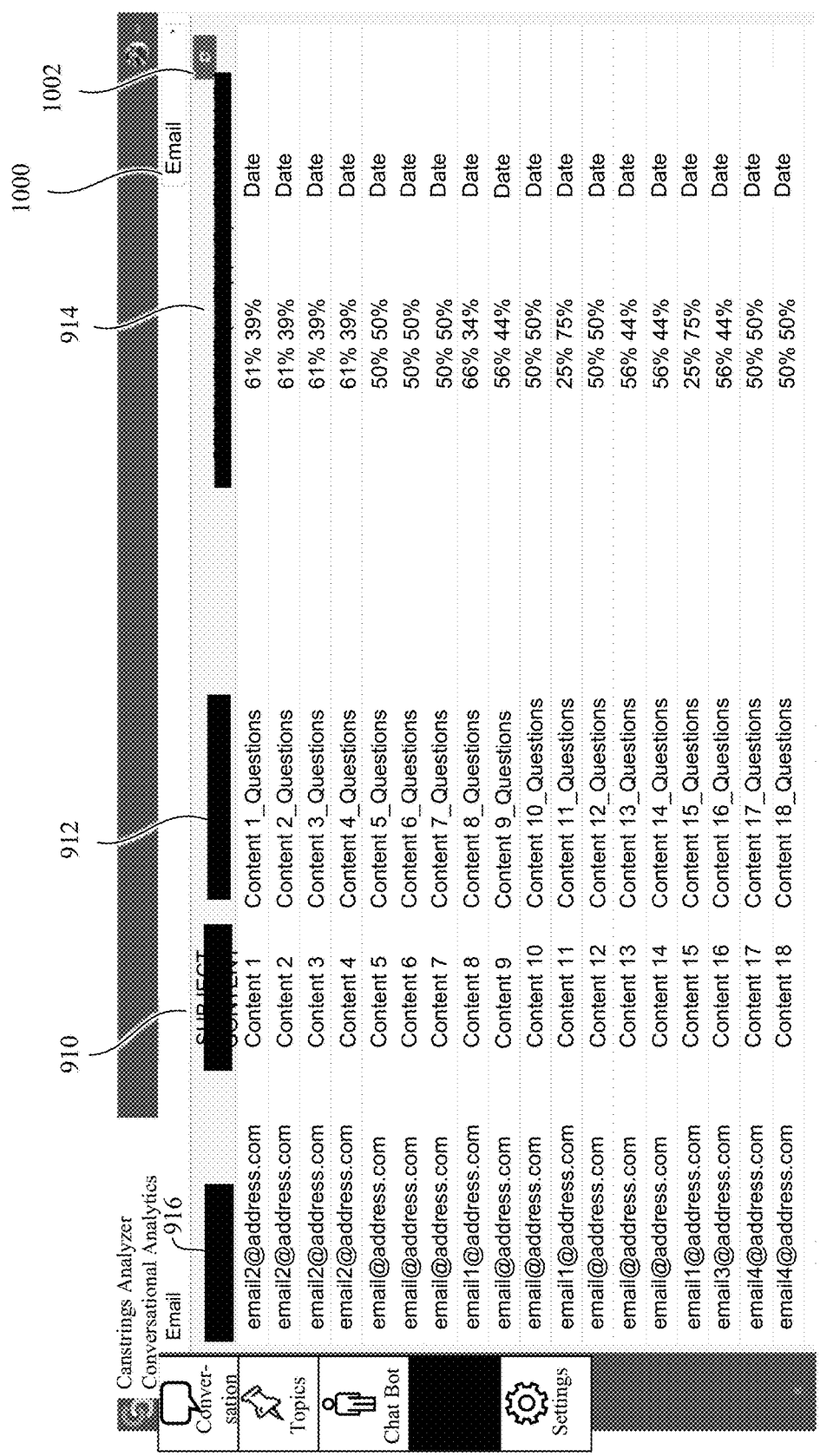
FIGS. 10A and 10B illustrate further user interfaces displaying a characteristics of one or more communications, in accordance with exemplary embodiment of the present disclosure.
Figure 10B:
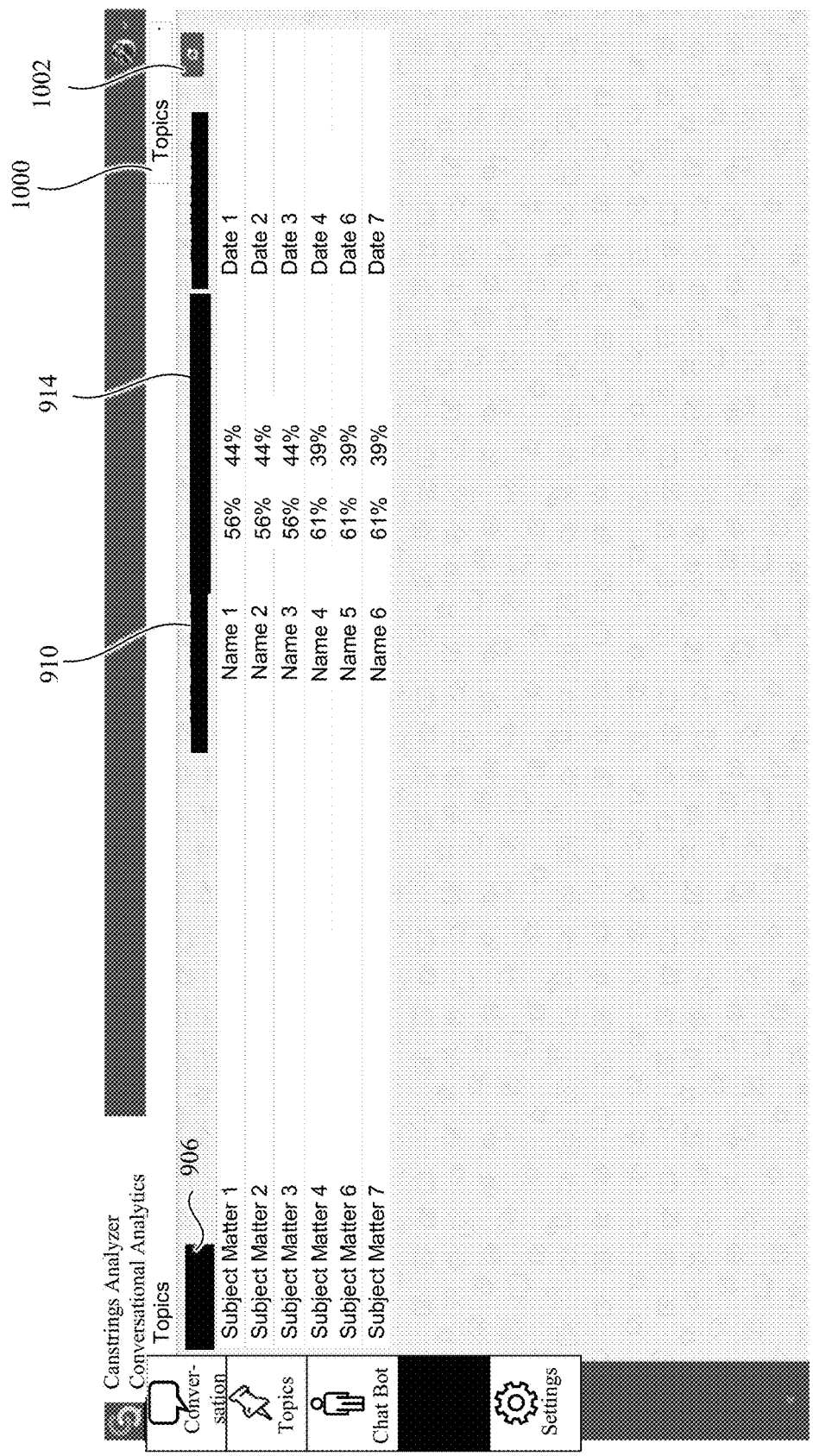

Referring to FIGS. 10A and 10B, in some embodiments, in accordance with a determination that the user interacts with the sentiment tab 704, the application 222 directs to a user interface of FIG. 10A or FIG. 10B. The user interface includes a menu 1000 providing a listing of various types of communications. In some embodiments, the listing of the menu 1000 includes a list of each source of a communication (e.g., a first social media application, a first user, etc.), a list of each type of communication (e.g., an email, a phone call, SMS, PDF, etc.) or like. For instance, the user interface of FIG. 10A displays a selection from the menu 1000 to display topic types of communications, while the user interface of FIG. 10B displays a selection from the menu 1000 to display Email types of communications. In some embodiments, the communications provided in the sentiment tab 704 are polled for by the system 100 and passively evaluated to provide a characteristic of the communications. Accordingly, in some embodiments, the user interface provides a refresh mechanism 1002, allowing the user to command the system to actively poll for communications to evaluate and provided a characteristic.

Referring to FIG. 12, in some embodiments the application 222 displays a connections tab 1200 directs the application 222 to a page allowing the user connect to one or more external communication applications, such as a social media application 1202 and/or a remote server (e.g., an Email server). In some embodiments, the user must provide credentials 1206 (e.g., web service configuration information 1204) to connect with the external communication applications. These credentials 1206 include an account name 1206-1, a key or password 1206-6, a private key 1206-3 (e.g., an application programming interface key), a name of a web service 1206-4, a service type 1206-5 (e.g., a representational state transfer (REST) service type, a simple object access protocol (SOAP) service type, etc.), a connection method type 1206-6, a content type of a request 1206-7, a web service URL 1206-8, a content type of a response 1206-9, or a combination thereof. However, the present disclosure is not limited thereto. In some embodiments, an external communication application requires a unique set of credentials 1206 to access the external communication application.

Referring to FIG. 13A through 13G, user interfaces are provided that are associated with a communication application 222 providing an analysis platform for evaluating a characteristic of one or more communications.

Referring to FIG. 13A, a user interface is provided for uploading (e.g., upload mechanism 626) a communication (e.g., receiving the communication at the characteristics analysis system 200 of FIG. 2) through the communication application 222. In some embodiments, the user interface provides an upload mechanism 626 for receiving a communication of any format. In some embodiments, the upload mechanism 626 includes a plurality of upload mechanism each associated with a respective type of data construct of a communication. For instance, in some embodiments, the upload mechanism 626 includes a first upload mechanism 626-1 associated with an audio portion (e.g., audio data) of a communication, a second upload mechanism 626-2 associated with a first file type of a communication (e.g., a communication, a third upload mechanism 626-3 associated with a second file type (e.g., a text based document such as a .docx file type, a .odt file type, a .txt file type, etc.) of a communication, and a fourth upload mechanism 626-4 associated with an audio portion of a communication captured by the user device 300 (e.g., communicated through microphone 362 of FIG. 3).

Referring to FIG. 13B, in some embodiments, the user is provided an opportunity to provide information related to the communication (e.g., 600-1 of FIG. 13B that includes an audio portion). In some embodiments, the user provides information related to a display name or title 1306 of the communication. In some embodiments, the user provides information related a source 908-1 of the communication, such as an address associated with a second user of the communication or a social media application associated with the communication. In some embodiments, the user provides information related to a name 908-2 of the second user. In some embodiments, the user provides information related to a third user 906 associated with the communication. For instance, in some embodiments the user of the user device 300 provides a communications that is not expressly associated with the user (e.g., the user did not participate in the communication). In some embodiments, the user provides information related to a plurality of searchable terms 906 that allow the user to easily identify and/or search for (e.g., via search mechanism 614) the communication, such as one or more comments 906-1 associated with the communication, one or more keywords 906-2 associated with the communication, one or more tags 906-3 associated with the communication, or a combination thereof. In some embodiments, the one or more keywords 906-2 and/or the one or more tags 906-3 associated with the communication include a listing of keywords and/or tags previously extracted from a different communication (e.g., extracted content 912 of FIG. 13C).

Figure 13C:
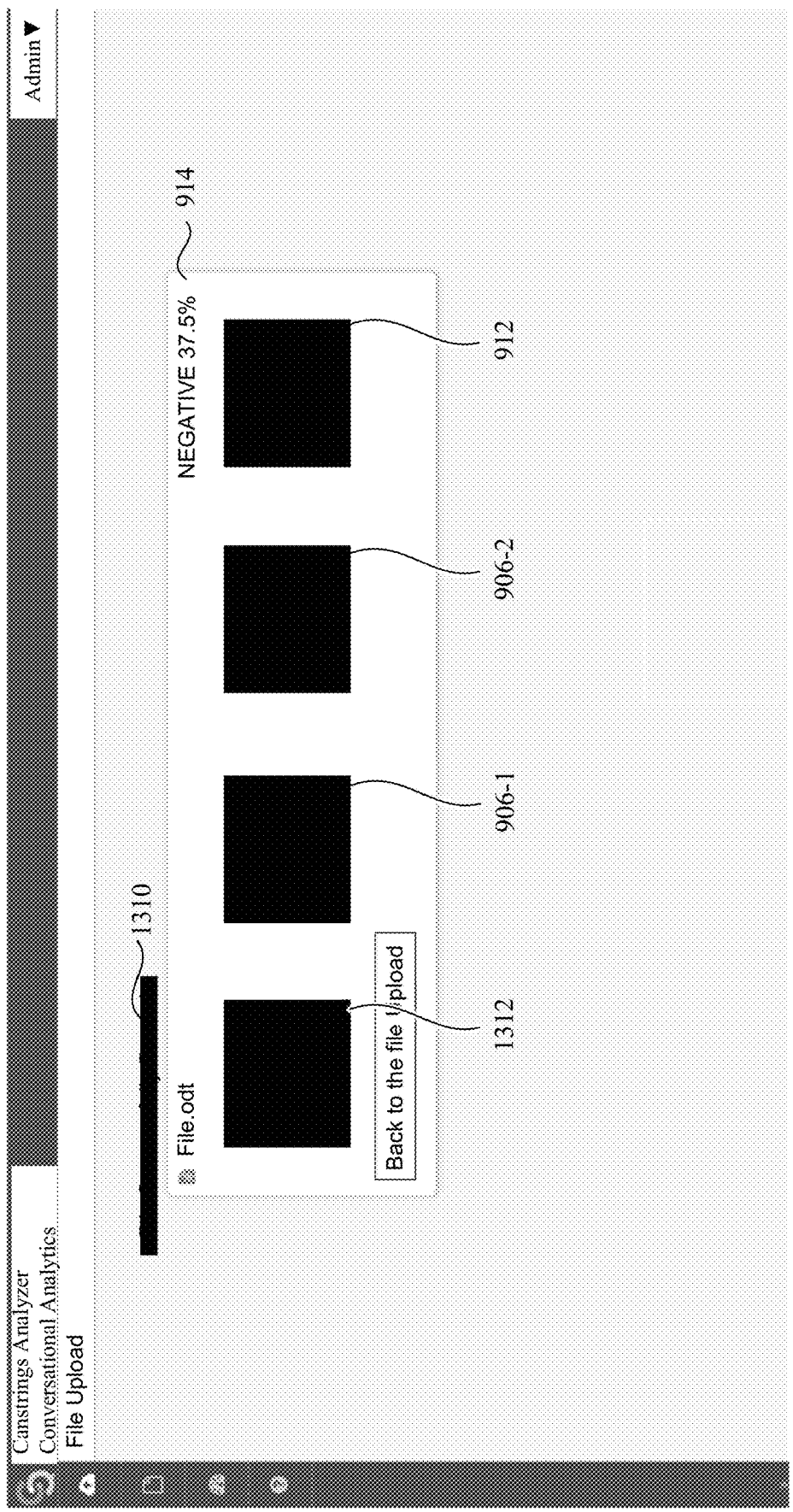

Referring to FIG. 13C, after uploading the communication 600 (e.g., receiving the communication at the analytics system 200), the user interface provides a result of the parsing and evaluating of the communication 600. In some embodiments, the result includes a confirmation 1310, or status, of the parsing and/or the evaluating of the communication 600. For instance, if the systems 200 is unable to parse the communication the user is provided the status 1310 of the failed parsing and, in some embodiments, a description of a cause of the failure. For instance, in some embodiments the system 200 fails to parse a communication since, for instance, the data construct of the communication includes a corrupted file or the text object of the data construct includes one or the text object of the data construct includes lacks an numbers of characters (e.g., a blank text object). However, the present disclosure is not limited to these express types of failures. In some embodiments, the result includes the text object 1312 of the communication 600. For instance, in some embodiments, the text object 1312 includes a transcript of an audio portion of the communication provided by the system 200. In some embodiments, the results include one or more extracted portions of the text object, such as particular text strings or words. For instance, in some embodiments, the communication is a conversation between a consumer user and a support staff user including one or more questions poised to the staff user by the consumer user. Accordingly, in some embodiments, the results including one or more of the questions poised by the consumer user and/or one or more answers provided by the staff user that were determined by the parsing of the data construct. This result allows the user of the user device 300 to review the questions that lead to provided characteristic 914.

Referring to FIGS. 13D and 13E, in some embodiments, similar to the user interfaces of FIGS. 9A, 9B, and 10A, the user interface provides a listing describing information and results of one or more communications. For instance, in some embodiments, each respective communication (e.g., each row) includes a plurality of column including a column 904 providing access to the communication (e.g., column 904), a column providing a name 1306 (e.g., name 1306 of FIG. 13B) of the communication, one or more columns 914 and/or 808 providing a plurality of characteristics, such as one or more sentiments and/or one or more emotions of the communication, a plurality of columns providing information related to one or more users associated with the communication (e.g., information 908-1, 908-2, 906 of FIG. 13 or a combination thereof), a column 912 providing information related to a time aspect of the communication (e.g., a time on inception, a duration of an audio portion of the communication, etc.). In some embodiments, the plurality of columns includes one or more action 1310 that at least allow the user of the user device to modify and/or configure the communication, such as providing a flag associated with the communication, including sharing the communication with a different user.

Figure 13F:
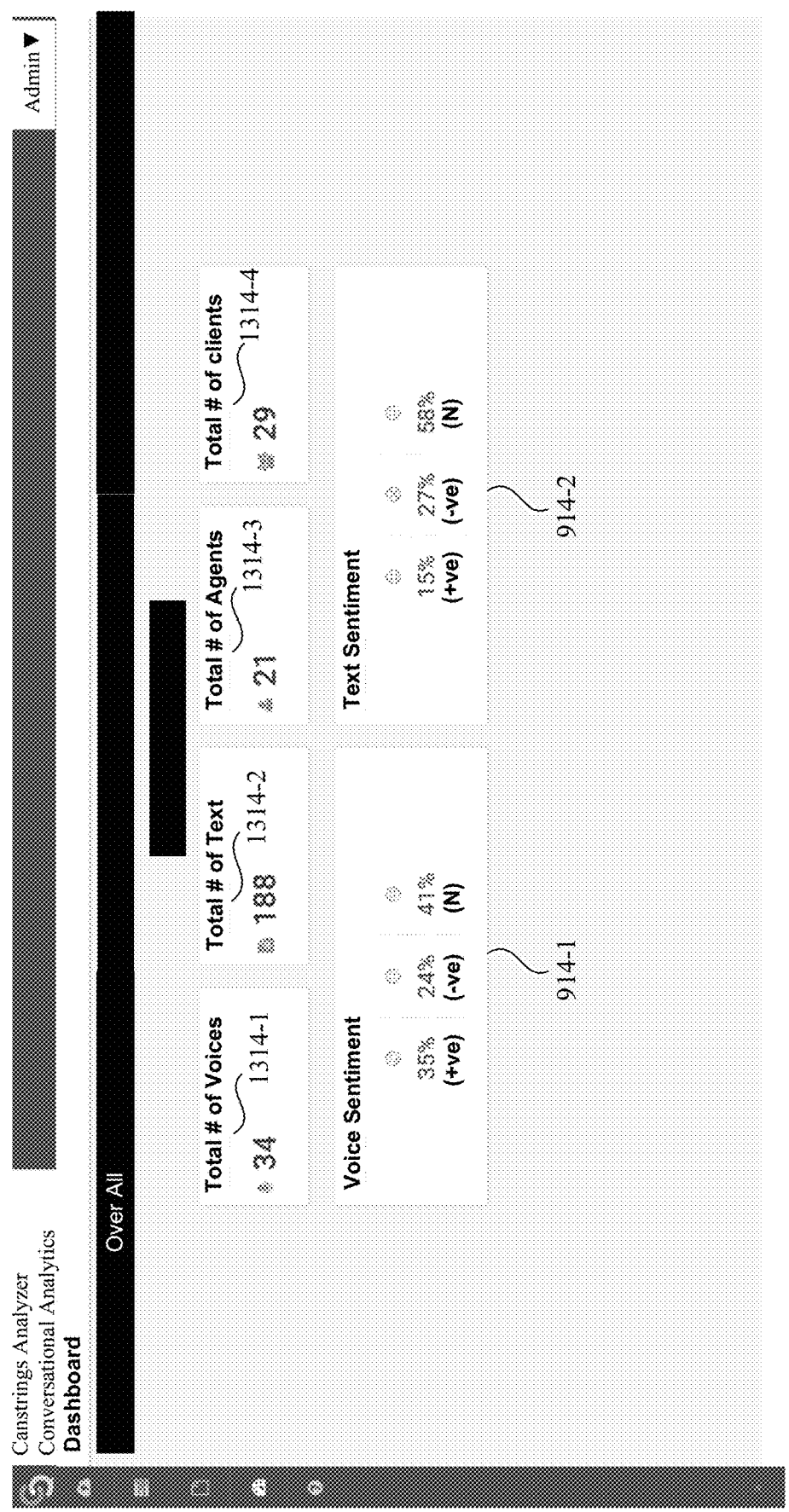
Figure 13G:
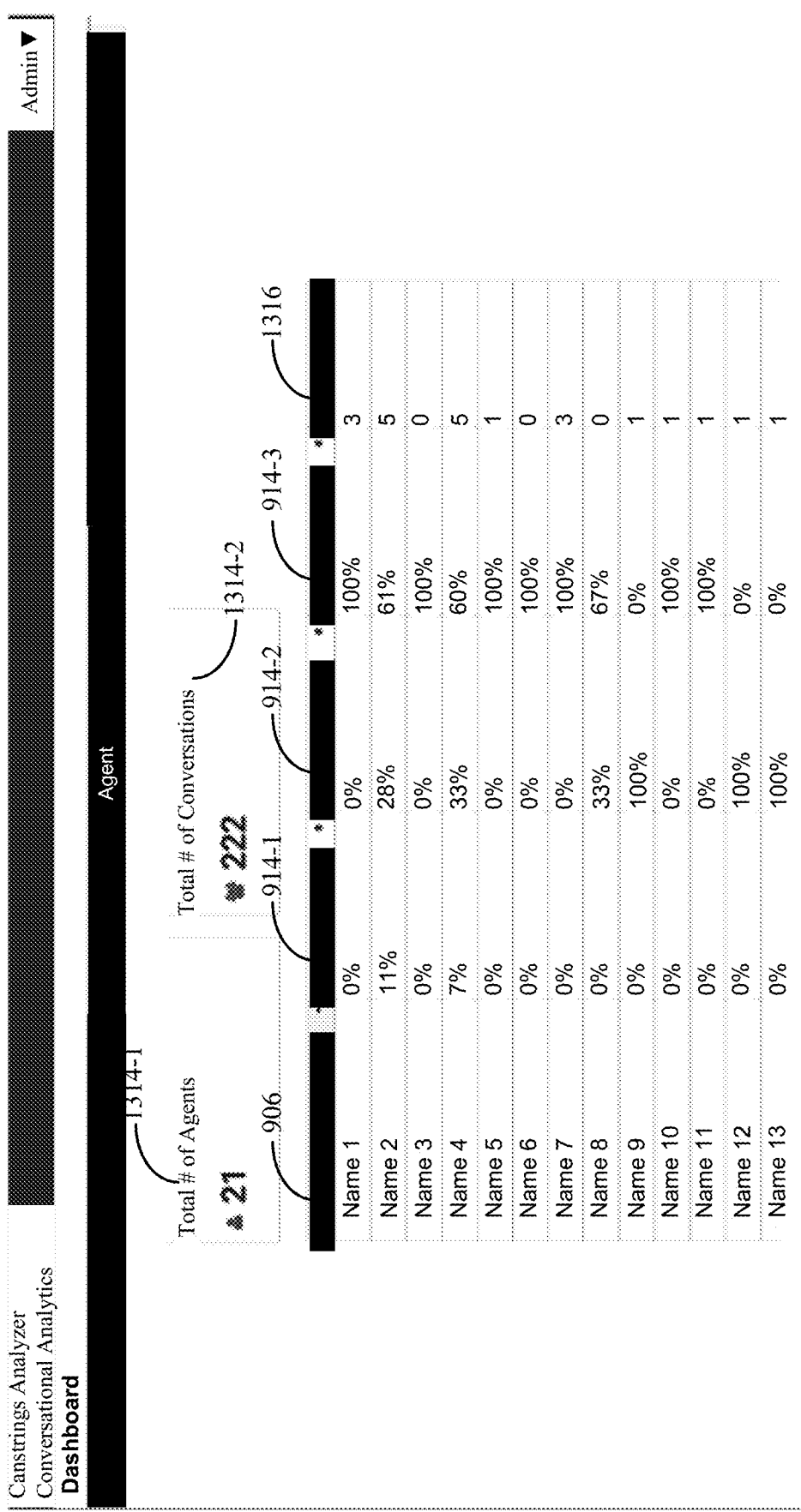

Referring to FIGS. 13F and 13G, in some embodiments, the user interface provides a summary of the communications associated with the user of the user device. In some embodiments, the summary is a total summary of the communications (e.g., overall summary of FIG. 13F), a summary of communications associated with a specific user, a summary of communications associated with a group of users (e.g., a summary of communications of all employees of the user, a summary of communications of one or more clients of the user, etc.), or a combination thereof. In some embodiments, the summary includes a collective characteristic of the communications of the summary. In some embodiments, the collective characteristic is determined by a summation or an average of each respective communication associated with the summary of communications, allowing the user to review or determine trends in characteristics of communications of the summary.

Accordingly, a characteristic analysis service according to an exemplary embodiment of the present disclosure achieves the advantages of analyzing a communication to provide a characteristic of the context of the communications. Users can provide the service with a collection of communications used to train the classification models, allowing the analysis to be tailored to the user. Multiple classification models are applied in conducting an analysis of the communication, providing an increased accuracy for determining the characteristic of the communication. The characteristic analysis service provided by the present disclosure is capable of evaluating ideograms within a communication the relation of the ideogram to a characteristic of the communication. Furthermore, the characteristic analysis service provided by the present disclosure allows a user to connect to an external application and provide a characteristic of a communication associated with the external application.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various alternatives and modifications thereof. It is intended that the scope of the invention be defined by the Claims appended hereto and their equivalents.

What is claimed is:

1. A characteristic analytics system comprising a computer system, the computer system comprising one or more processing units and a memory coupled to at least one of the one or more processing units, the memory comprising instructions for:
   a) receiving, in electronic form, a communication that provides information, wherein the communication is selected by a user and is received in the form of a data construct that provides the information in a first format associated with a source of the communication;
   b) formatting the data construct from the first format to a second format, wherein the second format comprises a text object that contains the information, thereby forming the text object;
   c) applying a first subset of classification models in a plurality of classification models to the text object, wherein each respective classification model in the first subset of classification models parses a portion of the text object in accordance with a corresponding plurality of heuristic instructions associated with the respective classification model into a respective classification in the form of a corresponding plurality of classification text strings, and wherein the corresponding plurality of classification text strings of the respective classification collectively contains a portion, less than all, of the information, thereby forming a plurality of classifications, each classification in the plurality of classifications corresponding to application of a classification model in the first subset of classification models to the text object;
   d) evaluating, for each respective classification model in a second subset of classification models, each classification in the plurality of classifications, by applying each respective classification model in the second subset of classification models to each corresponding plurality of classification text strings of each respective classification in the plurality of classifications, in which each respective classification model in the second subset of classification models applies a corresponding plurality of heuristic instructions selected by the respective classification model based on a determination of the source of the communication, thereby forming a corresponding evaluation for each respective classification model in the second subset of classification models for each classification in the plurality of classifications;
   and
   e) providing, in electronic form, a characteristic of the communication in the form of a result of the evaluating d), wherein the characteristic is an amalgamation of the corresponding evaluation for each respective classification model in the second subset of classification models for each classification in the plurality of classifications;
   wherein the first subset of classification models and the second subset of classification models collectively comprise three unique classification models in the plurality of classification models, and wherein the first subset of classification models and the second subset of classification models are disjoint subsets of classification models in the plurality of classification models.

2. The system of claim 1, wherein the first format of the data construct comprises audio data, and wherein the formatting b) further comprises transcribing the audio data of the communication, thereby forming the text object.

3. The system of claim 2, wherein the transcribing is conducted using a speech recognition classification model in the plurality of classification models.

4. The system of claim 1, wherein the information provided in the first format comprises an ideogram.

5. The system of claim 4, wherein the ideogram comprises an image emoticon, a text emoticon, or a combination thereof.

6. The system of claim 1, wherein the plurality of classification models comprises a decision tree classification model and wherein a corresponding plurality of heuristic instructions associated with the decision tree classification model comprises a plurality of pre-pruning instructions, a plurality of post-pruning instructions, or a combination thereof.

7. The system of claim 6, wherein the plurality of heuristic instructions associated with the decision tree classification model comprise a plurality of information gain heuristic instructions.

8. The system of claim 1, wherein the characteristic of the communication comprises an emotion of the communication, a sentiment of the communication, or a combination thereof.

9. The system of claim 1, wherein the characteristic of the communication comprises an emotion of the communication in the form of happiness, sadness, fear, disgust, anger, surprise, pride, shame, embarrassment, and excitement.

10. The system of claim 1, wherein the characteristic of the communication comprises an emotion of the communication in the form of admiration, adoration, aesthetic appreciation, amusement, anxiety, awe, awkwardness, boredom, calmness, confusion, craving, disgust, empathetic pain, entrancement, envy, excitement, fear, horror, interest, joy, nostalgia, romance, sadness, satisfaction, sexual desire, sympathy, and triumph.

11. The system of claim 1, wherein the characteristic of the communication comprises a combination of one or more emotions of the communication.

12. The system of claim 1, wherein the characteristic of the communication comprises a sentiment of the communication that is a positive sentiment, a neutral sentiment, a negative sentiment, or a combination thereof.

13. The system of claim 1, wherein the data construct is derived from the communication, and wherein the source of the communication comprises a social media communication feed, an email communication, a telephonic communication, or a technical document.

14. The system of claim 1, wherein the second format is in accordance with a standardized format.

15. The system of claim 1, wherein the plurality of classification models comprises a decision tree classification model, a neural network classification model, a support vector machine classification model, a Naïve Bayes classification model, a pattern-matching classification model, a syntactic based classification model, or a combination thereof.

16. The system according to claim 1, wherein the plurality of classification models comprises a neural network classification model in the form of an inter-pattern distance based classification model.

17. The system of claim 1, wherein:
a first corresponding plurality of classification text strings of a first classification model in the first subset of classification models is associated with a semantic classification, and
a second corresponding plurality of classification text strings of a second classification model in the first subset of classification models is associated with a syntax classification.

18. A method for analyzing characteristics of a data construct, the method comprising:
a) receiving, in electronic form, a communication that provides information, wherein the communication is selected by a user and is received in the form of a data construct that provides the information in a first format associated with a source of the communication;
b) formatting the data construct from the first format to a second format, wherein the second format comprises a text object that contains the information, thereby forming the text object:
c) applying a first subset of classification models in a plurality of classification models to the text object, wherein each respective classification model in the first subset of classification models parses a portion of the text object in accordance with a corresponding plurality of heuristic instructions associated with the respective classification model into a respective classification in the form of a corresponding plurality of classification text strings, and wherein the corresponding plurality of classification text strings of the respective classification collectively contains a portion, less than all, of the information, thereby forming a plurality of classifications, each classification in the plurality of classifications corresponding to application of a classification model in the first subset of classification models to the text object;
d) evaluating, for each respective classification model in a second subset of classification models, each classification in the plurality of classifications, by applying each respective classification model in the second subset of classification models to each corresponding plurality of classification text strings of each respective classification in the plurality of classifications, in which each respective classification model in the second subset of classification models applies a corresponding plurality of heuristic instructions selected by the respective classification model based on a determination of the source of the communication, thereby forming a corresponding evaluation for each respective classification model in the second subset of classification models for each classification in the plurality of classifications;
and
e) providing, in electronic form, a characteristic of the communication in the form of a result of the evaluating d), wherein the characteristic is an amalgamation of the corresponding evaluation for each respective classification model in the second subset of classification models for each classification in the plurality of classifications;
wherein the first subset of classification models and the second subset of classification models collectively comprise three unique classification models in the plurality of classification models, and wherein the first subset of classification models and the second subset of classification models are disjoint subsets of classification models in the plurality of classification models.

19. A non-transitory computer readable storage medium stored on a computing device, the computing device comprising, one or more processors and memory storing one or more programs for execution by the one or more processors, wherein the one or more programs singularly or collectively comprise instructions for running an application on the computing device that executes a method comprising:
a) receiving, in electronic form, a communication that provides information, wherein the communication is selected by a user and is received in the form of a data construct that provides the information in a first format associated with a source of the communication;
b) formatting the data construct from the first format to a second format, wherein the second format comprises a text object that contains the information, thereby forming the text object:
c) applying a first subset of classification models in a plurality of classification models to the text object, wherein each respective classification model in the first subset of classification models parses a portion of the text object in accordance with a corresponding plurality of heuristic instructions associated with the respective classification model into a respective classification in the form of a corresponding plurality of classification text strings, and wherein the corresponding plurality of classification text strings of the respective classification collectively contains a portion, less than all, of the information, thereby forming a plurality of classifications, each classification in the plurality of classifications corresponding to application of a classification model in the first subset of classification models to the text object;
d) evaluating, for each respective classification model in a second subset of classification models, each classification in the plurality of classifications, by applying each respective classification model in the second subset of classification models to each corresponding plurality of classification text strings of each respective classification in the plurality of classifications, in which each respective classification model in the second subset of classification models applies a corresponding plurality of heuristic instructions selected by the respective classification model based on a determination of the source of the communication, thereby forming a corresponding evaluation for each respective classification model in the second subset of classification models for each classification in the plurality of classifications;
and
e) providing, in electronic form, a characteristic of the communication in the form of a result of the evaluating d), wherein the characteristic is an amalgamation of the corresponding evaluation for each respective classification model in the second subset of classification models for each classification in the plurality of classifications;

wherein the first subset of classification models and the second subset of classification models collectively comprise three unique classification models in the plurality of classification models, and wherein the first subset of classification models and the second subset of classification models are disjoint subsets of classification models in the plurality of classification models.

* * * * *